(12) United States Patent
Hayashi

(10) Patent No.: US 10,536,300 B2
(45) Date of Patent: Jan. 14, 2020

(54) TRANSMISSION DEVICE, TRANSMISSION METHOD, AND COMMUNICATION SYSTEM

(71) Applicant: Sony Corporation, Tokyo (JP)

(72) Inventor: Hiroaki Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/075,794

(22) PCT Filed: Jan. 19, 2017

(86) PCT No.: PCT/JP2017/001746
§ 371 (c)(1),
(2) Date: Aug. 6, 2018

(87) PCT Pub. No.: WO2017/149980
PCT Pub. Date: Sep. 8, 2017

(65) Prior Publication Data
US 2019/0044757 A1    Feb. 7, 2019

(30) Foreign Application Priority Data

Mar. 1, 2016   (JP) .................................. 2016-038854

(51) Int. Cl.
| | |
|---|---|
| *G06F 1/10* | (2006.01) |
| *H04L 25/02* | (2006.01) |
| *G06F 13/40* | (2006.01) |
| *H04L 25/03* | (2006.01) |

(52) U.S. Cl.
CPC ........ *H04L 25/026* (2013.01); *G06F 13/4063* (2013.01); *H04L 25/03343* (2013.01); *G06F 1/10* (2013.01); *H04L 2025/03426* (2013.01)

(58) Field of Classification Search
USPC .................................. 375/257; 318/430, 379
See application file for complete search history.

(56) References Cited

U.S. PATENT DOCUMENTS

| | | | |
|---|---|---|---|
| 8,064,535 B2 | 11/2011 | Wiley | |
| 2007/0273632 A1* | 11/2007 | Kishimoto | G09G 3/20 345/98 |
| 2009/0045762 A1* | 2/2009 | Hayashi | H02P 7/28 318/379 |
| 2009/0066280 A1* | 3/2009 | Hayashi | H02P 1/22 318/430 |

(Continued)

FOREIGN PATENT DOCUMENTS

| | | |
|---|---|---|
| JP | 06-261092 A | 9/1994 |
| JP | 2015-228554 A | 12/2015 |

(Continued)

*Primary Examiner* — Eva Y Puente
(74) *Attorney, Agent, or Firm* — Michael Best & Friedrich LLP

(57) ABSTRACT

A transmission device according to the disclosure includes a plurality of driver sections and a controller. The plurality of driver sections are each configured to transmit a signal using a first voltage state, a second voltage state, and a third voltage state, and to be able to set a voltage in each of the voltage states. The third voltage state is a state between the first voltage state and the second voltage state. A controller causes the plurality of driver sections to perform emphasis by setting an emphasis voltage in each of the driver sections on the basis of skew information.

19 Claims, 36 Drawing Sheets

(56) References Cited

U.S. PATENT DOCUMENTS

| | | | |
|---|---|---|---|
| 2012/0218777 A1* | 8/2012 | Que | F21V 19/004 362/612 |
| 2015/0304134 A1* | 10/2015 | Hafizi | H04L 25/0276 375/257 |
| 2017/0004799 A1* | 1/2017 | Park | G09G 3/3688 |

FOREIGN PATENT DOCUMENTS

| | | |
|---|---|---|
| WO | 2015/021257 A1 | 2/2015 |
| WO | 2015/146511 A1 | 10/2015 |

* cited by examiner

[FIG.1]
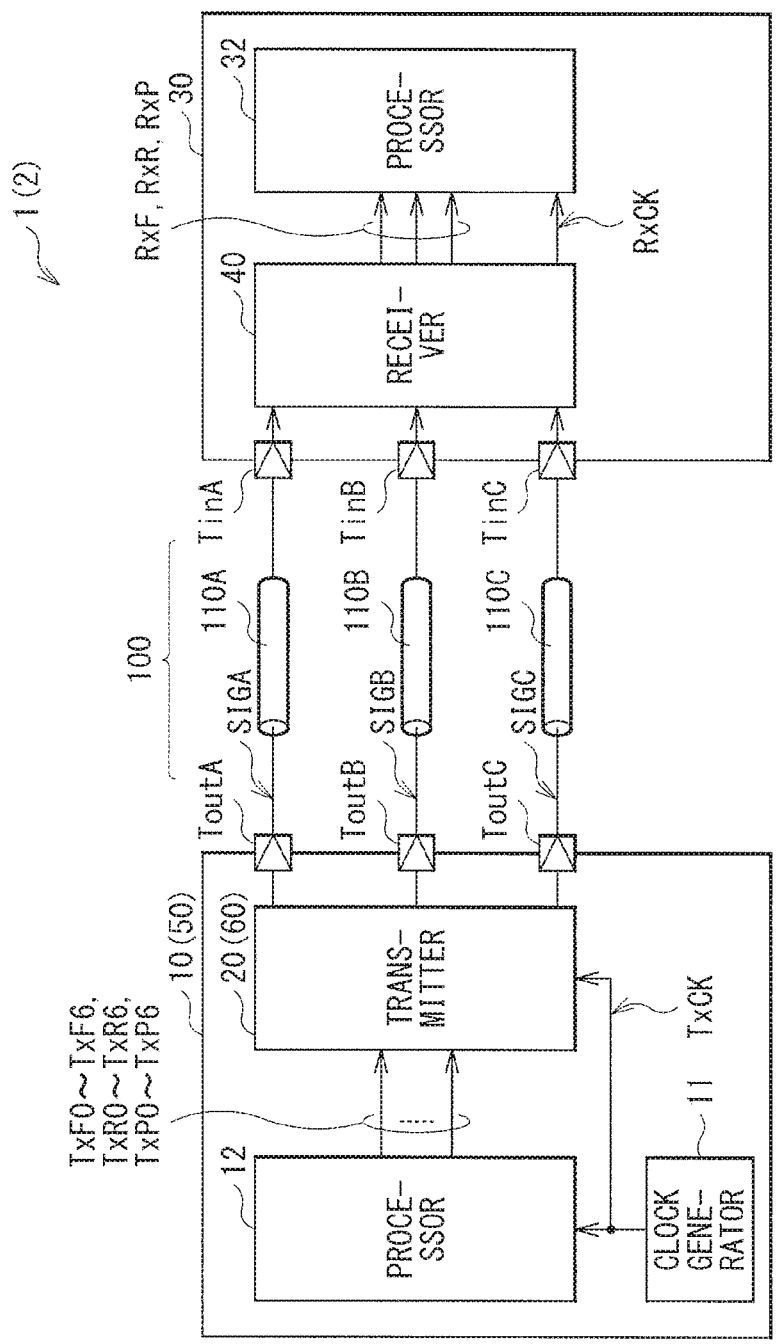

[ FIG. 2 ]
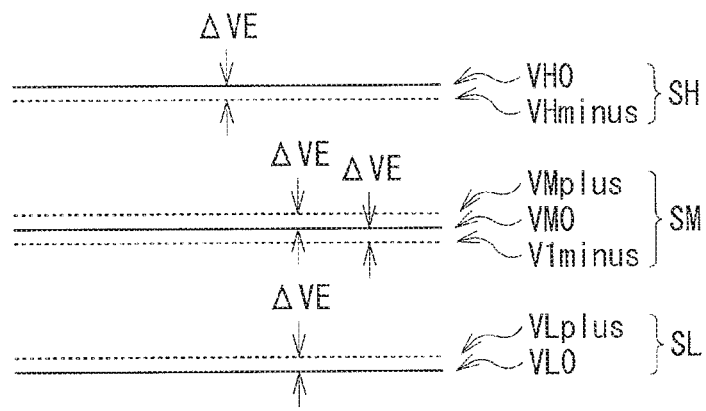
[ FIG. 3 ]
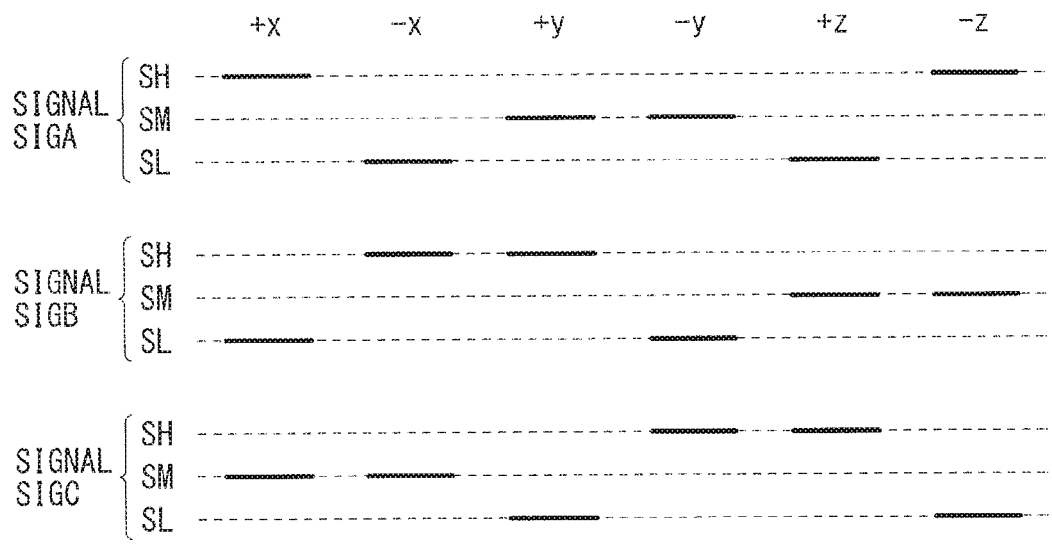

[ FIG. 4 ]
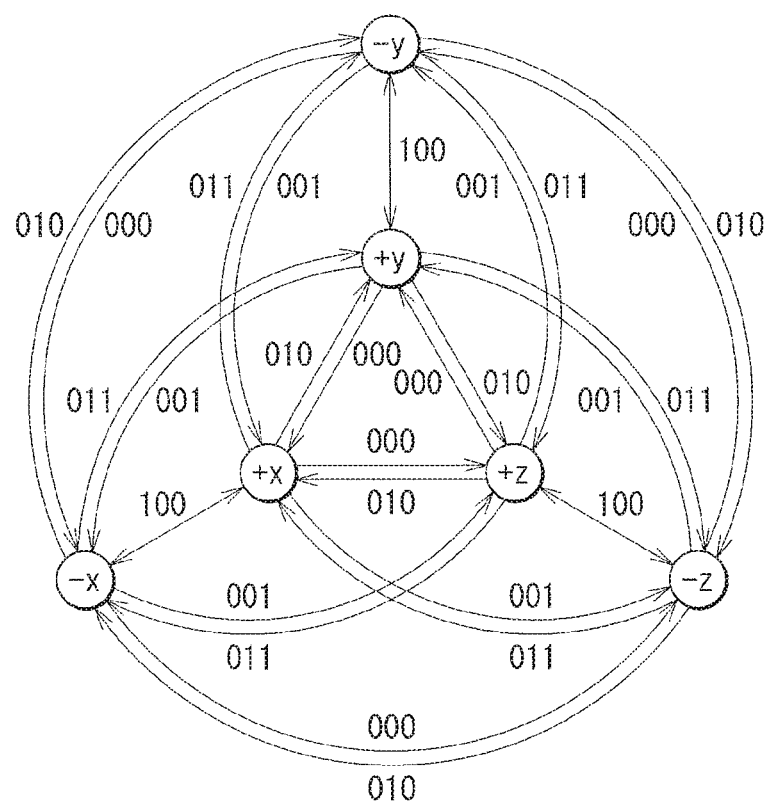

[ FIG. 5 ]
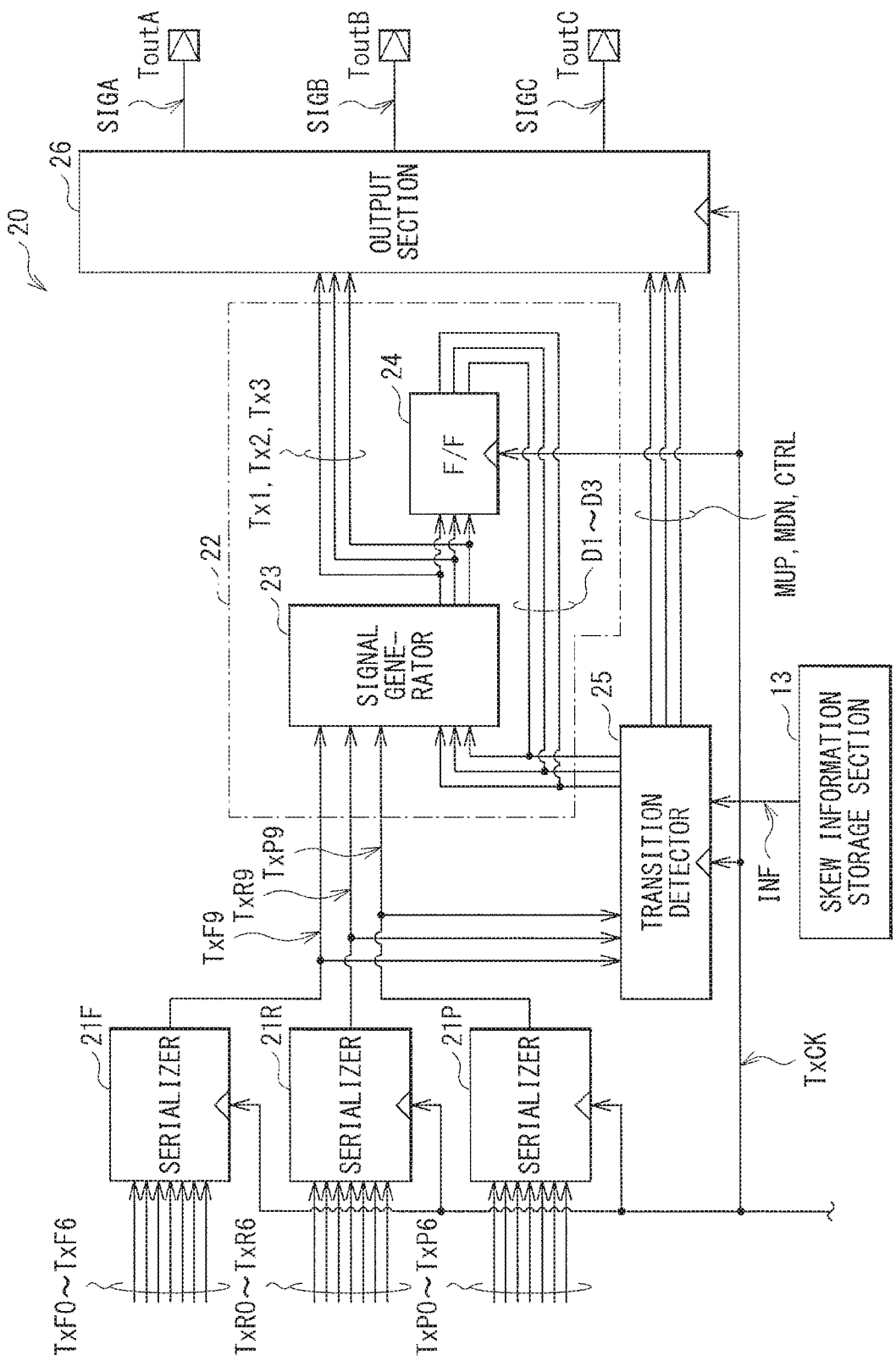

[ FIG. 6 ]

| TxF9, TxR9, TxP9 | DS=+x | DS=−x | DS=+y | DS=−y | DS=+z | DS=−z | |
|---|---|---|---|---|---|---|---|
| 000 | +z | −z | +x | −x | +y | −y | ~WDN |
| 001 | −z | +z | −x | +x | −y | +y | |
| 010 | +y | −y | +z | −z | +x | −x | ~WUP |
| 011 | −y | +y | −z | +z | −x | +x | |
| 1xx | −x | +x | −y | +y | −z | +z | |

[FIG. 7]
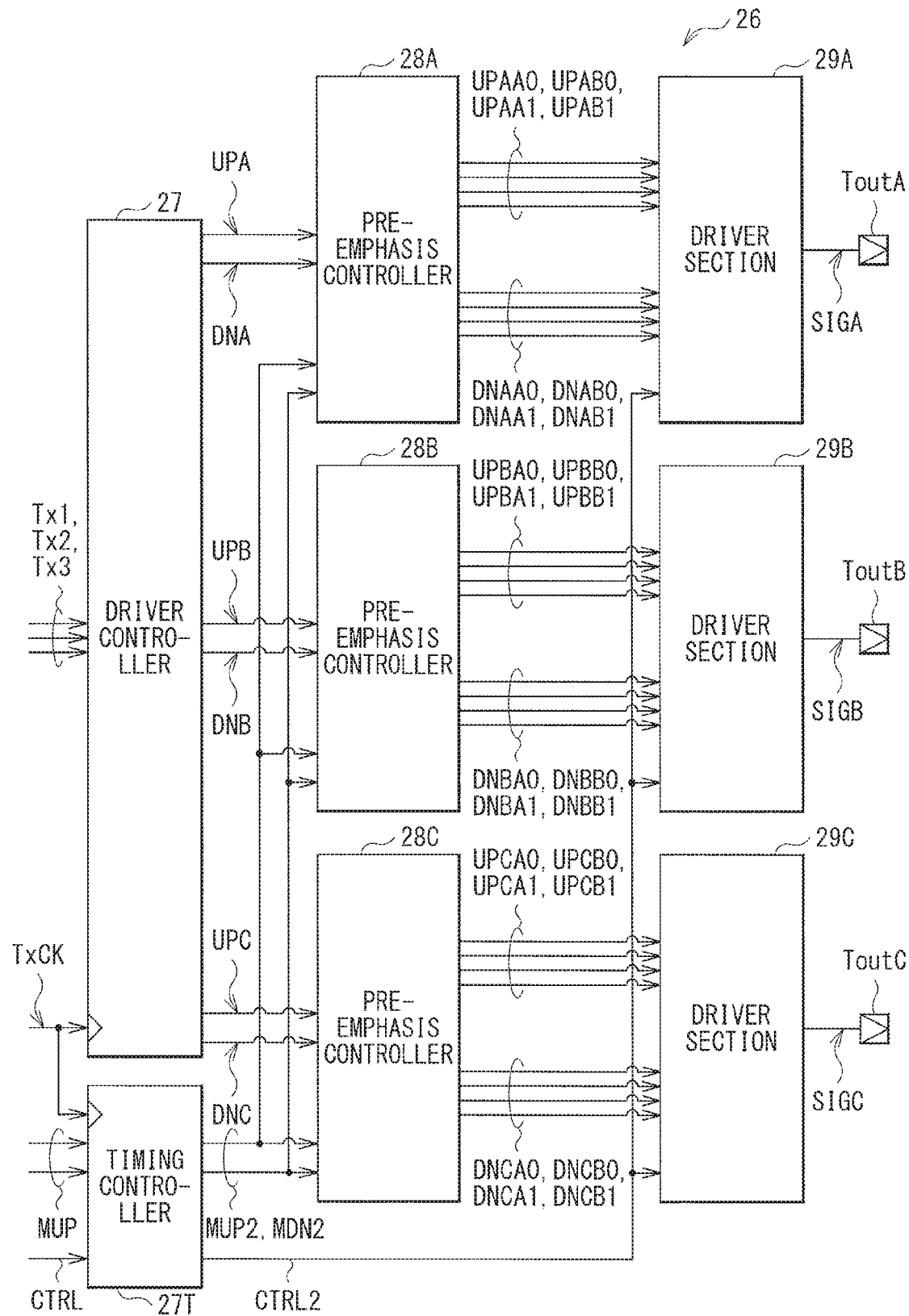

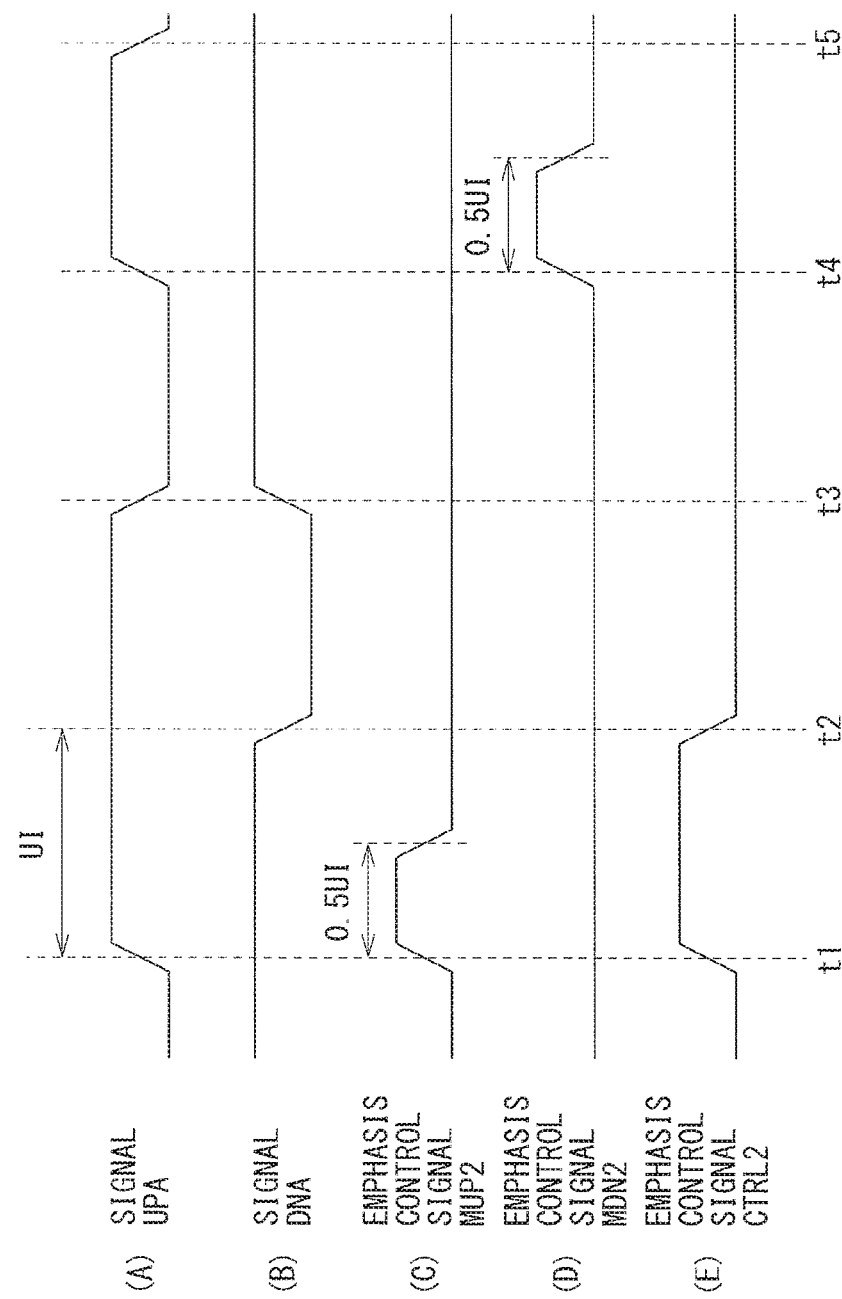

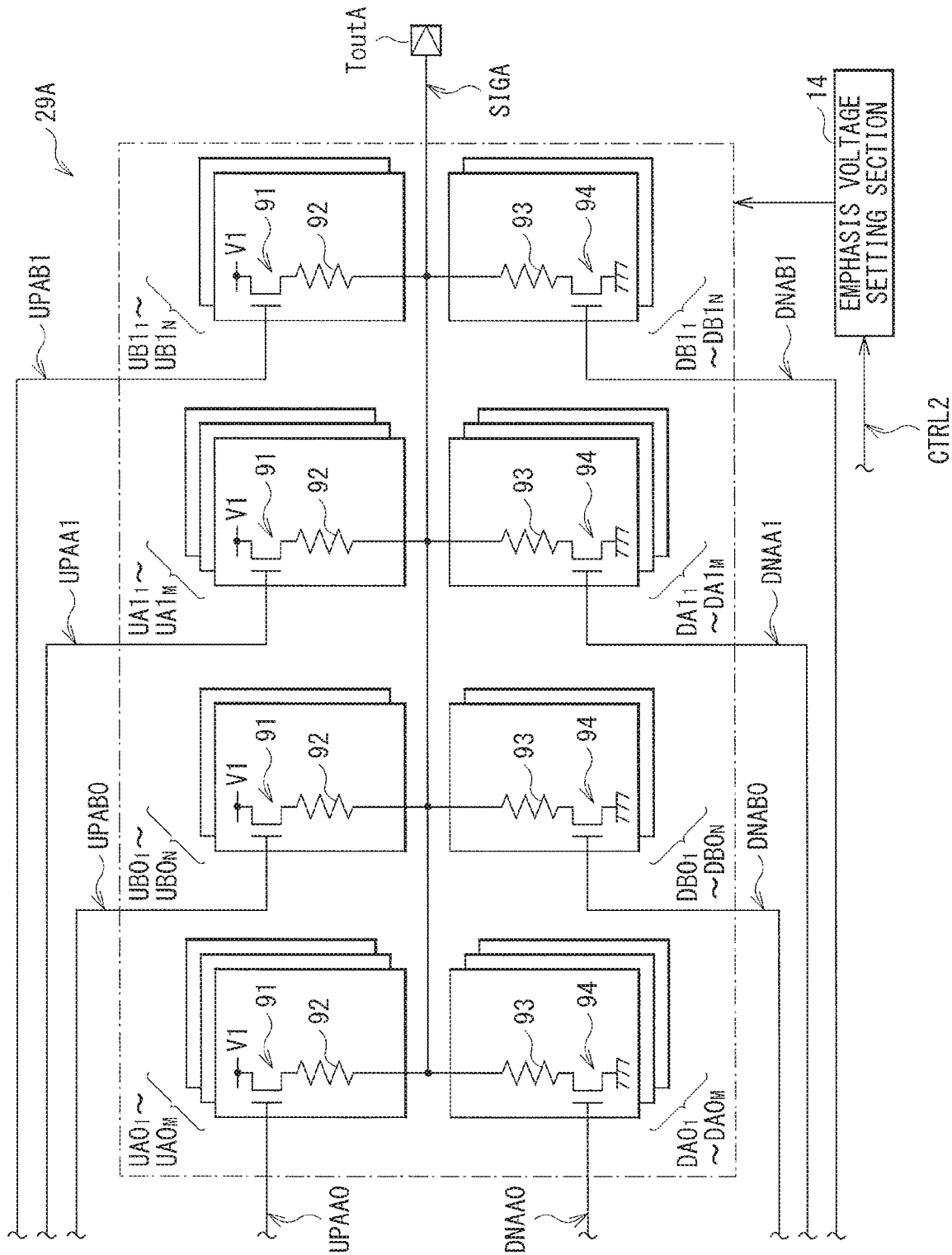
[FIG.9]

[ FIG.10 ]

| INPUT | | | | OUTPUT | | | | | | | | SIGNAL SIGA |
|---|---|---|---|---|---|---|---|---|---|---|---|---|
| SIGNAL UPA | SIGNAL DNA | EMPHASIS CONTROL SIGNAL MUP2 | EMPHASIS CONTROL SIGNAL MDN2 | SIGNAL UPAA0 | SIGNAL UPAB0 | SIGNAL UPAA1 | SIGNAL UPAB1 | SIGNAL DNAA0 | SIGNAL DNAB0 | SIGNAL DNAA1 | SIGNAL DNAB1 | |
| 1 | 0 | 0 | X | 1 | 1 | 1 | 1 | 0 | 0 | 0 | 0 | VH0 |
| 1 | 0 | 1 | 0 | 1 | 0 | 1 | 1 | 0 | 0 | 0 | 1 | VHminus |
| 1 | 1 | 1 | 0 | 1 | 1 | 0 | 1 | 1 | 0 | 0 | 0 | VMplus |
| 1 | 1 | 0 | 0 | 1 | 1 | 0 | 0 | 1 | 1 | 0 | 0 | VM0 |
| 1 | 1 | 0 | 1 | 0 | 0 | 0 | 0 | 1 | 1 | 0 | 0 | VMminus |
| 0 | 1 | 0 | 1 | 0 | 1 | 0 | 0 | 1 | 1 | 1 | 0 | VLplus |
| 0 | 1 | X | 0 | 0 | 0 | 0 | 0 | 1 | 1 | 1 | 1 | VL0 |

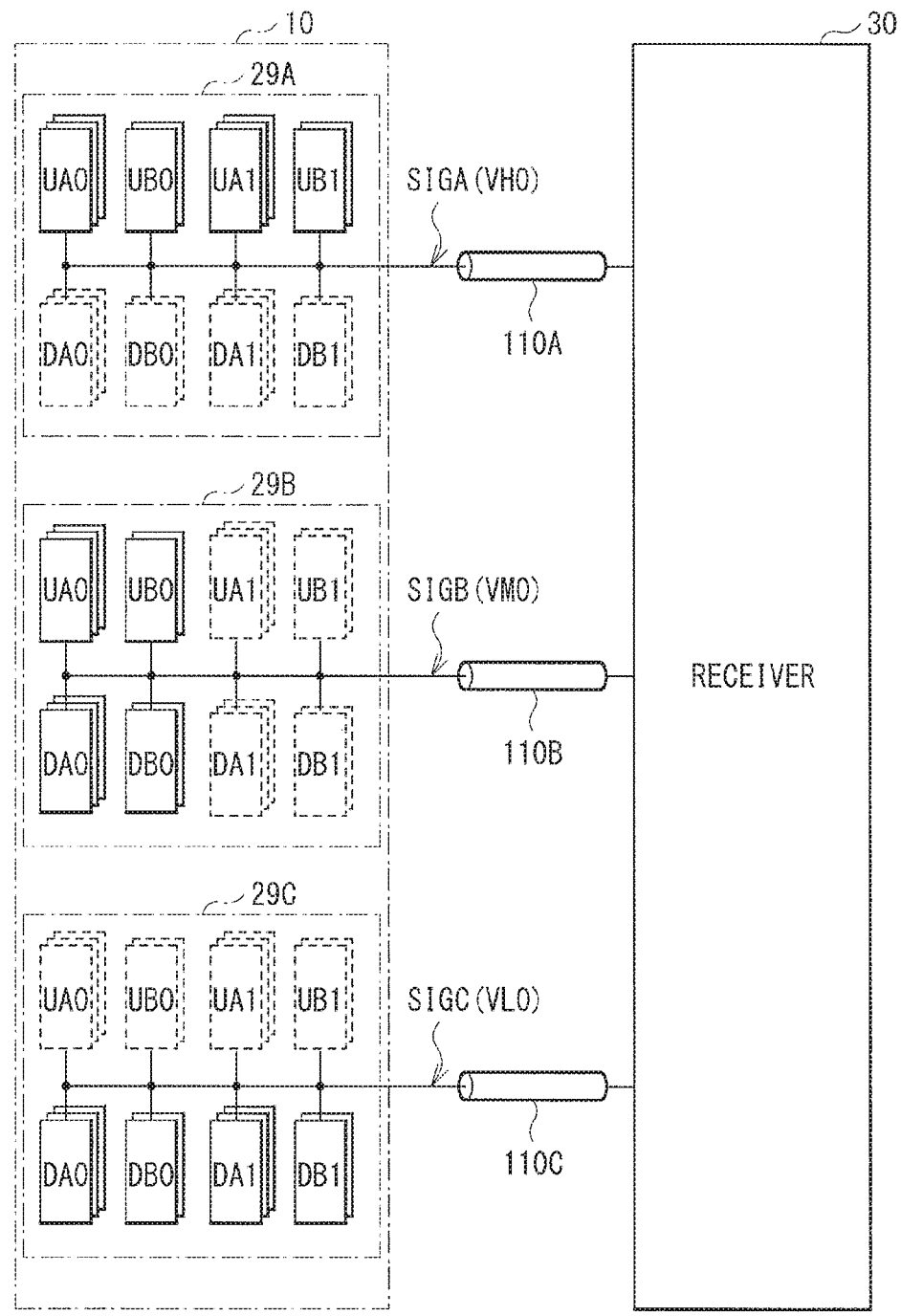
[ FIG. 11A ]

[FIG. 11B]
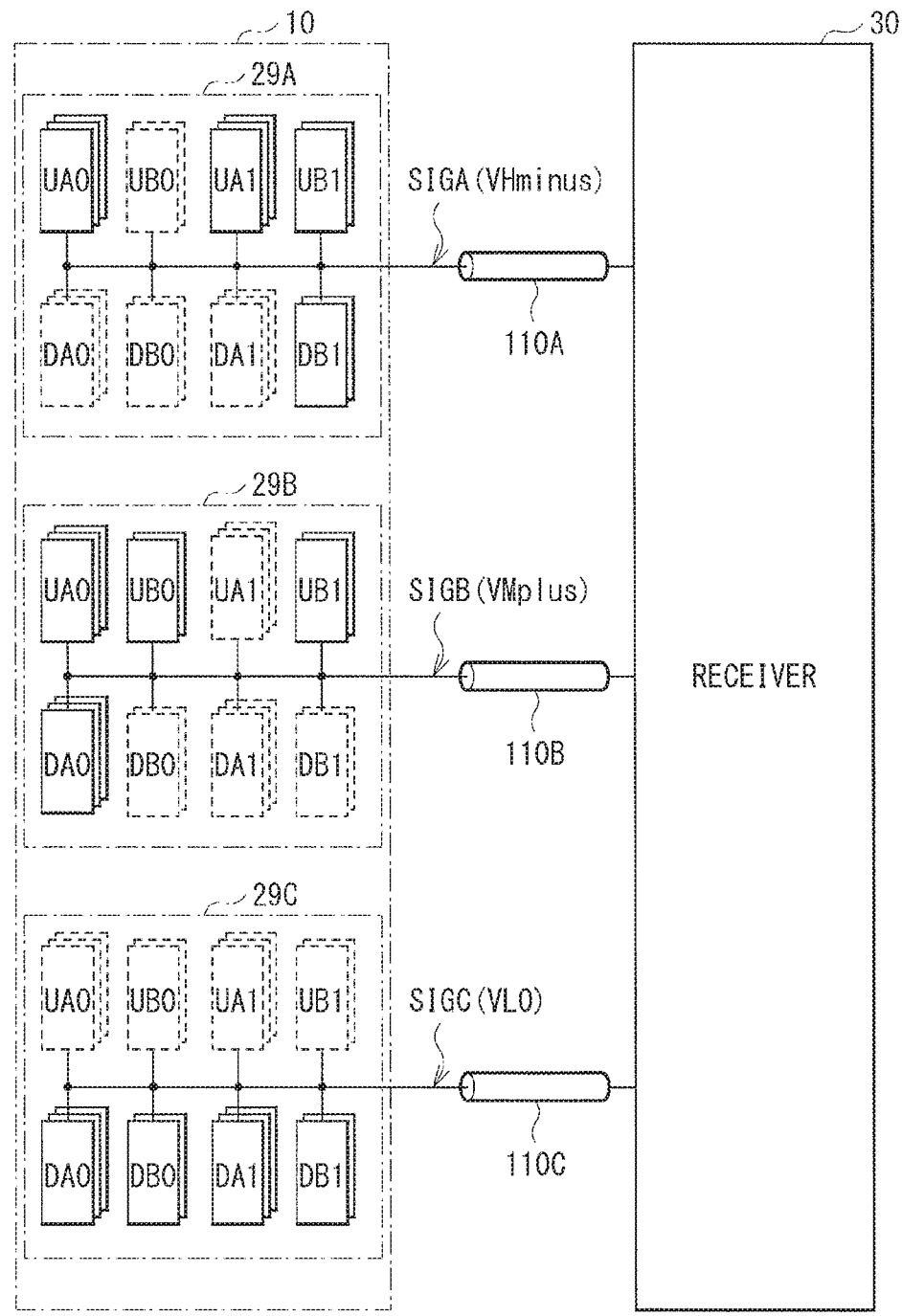

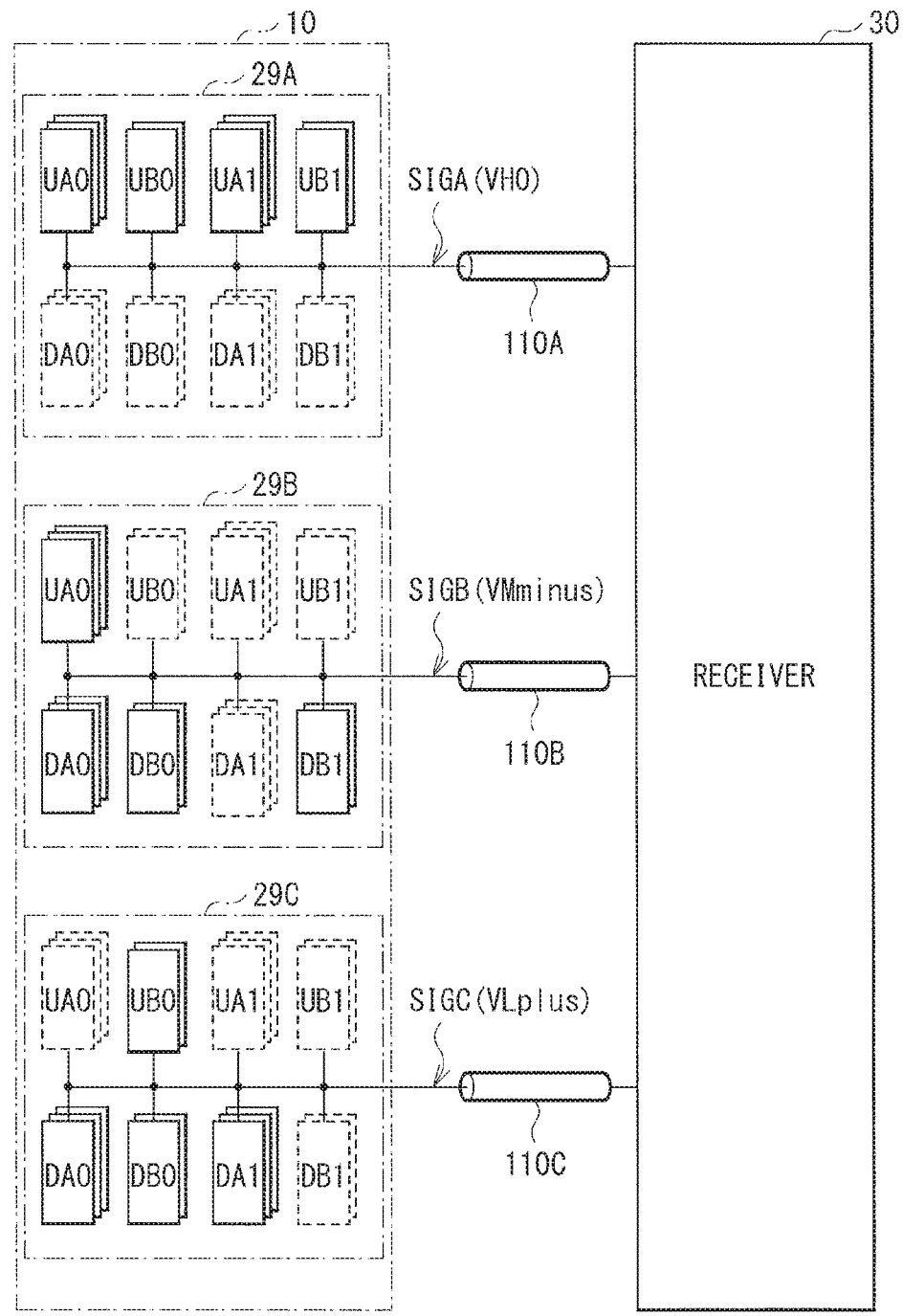
[ FIG. 11C ]

[FIG. 12]
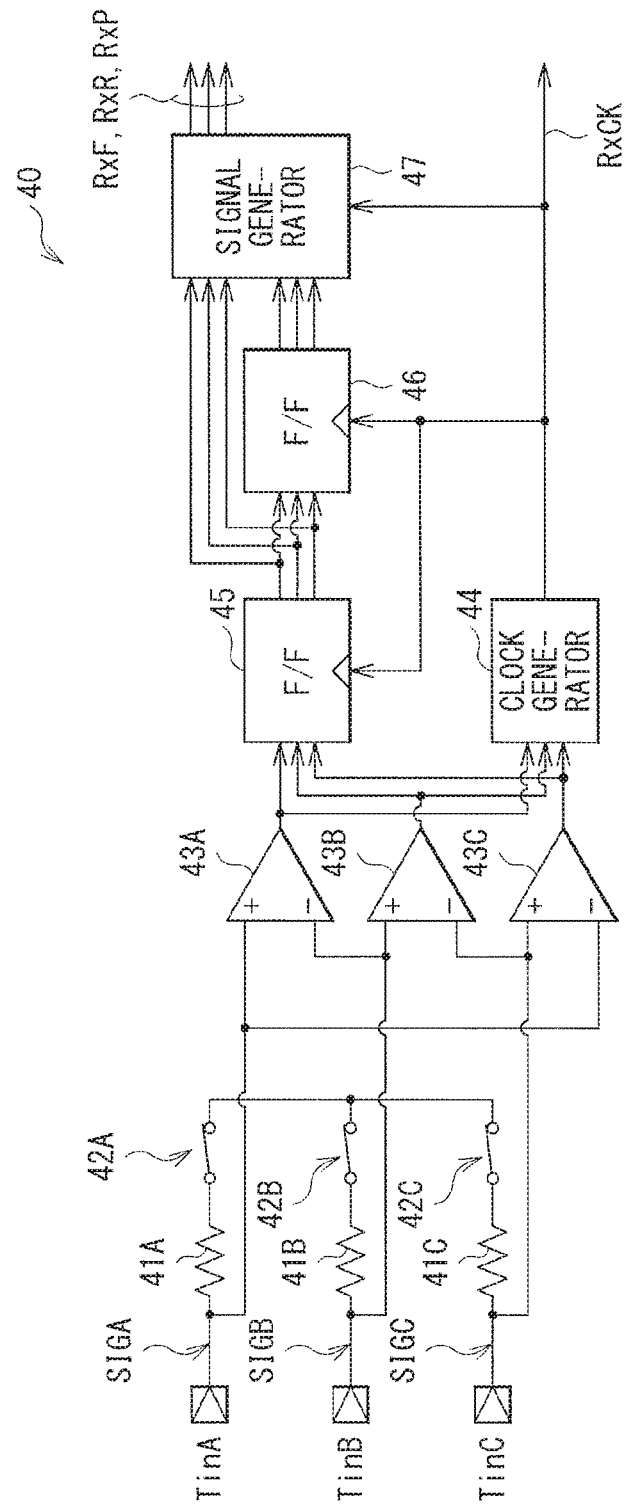

[ FIG. 13 ]
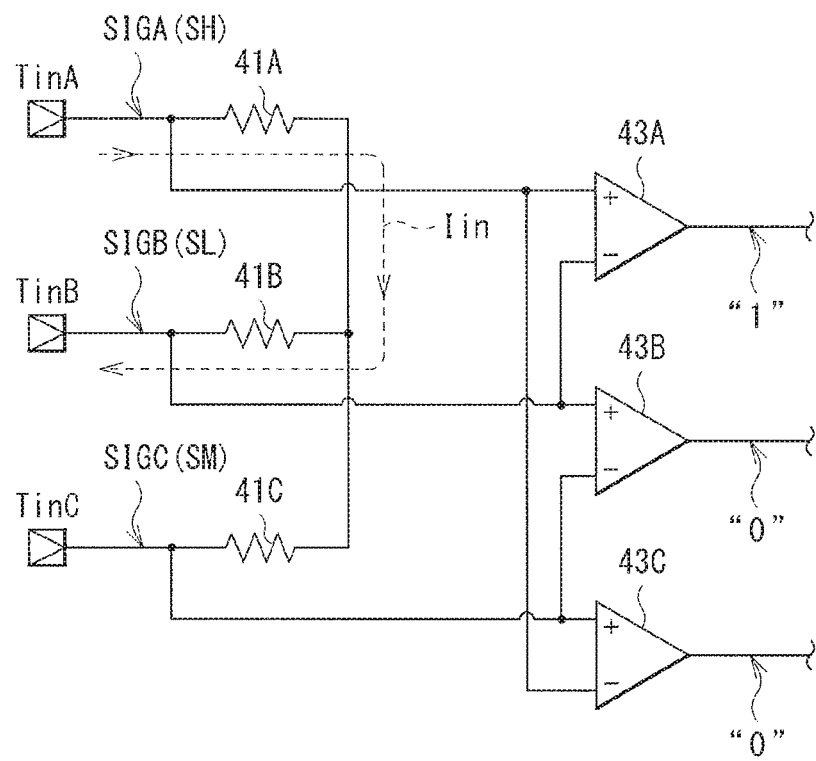
[ FIG. 14 ]
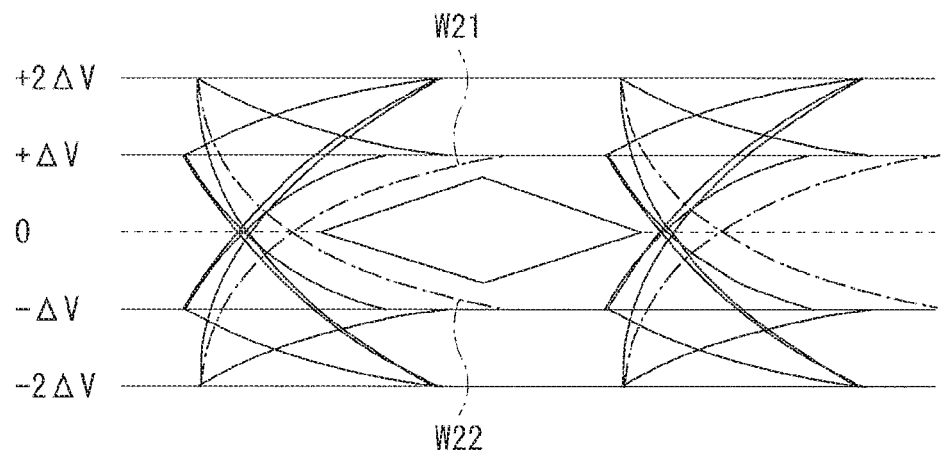

[ FIG. 15A ]
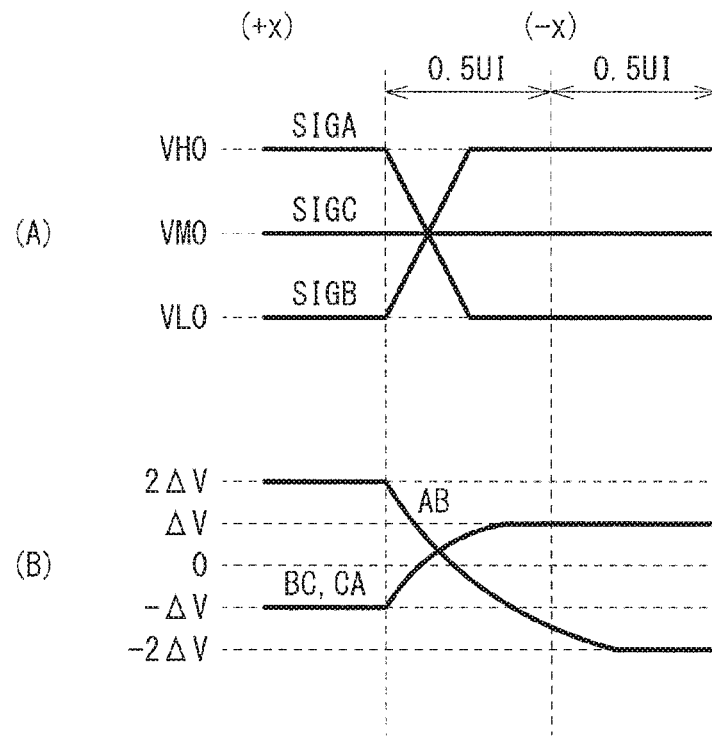
[ FIG. 15B ]
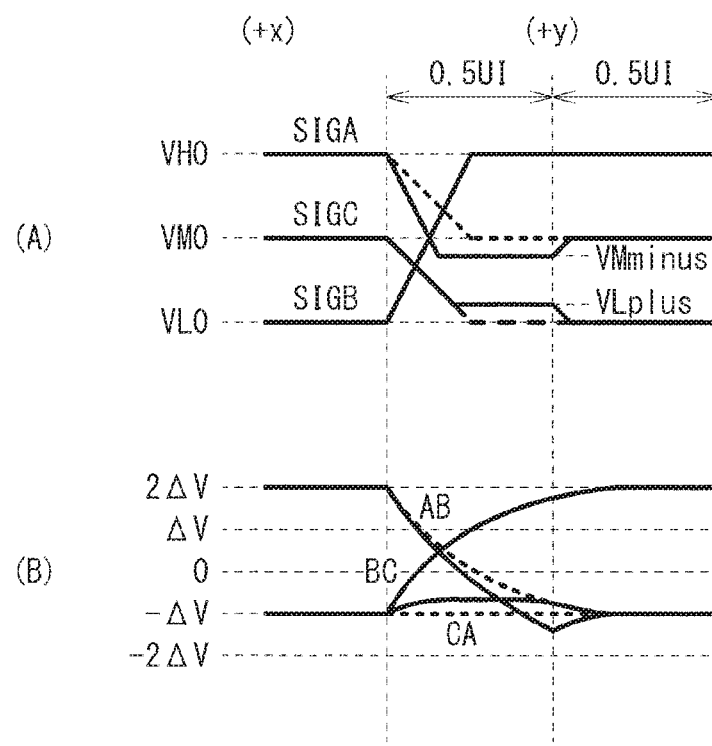

[ FIG. 15C ]
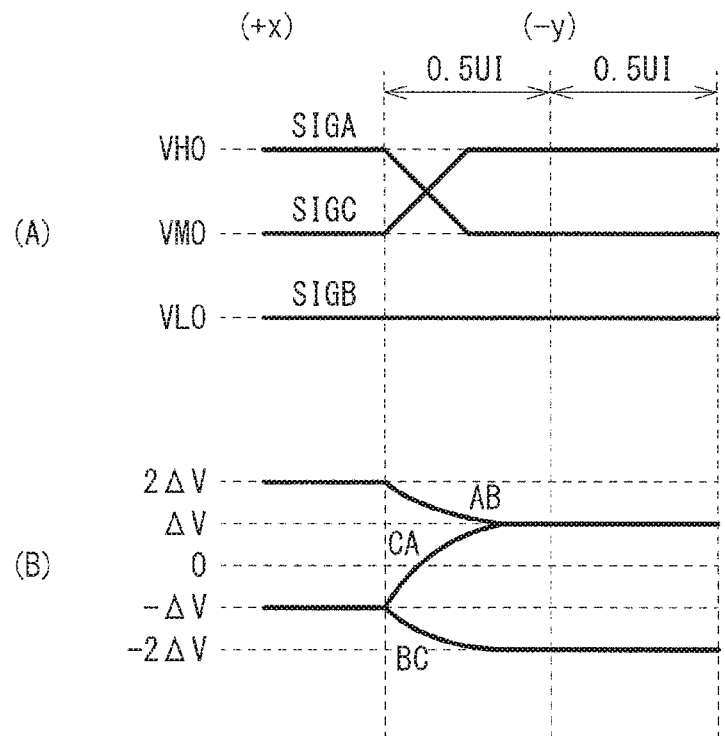
[ FIG. 15D ]
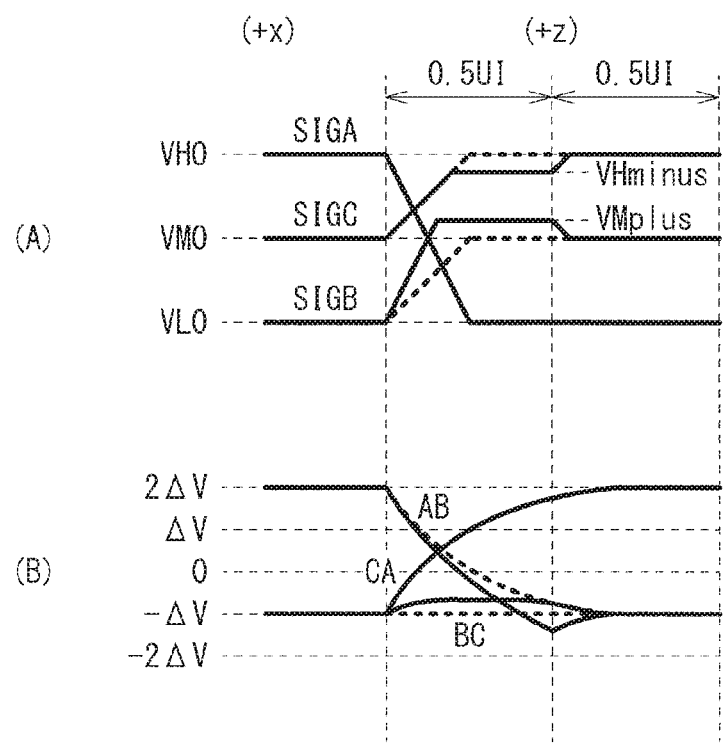

[ FIG. 15E ]
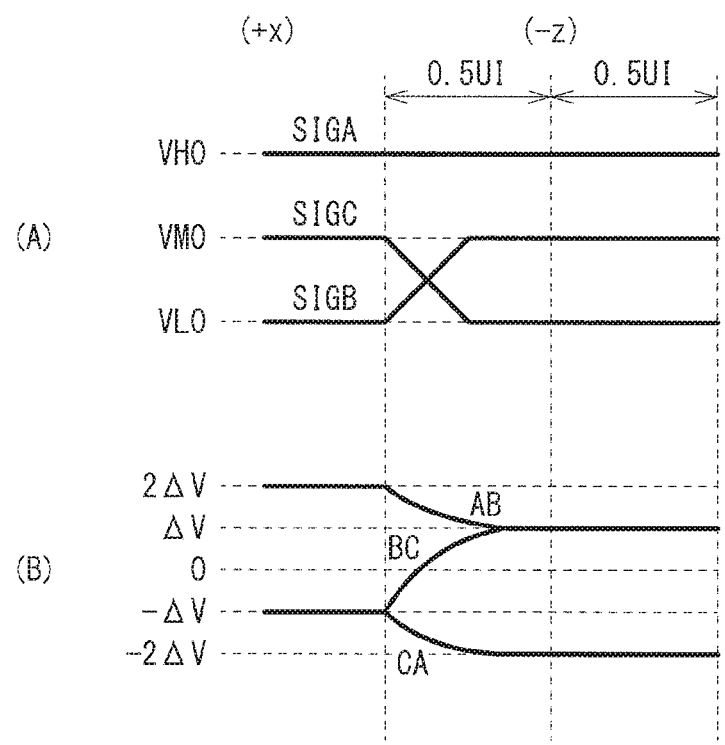

[ FIG. 16A ]
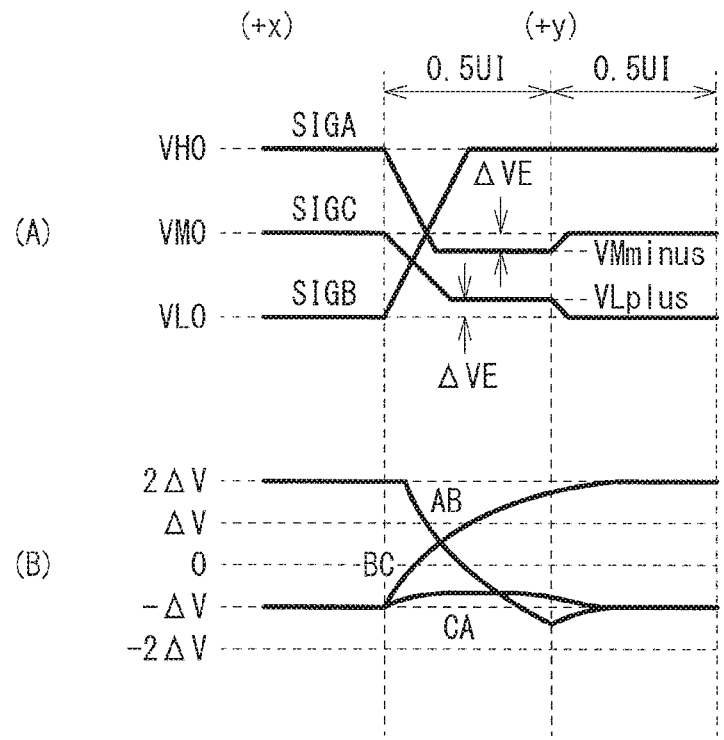
[ FIG. 16B ]
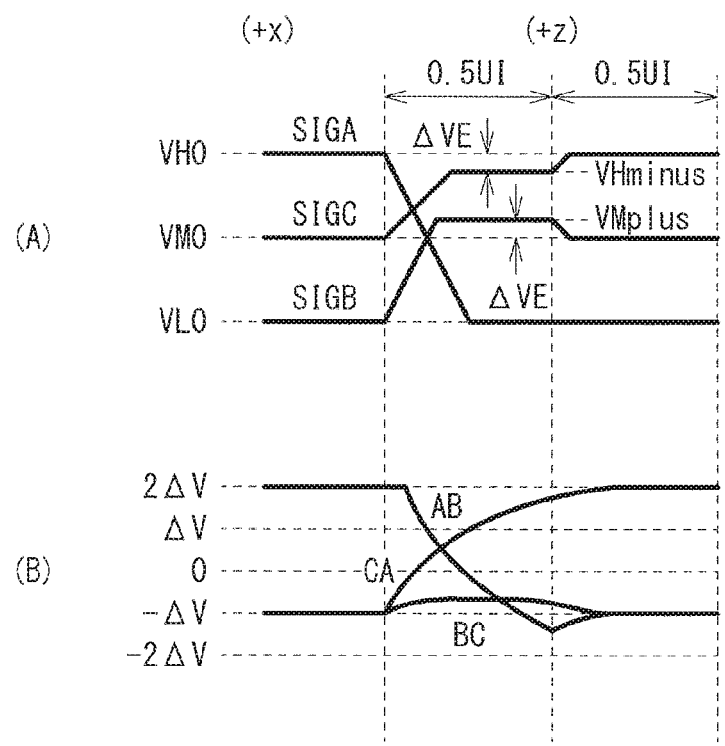

[ FIG. 17A ]
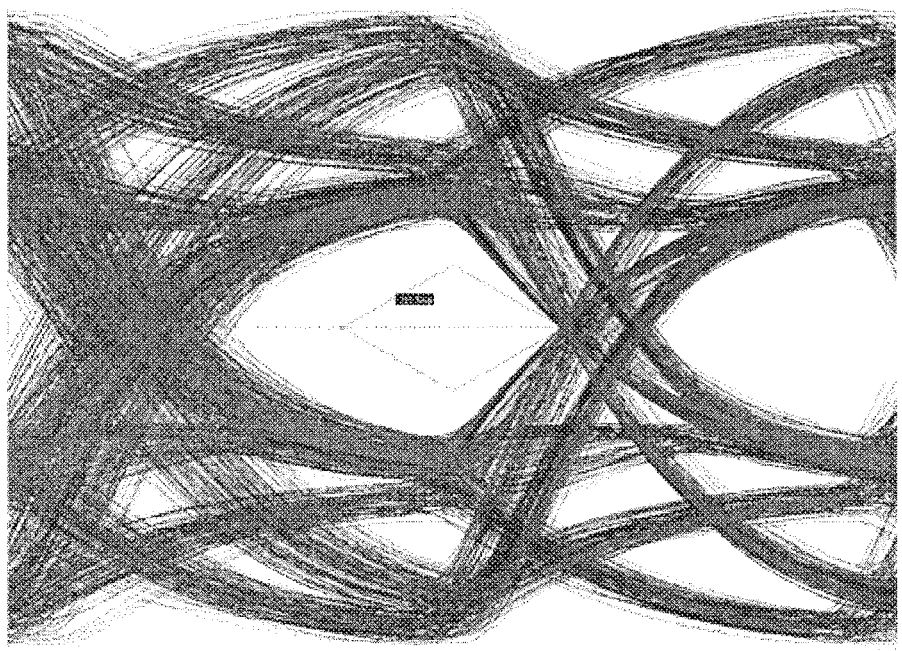
[ FIG. 17B ]
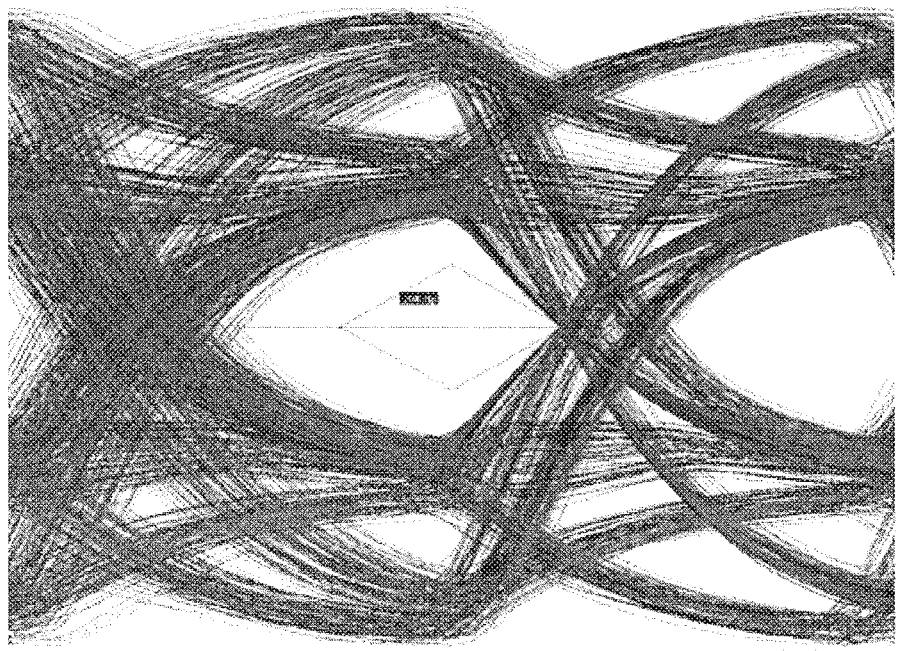

[ FIG. 18 ]
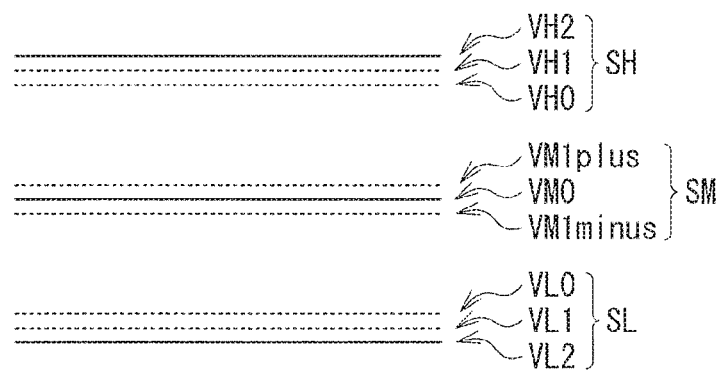

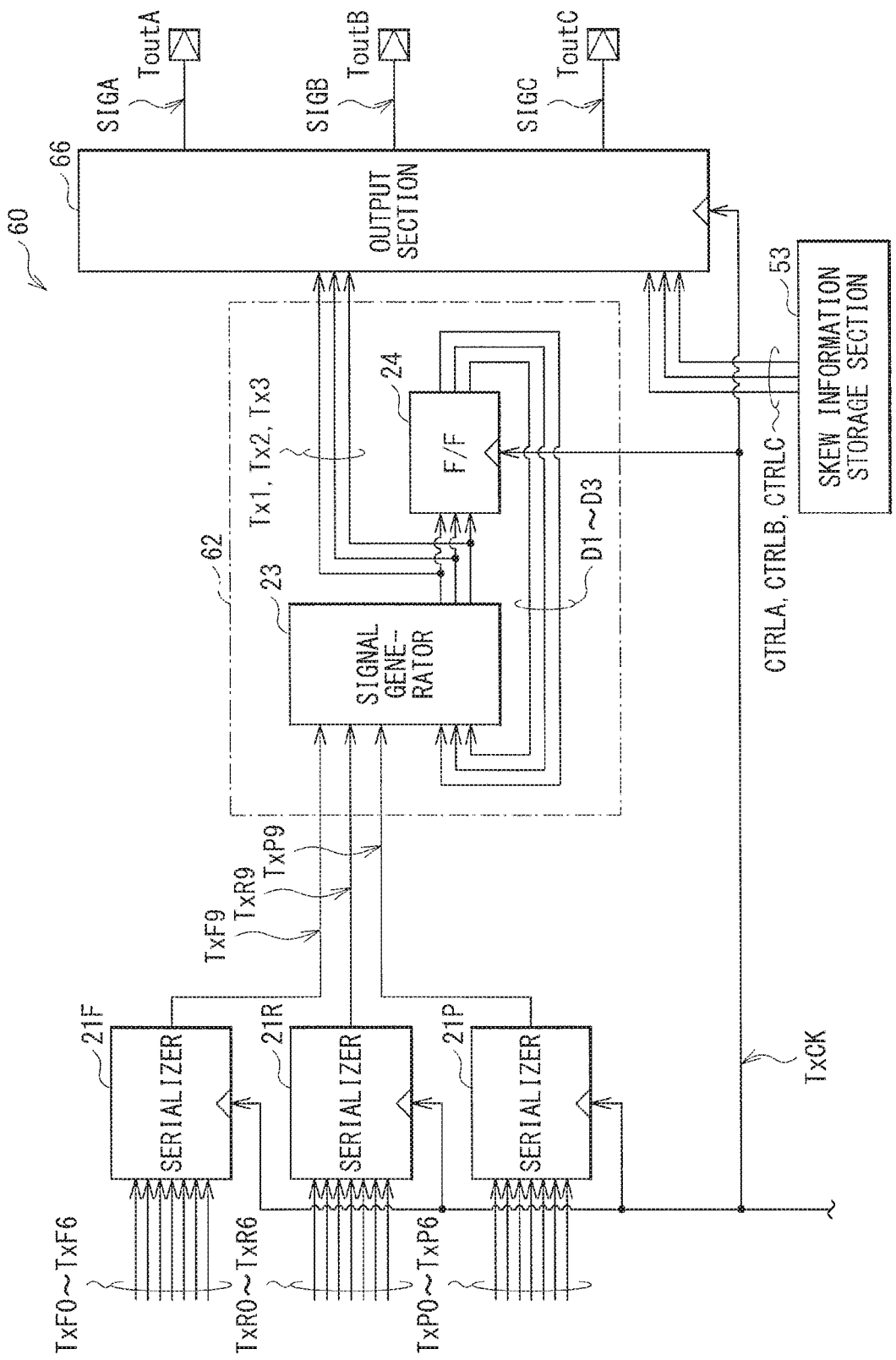
[ FIG. 19 ]

[ FIG. 20 ]
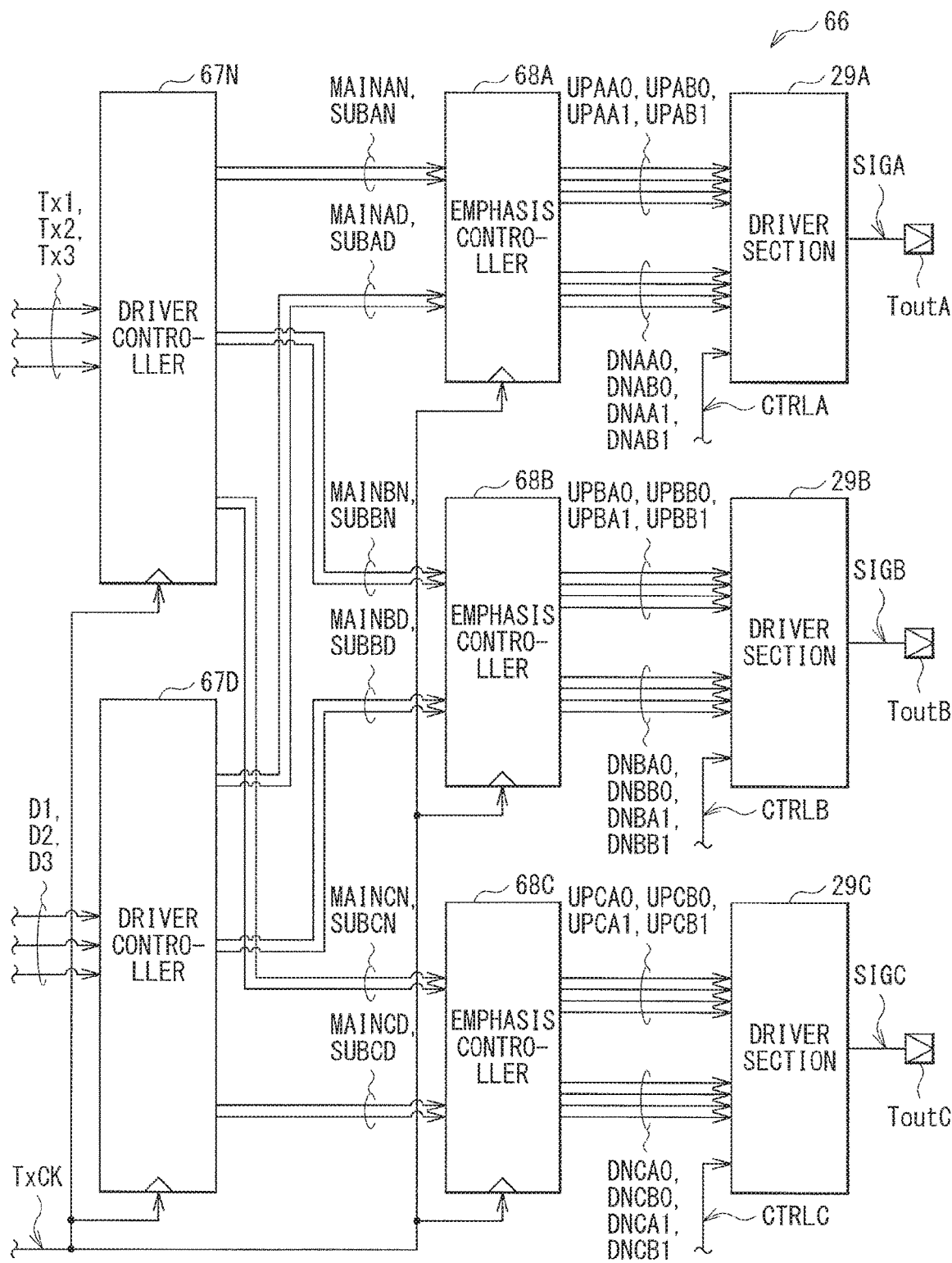

[ FIG. 21 ]

| INPUT | | | | OUTPUT | | | | | | | | SIGA |
|---|---|---|---|---|---|---|---|---|---|---|---|---|
| SIGNAL MAINAD | SIGNAL SUBAD | SIGNAL MAINAN | SIGNAL SUBAN | SIGNAL UPAA0 | SIGNAL UPAB0 | SIGNAL UPAA1 | SIGNAL UPAB1 | SIGNAL DNAA0 | SIGNAL DNAB0 | SIGNAL DNAA1 | SIGNAL DNAB1 | |
| 0 | 0 | 0 | 0 | 1 | 1 | 0 | 0 | 1 | 1 | 0 | 0 | VM0 |
| 1 | 1 | 0 | 0 | 1 | 1 | 0 | 0 | 1 | 1 | 0 | 0 | VM0 |
| 0 | 0 | 0 | 0 | 1 | 1 | 0 | 1 | 1 | 0 | 0 | 0 | VM1plus |
| 0 | 0 | 0 | 0 | 1 | 0 | 0 | 0 | 1 | 1 | 0 | 1 | VM1minus |
| 1 | 0 | 0 | 1 | 0 | 0 | 0 | 0 | 1 | 1 | 1 | 1 | VL2 |
| 0 | 0 | 0 | 1 | 0 | 1 | 0 | 0 | 1 | 1 | 1 | 0 | VL1 |
| 1 | 1 | 0 | 1 | 0 | 1 | 0 | 1 | 1 | 1 | 1 | 0 | VL1 |
| 0 | 1 | 1 | 0 | 1 | 1 | 1 | 1 | 1 | 0 | 1 | 0 | VL0 |
| 0 | 1 | 1 | 0 | 1 | 0 | 1 | 1 | 0 | 0 | 0 | 0 | VH2 |
| 0 | 0 | 1 | 0 | 1 | 0 | 1 | 1 | 0 | 0 | 0 | 0 | VH1 |
| 1 | 1 | 1 | 1 | 1 | 0 | 1 | 0 | 0 | 1 | 0 | 1 | VH1 |
| 1 | 1 | 1 | 1 | 1 | 1 | 0 | 0 | 1 | 1 | 0 | 1 | VH0 |
| 0 | 1 | 1 | 1 | 1 | 1 | 0 | 1 | 1 | 1 | 0 | 0 | VM0 |
| 1 | 0 | 1 | 1 | 1 | 1 | 0 | 0 | 0 | 1 | 0 | 0 | VM0 |
| 0 | 1 | 0 | 1 | 1 | 1 | 0 | 1 | 0 | 1 | 0 | 0 | VM1plus |
| 1 | 0 | 1 | 1 | 1 | 0 | 0 | 0 | 1 | 1 | 0 | 1 | VM1minus |

[ FIG. 22A ]
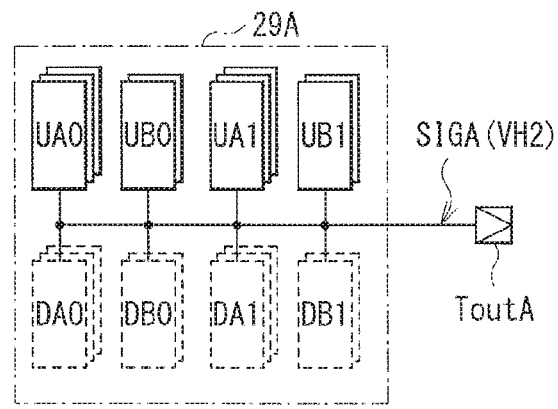
[ FIG. 22B ]
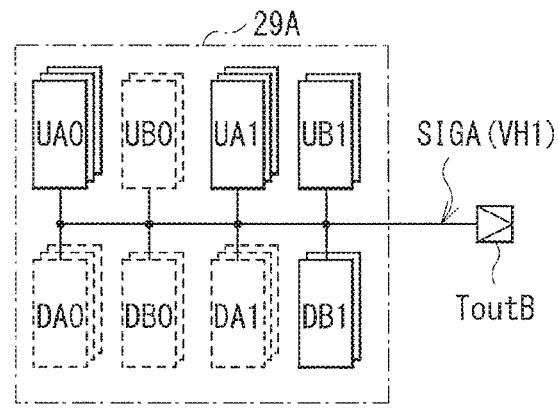
[ FIG. 22C ]
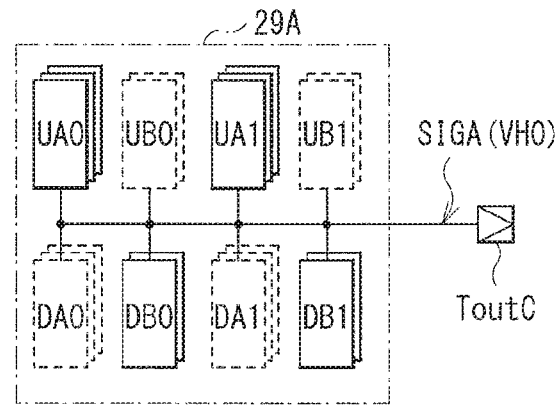

[ FIG. 23A ]
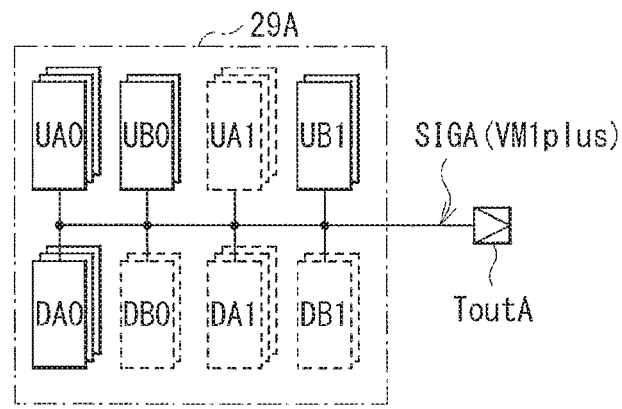
[ FIG. 23B ]
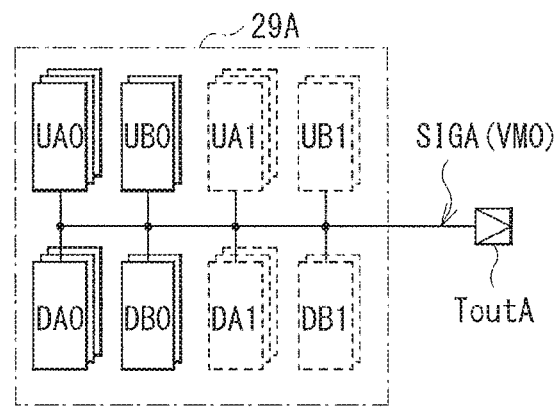
[ FIG. 23C ]
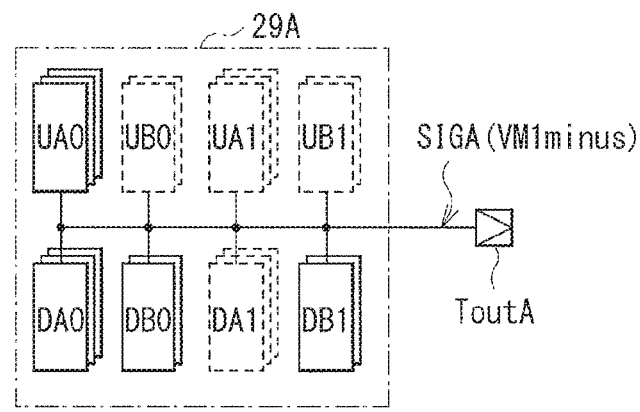

[ FIG. 24A ]
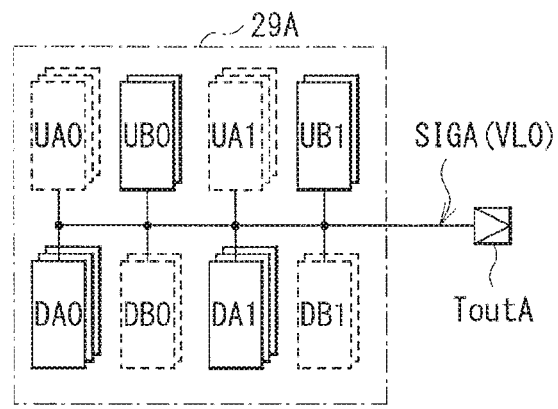
[ FIG. 24B ]
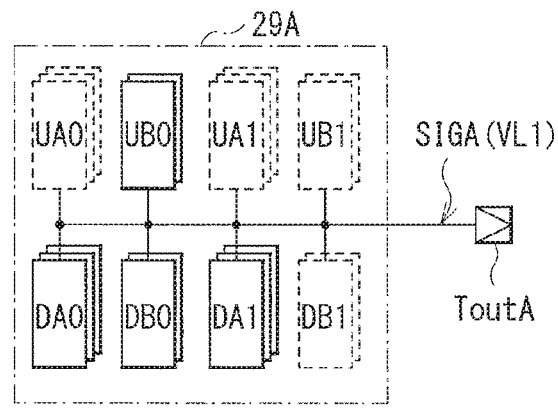
[ FIG. 24C ]
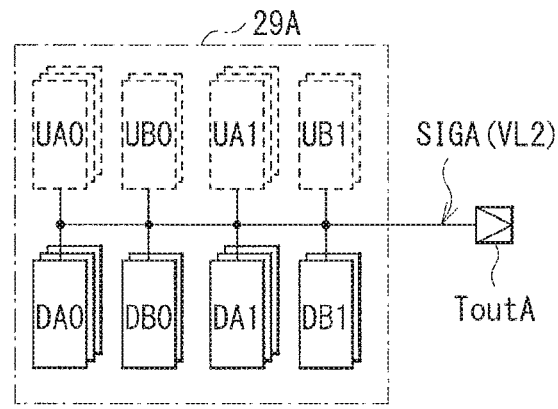

[ FIG. 25A ]
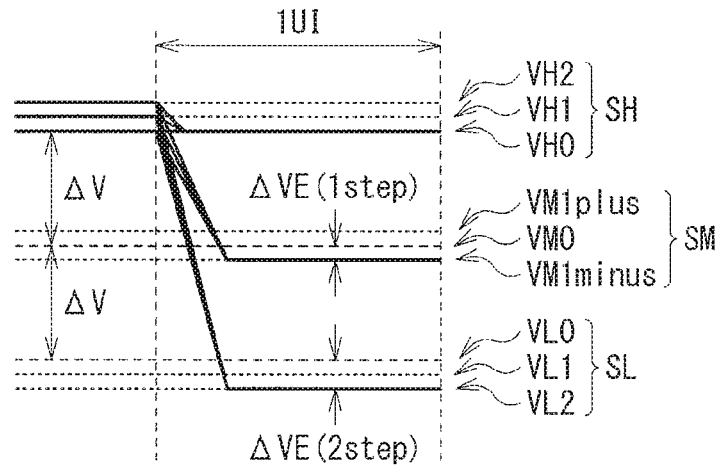
[ FIG. 25B ]
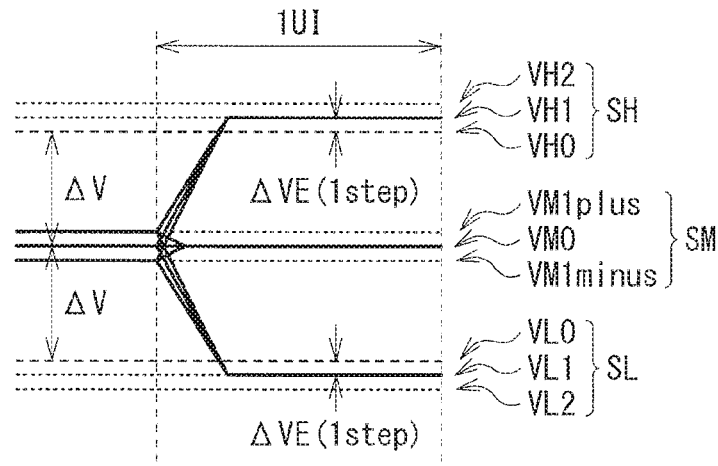
[ FIG. 25C ]
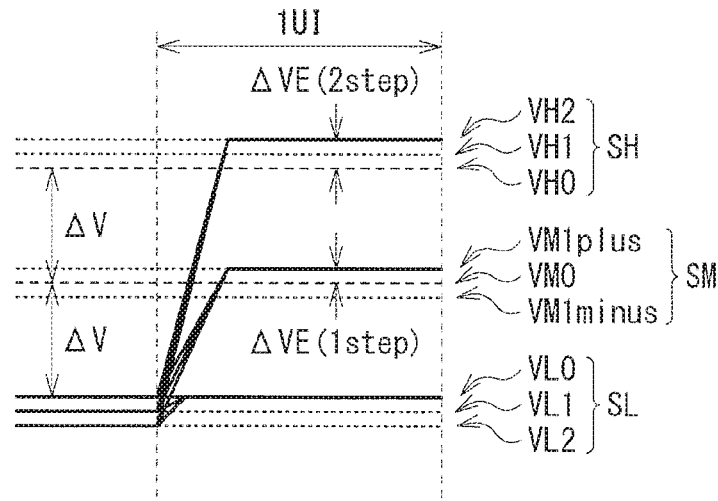

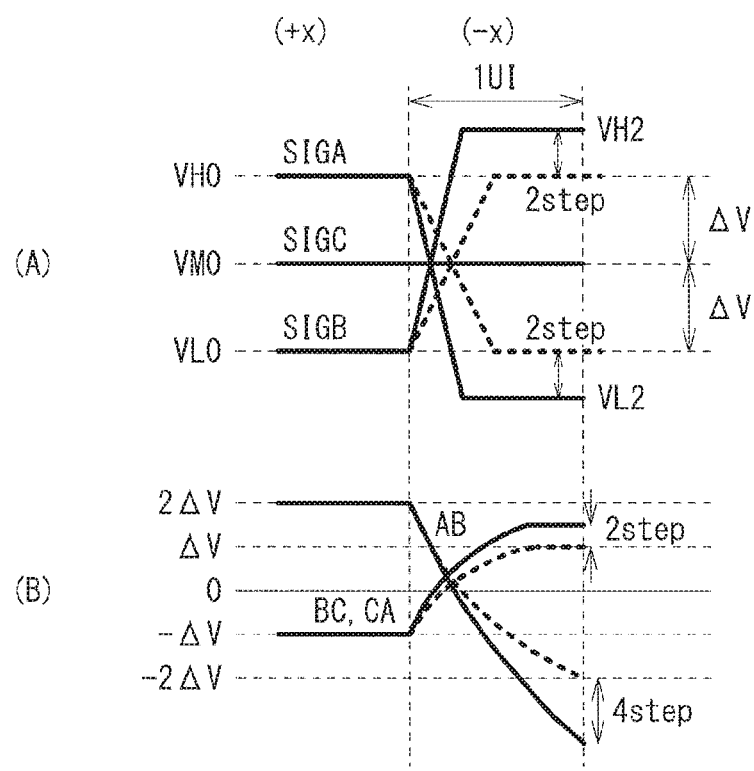
[ FIG. 26A ]

[ FIG. 26B ]
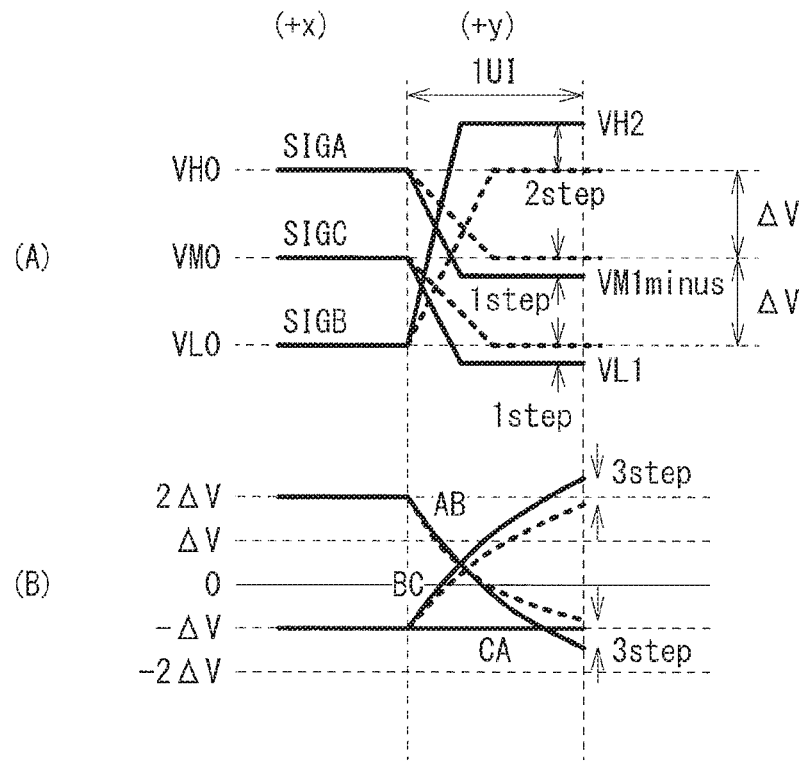
[ FIG. 26C ]
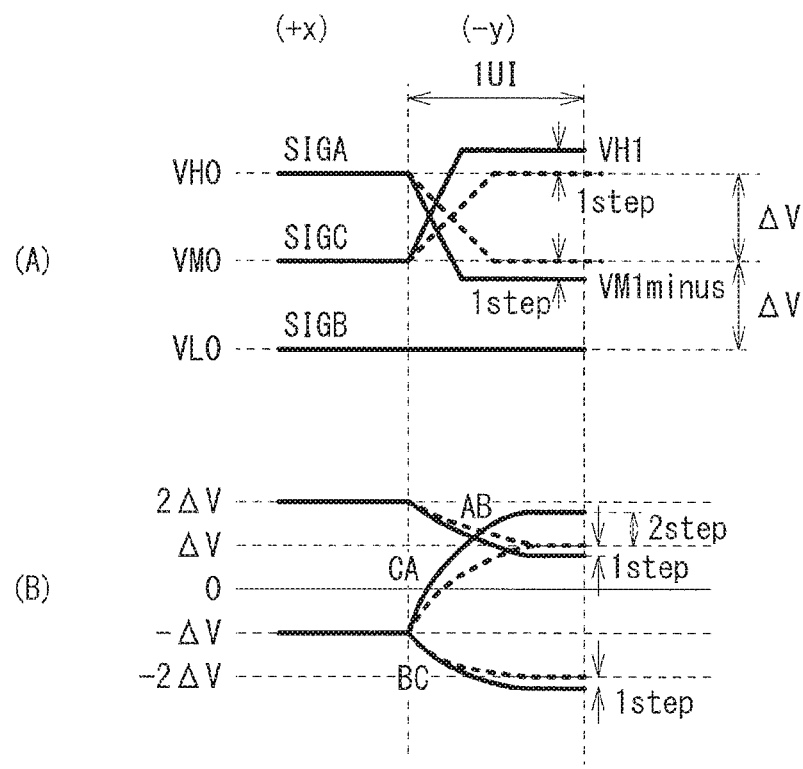

[FIG. 26D]
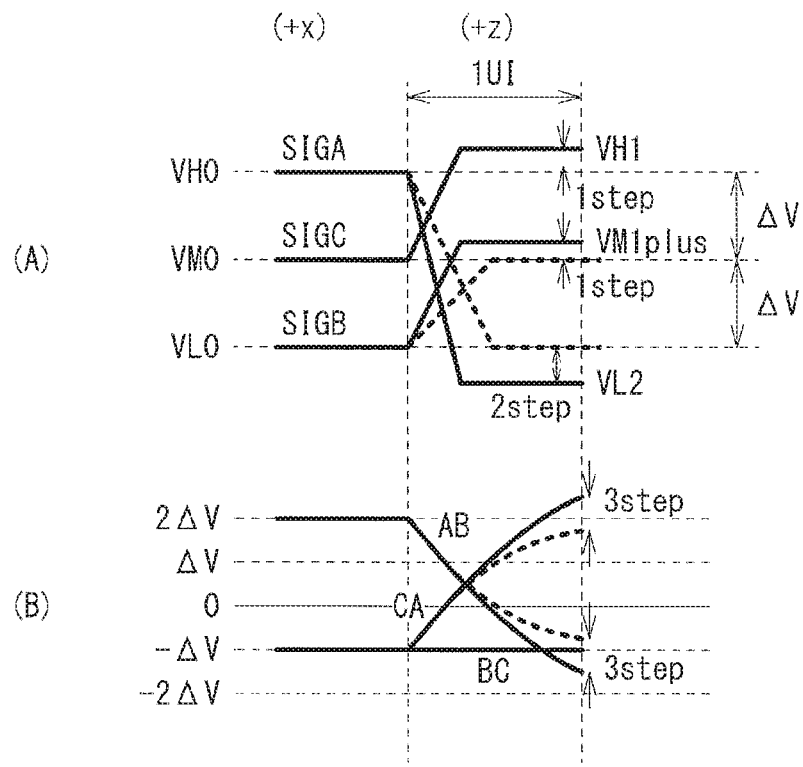
[FIG. 26E]
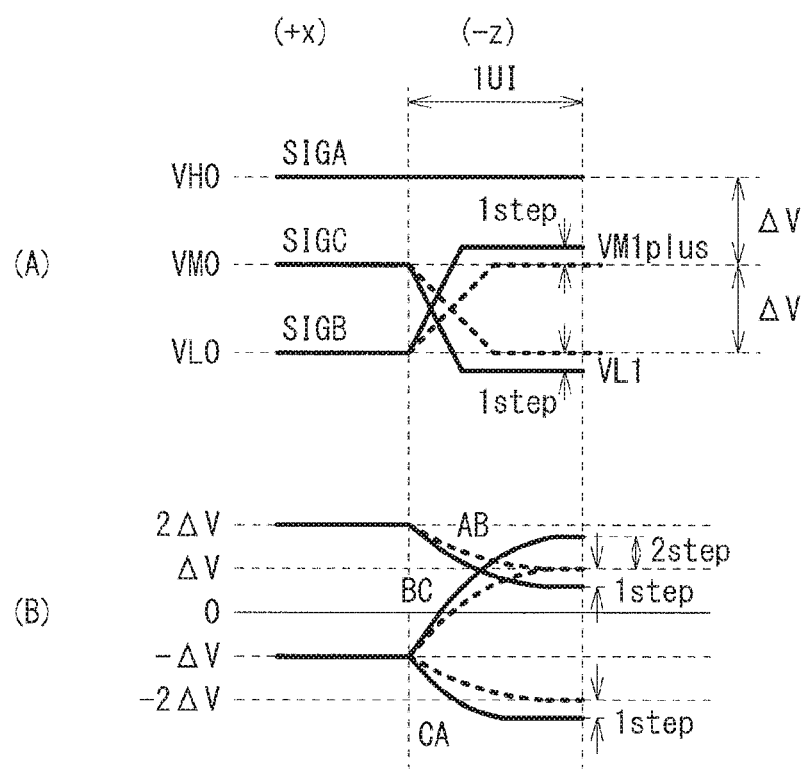

[FIG. 27]
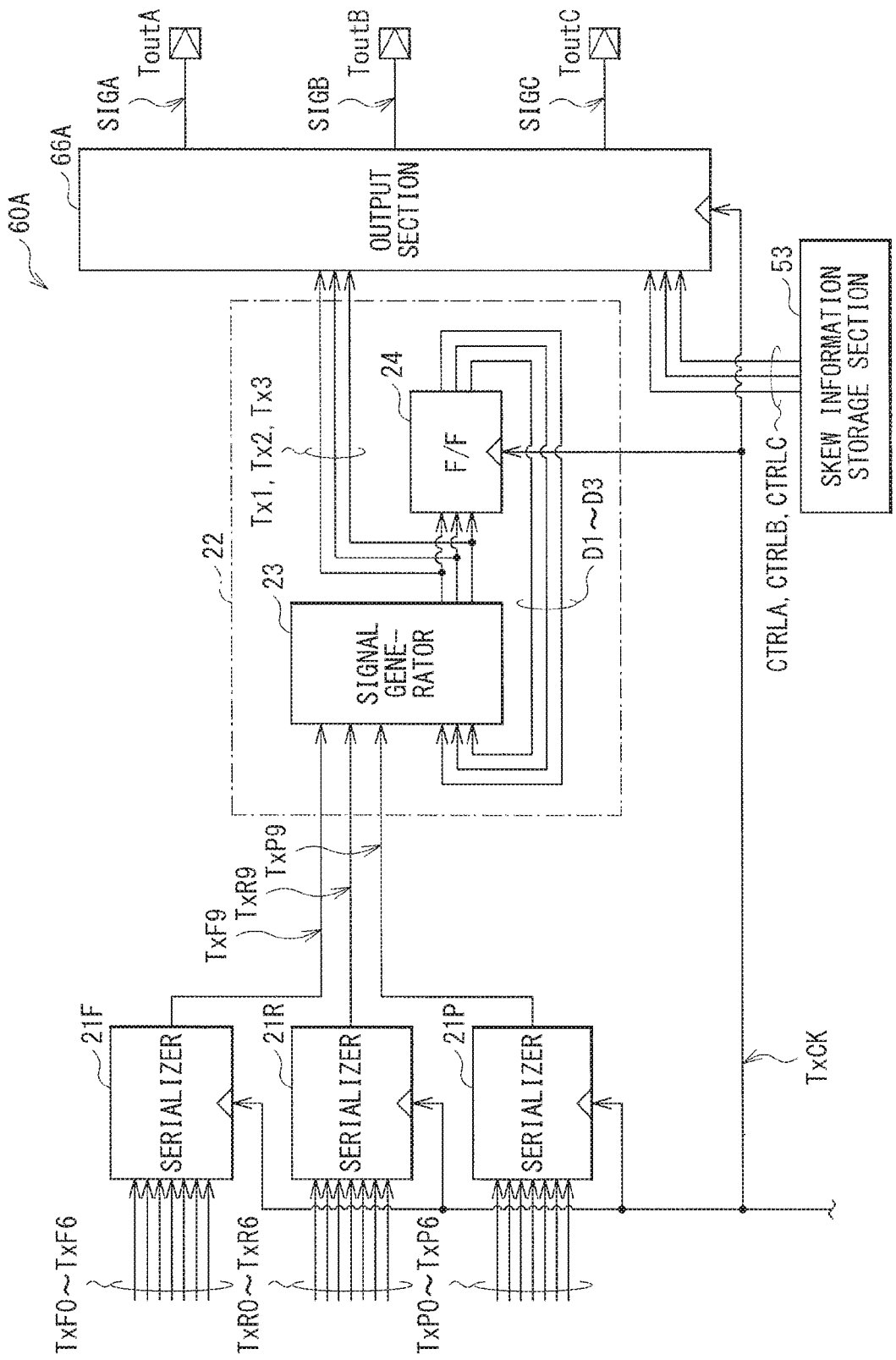

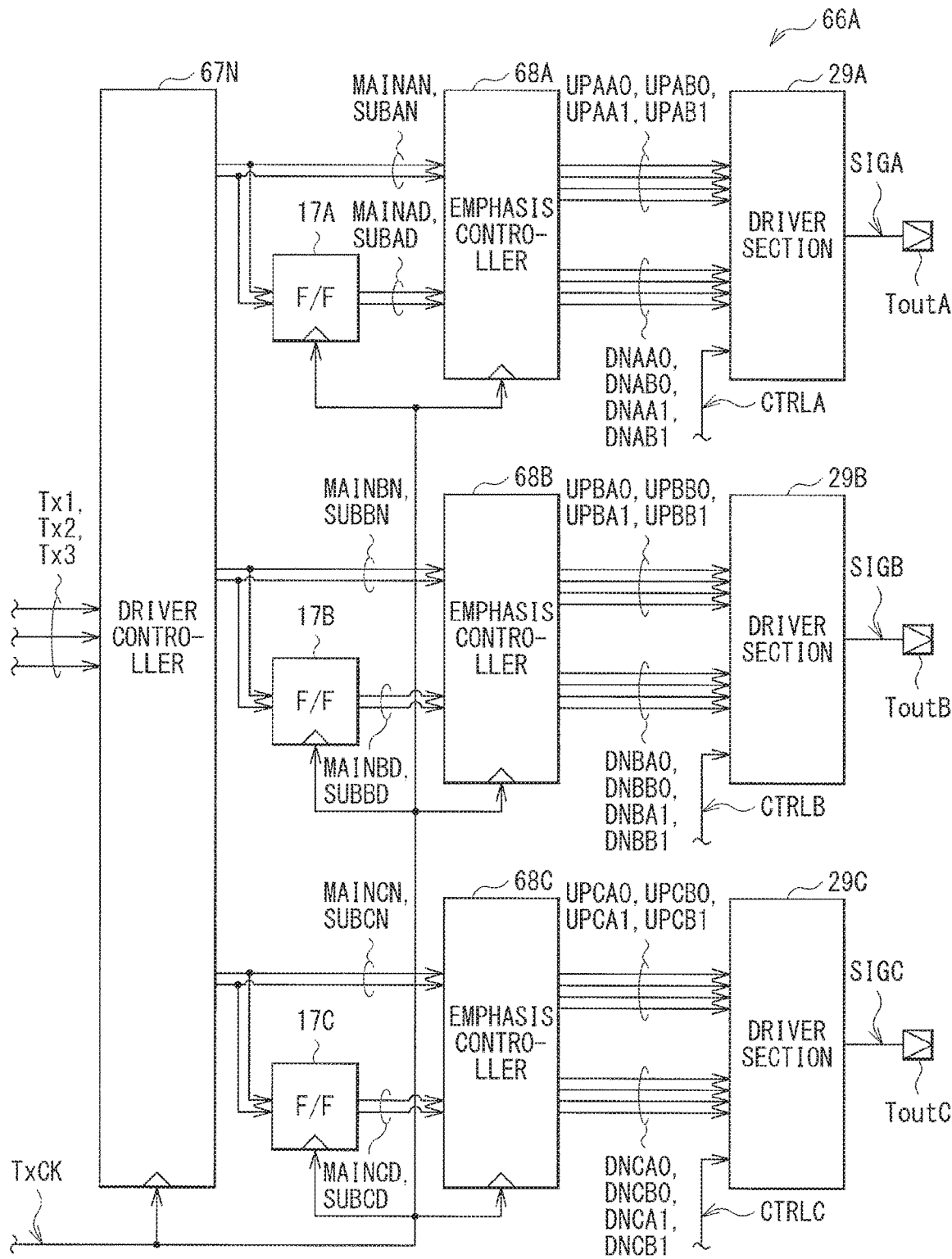
[ FIG. 28 ]

[ FIG. 29 ]
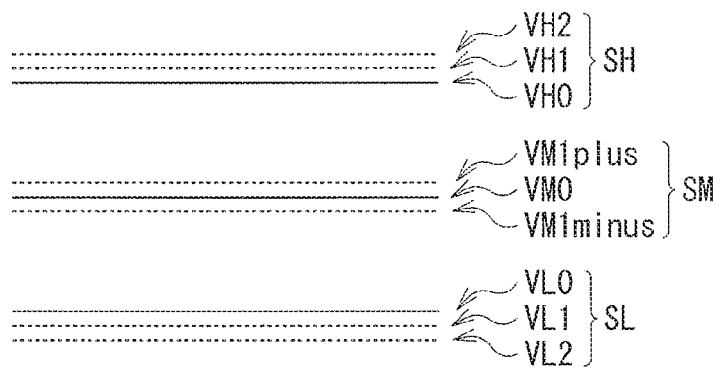
[ FIG. 30 ]
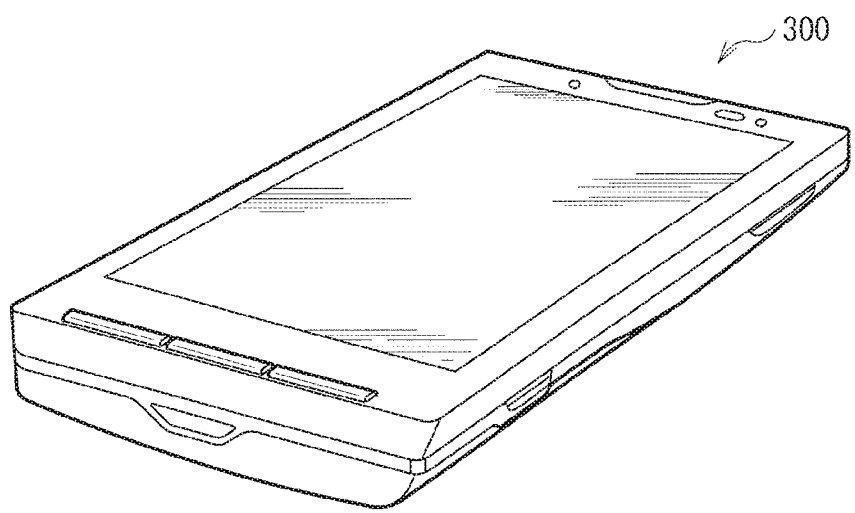

[FIG. 31]
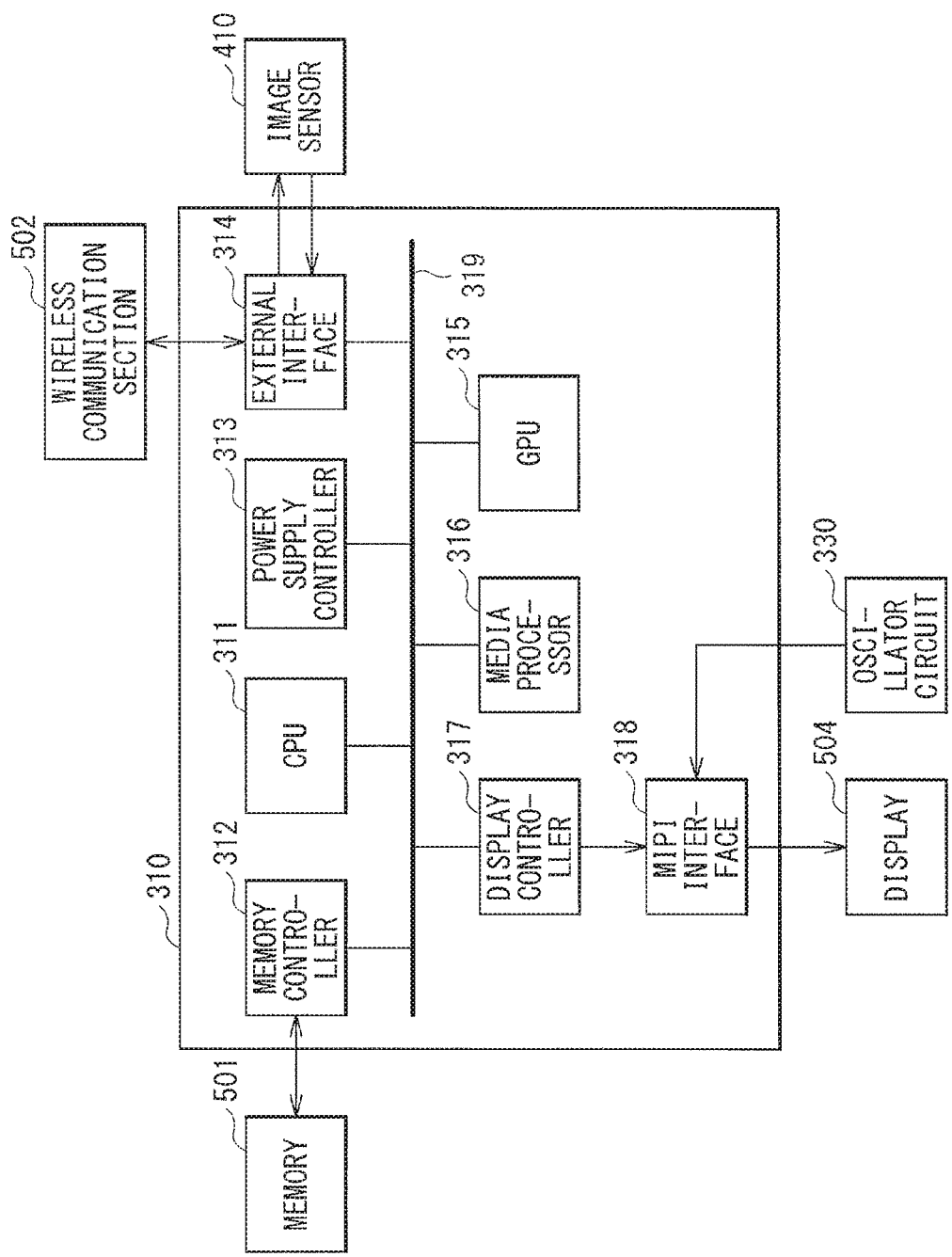

[ FIG. 32 ]
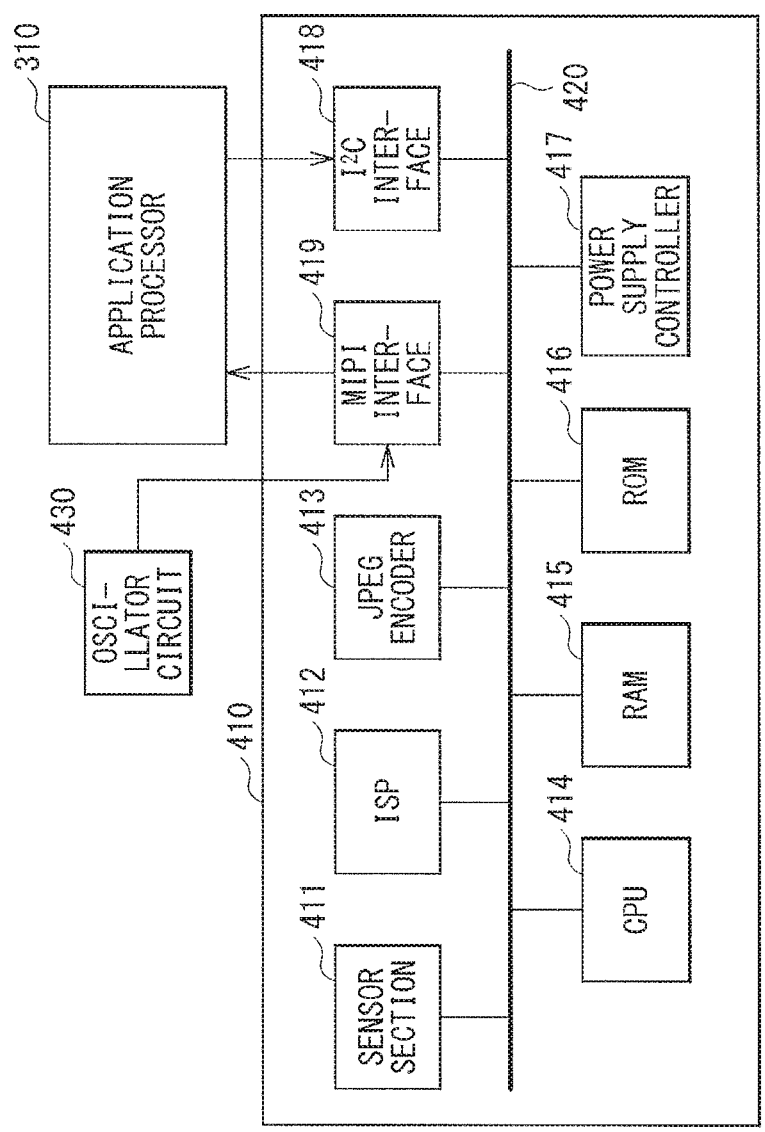

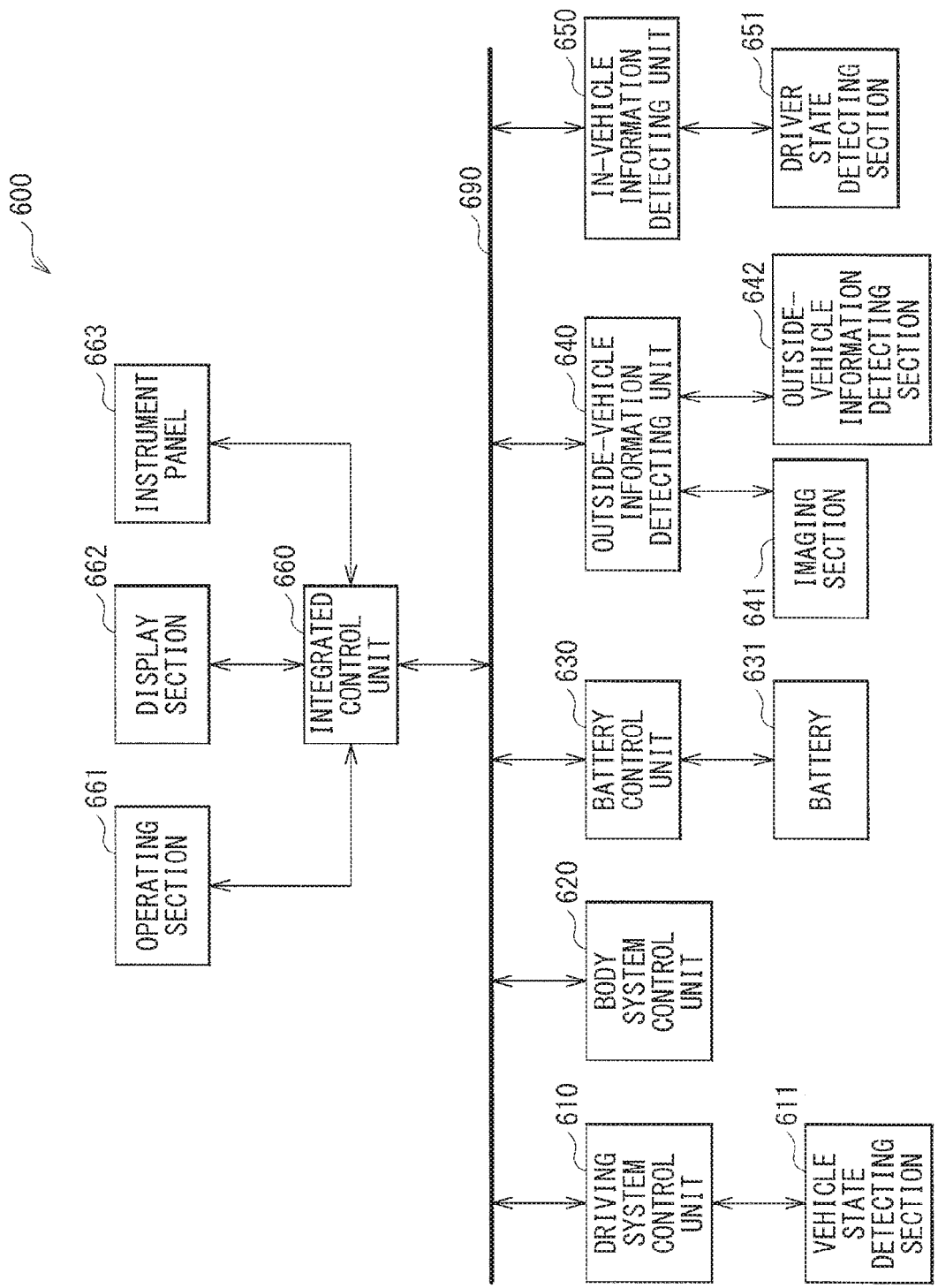
[FIG.33]

TRANSMISSION DEVICE, TRANSMISSION METHOD, AND COMMUNICATION SYSTEM

TECHNICAL FIELD

The disclosure relates to a transmission device that transmits a signal, a transmission method for use in such a transmission device, and a communication system including such a transmission device.

BACKGROUND ART

In association with high functionality and multi-functionality of electronic apparatuses in recent years, the electronic apparatuses are mounted with various devices such as a semiconductor chip, a sensor, and a display device. A lot of pieces of data are exchanged between these devices, and the amount of such data has been increased with higher functionality and increasing multi-functionality of the electronic apparatuses. Accordingly, the data are often exchanged with use of a high-speed interface. The high-speed interface is able to transmit and receive data at several Gbps, for example.

There have been disclosed various techniques in order to achieve improvement in communication performance in the high-speed interface. For example, PTL 1 and PTL 2 each disclose a communication system that transmits three differential signals using three transmission paths.

CITATION LIST

Patent Literature

PTL 1: Japanese Unexamined Patent Application Publication No. H06-261092
PTL 2: U.S. Pat. No. 8,064,535

SUMMARY OF THE INVENTION

As described above, a communication system is desired to have improved communication performance, and is expected to have further improved communication performance.

It is desirable to provide a transmission device, a transmission method, and a communication system that make it possible to enhance communication performance.

A transmission device according to an embodiment of the disclosure includes a plurality of driver sections and a controller. The plurality of driver sections are each configured to transmit a signal using a first voltage state, a second voltage state, and a third voltage state, and to be able to set a voltage in each of the voltage states. The third voltage state is a state between the first voltage state and the second voltage state. A controller causes the plurality of driver sections to perform emphasis by setting an emphasis voltage in each of the driver sections on the basis of skew information.

A transmission method according to an embodiment of the disclosure includes: causing a plurality of driver sections to each transmit a signal using a first voltage state, a second voltage state, and a third voltage state between the first voltage state and the second voltage state; and causing the plurality of driver sections to each perform emphasis by setting an emphasis voltage in each of the driver sections on the basis of skew information.

A communication system according to an embodiment of the disclosure includes a transmission device and a reception device. The transmission device includes a plurality of driver sections and a controller. The plurality of driver sections are each configured to transmit a signal using a first voltage state, a second voltage state, and a third voltage state, and to be able to set a voltage in each of the voltage states. The third voltage state is a state between the first voltage state and the second voltage state. A controller causes the plurality of driver sections to perform emphasis by setting an emphasis voltage in each of the driver sections on the basis of skew information.

In the transmission device, the transmission method, and the communication system according to the embodiments of the disclosure, each of the drivers transmits a signal using a first voltage state, a second voltage state, and a third voltage state. At this occasion, setting of the emphasis voltage in each of the driver sections causes the plurality of driver sections to each perform the emphasis. The emphasis voltage is set on the basis of the skew information.

According to the transmission device, the transmission method, and the communication system of the embodiments of the disclosure, the emphasis voltage in each of the driver sections is set on the basis of the skew information, thus making it possible to enhance the communication performance. It is to be noted that the effects described here are not necessarily limitative, and may have any of the effects described in the disclosure.

BRIEF DESCRIPTION OF DRAWINGS

FIG. 1 is a block diagram illustrating a configuration example of a communication system according to an embodiment of the disclosure.

FIG. 2 is an explanatory diagram illustrating voltage states of signals transmitted and received by a communication system according to a first embodiment.

FIG. 3 is an explanatory diagram illustrating voltage states of signals transmitted and received by the communication system illustrated in FIG. 1.

FIG. 4 is an explanatory diagram illustrating transition of symbols transmitted and received by the communication system illustrated in FIG. 1.

FIG. 5 is a block diagram illustrating a configuration example of a transmitter according to the first embodiment.

FIG. 6 illustrates an operation example of a transmission symbol generator illustrated in FIG. 5.

FIG. 7 is a block diagram illustrating a configuration example of an output section illustrated in FIG. 5.

FIG. 8 is a timing waveform chart illustrating an operation example of a timing controller illustrated in FIG. 7. [FIG. 9] FIG. 9 is a block diagram illustrating a configuration example of a driver section illustrated in FIG. 7.

FIG. 10 is a table illustrating an operation example of an emphasis controller illustrated in FIG. 7.

FIG. 11A is a schematic view of an operation example of the driver section illustrated in FIG. 9.

FIG. 11B is a schematic view of another operation example of the driver section illustrated in FIG. 9.

FIG. 11C is a schematic view of another operation example of the driver section illustrated in FIG. 9.

FIG. 12 is a block diagram illustrating a configuration example of a receiver illustrated in FIG. 1.

FIG. 13 is an explanatory diagram illustrating an example of a receiving operation of the receiver illustrated in FIG. 12.

FIG. 14 is an eye diagram schematically illustrating a characteristic example of the communication system illustrated in FIG. 1.

FIG. 15A is a timing waveform chart illustrating an operation example of the communication system according to the first embodiment.

FIG. 15B is a timing waveform chart illustrating another operation example of the communication system according to the first embodiment.

FIG. 15C is a timing waveform chart illustrating another operation example of the communication system according to the first embodiment.

FIG. 15D is a timing waveform chart illustrating another operation example of the communication system according to the first embodiment.

FIG. 15E is another timing waveform chart illustrating another operation example of the communication system according to the first embodiment.

FIG. 16A is a timing waveform chart illustrating an operation example of the communication system according to the first embodiment in a case where there is skew.

FIG. 169 is a timing waveform chart illustrating another operation example of the communication system according to the first embodiment in a case where there is skew.

FIG. 17A is an eye diagram illustrating a characteristic example of a communication system in a case where an emphasis voltage is set on the basis of skew information.

FIG. 17B is an eye diagram illustrating a characteristic example of a communication system in a case where an emphasis voltage is fixed.

FIG. 18 is an explanatory diagram illustrating voltage states of signals transmitted and received by a communication system according to a second embodiment.

FIG. 19 is a block diagram illustrating a configuration example of a transmitter according to the second embodiment.

FIG. 20 is a block diagram illustrating a configuration example of an output section illustrated in FIG. 19.

FIG. 21 is a table illustrating an operation example of an emphasis controller illustrated in FIG. 20.

FIG. 22A is a schematic view of an operation example of a driver section illustrated in FIG. 20.

FIG. 22B is a schematic view of another operation example of the driver section illustrated in FIG. 20.

FIG. 22C is a schematic view of another operation example of the driver section illustrated in FIG. 20.

FIG. 23A is a schematic view of another operation example of the driver section illustrated in FIG. 20.

FIG. 23B is a schematic view of another operation example of the driver section illustrated in FIG. 20, FIG. 23C is a schematic view of another operation example of the driver section illustrated in FIG. 20.

FIG. 24A is a schematic view of another operation example of the driver section illustrated in FIG. 20.

FIG. 24B is a schematic view of another operation example of the driver section illustrated in FIG. 20.

FIG. 24C is a schematic view of another operation example of the driver section illustrated in FIG. 20.

FIG. 25A is a timing waveform chart illustrating an operation example of the output section illustrated in FIG. 20.

FIG. 25B is a timing waveform chart illustrating another operation example of the output section illustrated in FIG. 20.

FIG. 25C is a timing waveform chart illustrating another operation example of the output section illustrated in FIG. 20.

FIG. 26A is a timing waveform chart illustrating an operation Example of the communication system according to the second embodiment.

FIG. 26B is a timing waveform chart illustrating another operation example of the communication system according to the second embodiment.

FIG. 26C is a timing waveform chart illustrating another operation example of the communication system according to the second embodiment.

FIG. 26D is a timing waveform chart illustrating another operation example of the communication system according to the second embodiment.

FIG. 26E is a timing waveform chart illustrating another operation example of the communication system according to the second embodiment.

FIG. 27 is a block diagram illustrating a configuration example of a transmitter according to a modification example.

FIG. 28 is a block diagram illustrating a configuration example of an output section illustrated in FIG. 27.

FIG. 29 is an explanatory diagram illustrating voltage states of signals transmitted and received by a communication system according to another modification example.

FIG. 30 is a perspective view of an appearance configuration of a smartphone to which the communication system according to an embodiment is applied.

FIG. 31 is a block diagram illustrating a configuration example of an application processor to which the communication system according to an embodiment is applied.

FIG. 32 is a block diagram illustrating a configuration example of an image sensor to which the communication system according to an embodiment is applied.

FIG. 33 is a block diagram illustrating a configuration example of a vehicle control system to which the communication system according to an embodiment is applied.

MODES FOR CARRYING OUT THE INVENTION

Hereinafter, some embodiments of the disclosure are described in detail with reference to drawings. It is to be noted that the description is given in the following order.
1. First Embodiment
2. Second Embodiment
3. Application Examples

1. FIRST EMBODIMENT

Configuration Example

FIG. 1 illustrates a configuration example of a communication system (a communication system 1) according to a first embodiment. The communication system 1 transmits a signal using three lines, and is directed to achieving improvement in communication performance by means of pre-emphasis.

The communication system 1 includes a transmission device 10, a transmission path 100, and a reception device 30. The transmission device 10 includes three output terminals ToutA, ToutB, and ToutC. The transmission path 100 includes lines 110A, 110B, and 110C. The reception device 30 includes three input terminals TinA, TinB, and TinC. The output terminal ToutA of the transmission device 10 and the input terminal TinA of the reception device 30 are coupled to each other via the line 110A. The output terminal ToutB of the transmission device 10 and the input terminal TinB of the reception device 30 are coupled to each other via the line 110B. The output terminal ToutC of the transmission device 10 and the input terminal TinC of the reception device 30 are coupled to each other via the line 1100. Each of characteristic impedances of the lines 110A to 110C is about 50[Ω] in this example.

The transmission device 10 outputs a signal SIGA, a signal SIGB, and a signal SIGC, respectively, from the output terminal ToutA, the output terminal ToutB, and the output terminal ToutC. The reception device 30 receives the signal SIGA, the signal SIGB, and the signal SIGC, respectively, via the input terminal TinA, the input terminal TinB, and the input terminal TinC. The signals SIGA, SIGB, and SIGC may each have three voltage states SH, SM, and SL.

FIG. 2 illustrates the three voltage states SH, SM, and SL. The voltage state SH is a state corresponding to two high-level voltages VH (VH0 and VHminus). The high-level voltage VH0 is a high-level voltage in a case where no pre-emphasis operation is performed. The high-level voltage VHminus is a voltage lower than the high-level voltage VH0 by a predetermined voltage (an emphasis voltage ΔVE). The voltage state SM is a state corresponding to three medium-level voltages VM (VM0, VMplus, and VMminus). The medium-level voltage VM0 is a medium-level voltage in a case where no pre-emphasis operation is performed. The medium-level voltage VMplus is a voltage higher than the medium-level voltage VM0 by the emphasis voltage ΔVE. The medium-level voltage VMminus is a voltage lower than the medium-level voltage VM0 by the emphasis voltage ΔVE. The voltage state SL is a state corresponding to two low-level voltages VL (VL0 and VLplus). The low-level voltage VL0 is a low-level voltage in a case where no pre-emphasis operation is performed. The low-level voltage VLplus is a voltage higher than the low-level voltage VL0 by the emphasis voltage ΔVE.

FIG. 3 illustrates voltage states of each of the signals SIGA, SIGB, and SIGC. The transmission device 10 uses the three signals SIGA, SIGB, and SIGC to transmit six symbols "+x", "−x", "+y", "−y", "+z", and "−z". For example, in a case of transmitting the symbol "+x", the transmission device 10 brings the signal SIGA, the signal SIGB, and the signal SIGC, respectively, into the voltage state SH, the voltage state SL, and the voltage state SM. In a case of transmitting the symbol "−x", the transmission device 10 brings the signal SIGA, the signal SIGB, and the signal SIGC, respectively, into the voltage state SL, the voltage state SH, and the voltage state SM. In a case of transmitting the symbol "+y", the transmission device 10 brings the signal SIGA, the signal SIGB, and the signal SIGC, respectively, into the voltage state SM, the voltage state SH, and the voltage state SL. In a case of transmitting the symbol "−y", the transmission device 10 brings the signal SIGA, the signal SIGB, and the signal SIGC, respectively, into the voltage state SM, the voltage state SL, and the voltage state SH. In a case of transmitting the symbol "+z", the transmission device 10 brings the signal SIGA, the signal SIGB, and the signal SIGC, respectively, into the voltage state SL, the voltage state SM, and the voltage state SH. In a case of transmitting the symbol "−z", the transmission device 10 brings the signal SIGA, the signal SIGB, and the signal SIGC, respectively, into the voltage state SH, the voltage state SM, and the voltage state SL.

The transmission path 100 uses such signals SIGA, SIGB, and SIGC to transmit a sequence of a symbol. In other words, the three lines 110A, 110B, and 110C function as one lane through which the sequence of the symbol is transmitted.

The communication system 1 transmits the signals SIGA, SIGB, and SIGC to the reception device 30 via the transmission path 100. In this situation, it is possible for the transmission device 10 to enhance a waveform quality by performing the pre-emphasis operation, for example, in a case where the transmission path 100 has a long distance. Further, the transmission device 10 also has a function of setting the emphasis voltage ΔVE on the basis of skew information INF, as described later. That is, typically, in a case of transmitting a signal using a plurality of lines, there is a possibility that skew may occur depending on difference in line lengths of respective lines, difference in characteristic impedances of the respective lines. It is possible for the communication system 1 to reduce an influence of the skew on communication performance by setting the emphasis voltage ΔVE on the basis of the skew information INF.

(Transmission Device 10)

As illustrated in FIG. 1, the transmission device 10 includes a clock generator 11, a processor 12, and a transmitter 20.

The clock generator 11 generates a clock signal TxCK. The clock signal TxCK has a frequency of 2.5 [GHz], for example. It is to be noted that the clock signal TxCK, not limited thereto, may also have a frequency of 1.25 [GHz], for example, in a case of using a so-called half rate architecture to configure a circuit in the transmission device 10. The clock generator 11 includes, for example, a phase-locked loop (PLL), and generates the clock signal TxCK on the basis of a reference clock (unillustrated) to be supplied from the outside of the transmission device 10, for example. Further, the clock generator 11 supplies the clock signal TxCK to the processor 12 and the transmitter 20.

The processor 12 generates transition signals TxF0 to TxF6, TxR0 to TxR6, and TxP0 to TxP6 by performing a predetermined processing. Here, a set of transition signals TxF0, TxR0, and TxP0 indicates a symbol transition in a sequence of a symbol to be transmitted by the transmission device 10. Likewise, a set of transition signals TxF1, TxR1, and TxP1 indicates a symbol transition, a set of transition signals TxF2, TxR2, and TxP2 indicates a symbol transition, a set of transition signals TxF3, TxR3, and TxP3 indicates a symbol transition, a set of transition signals TxF4, TxR4, and TxP4 indicates a symbol transition, a set of transition signals TxF5, TxR5, and TxP5 indicates a symbol transition, and a set of transition signals TxF6, TxR6, and TxP6 indicates a symbol transition. In other words, the processor 12 generates seven sets of transition signals. In the following, transition signals TxF, TxR, and TxP are used as appropriate to represent any set among the seven sets of transition signals.

FIG. 4 illustrates a relationship between the transition signals TxF, TxR, and TxP and the symbol transition. A three-digit numerical value assigned to each transition indicates values of the transition signals TxF, TxR, and TxP in this order.

The transition signal TxF (Flip) causes the symbol to transition between "+x" and "−x", causes the symbol to transition between "+y" and "−y", and causes the symbol to transition between "+z" and "−z". Specifically, in a case where the transition signal TxF is "1", the symbol is caused to transition to change a polarity thereof (e.g., from "+x" to "−x"). In a case where the transition signal TxF is "0", such a transition is not performed.

In a case where the transition signal TxF is "0", the transition signals TxR (Rotation) and TxP (Polarity) cause the symbol to transition between "+x" and those other than "−x", between "+y" and those other than "−y", and between "+z" and those other than "−z". Specifically, in a case where the transition signals TxR and TxP are, respectively, "1" and "0", the symbol, while keeping the polarity, is caused to transition clockwise (e.g., from "+x" to "+y") in FIG. 3. In a case where the transition signals TxR and TxP are, respectively, "1" and "1", the symbol is caused to change the polarity and also transition clockwise (e.g., from "+x" to "−y") in FIG. 3. In addition, in a case where the transition signals TxR and TxP are, respectively, "0" and "0", the symbol, while keeping the polarity, is caused to transition counterclockwise (e.g., from "+x" to "−z") in FIG. 3. In a case where the transition signals TxR and TxP are, respectively, "0" and "1", the symbol is caused to change the polarity and also transition counterclockwise (e.g., from "+x" to "−z") in FIG. 3.

The processor 12 generates seven sets of such transition signals TxF, TxR, and TxP. Further, the processor 12 supplies these seven sets of transition signals TxF, TxR, and TxP (transition signals TxF0 to TxF6, TxR0 to TxR6, and TxP0 to TxP6) to the transmitter 20.

The transmitter 20 generates the signals SIGA, SIGB, and SIGC on the basis of the transition signals TxF0 to TxF6, TxR0 to TxR6, and TxP0 to TxP6.

FIG. 5 illustrates a configuration example of the transmitter 20. The transmitter 20 includes serializers 21F, 21R, and 21P, a transmission symbol generator 22, a skew information storage section 13, a transition detector 25, and an output section 26.

The serializer 21F generates a transition signal TxF9 by serializing the transition signals TxF0 to TxF6 in this order on the basis of the transition signals TxF0 to TxF6 and the clock signal TxCK. The serializer 21R generates a transition signal TxR9 by serializing the transition signals TxR0 to TxR6 in this order on the basis of the transition signals TxR0 to TxR6 and the clock signal TxCK. The serializer 21P generates a transition signal TxP9 by serializing the transition signals TxP0 to TxP6 in this order on the basis of the transition signals TxP0 to TxP6 and the clock signal TxCK.

The transmission symbol generator 22 generates symbol signals Tx1, Tx2, and Tx3 on the basis of the transition signals TxF9, TxR9, and TxP9 and the clock signal TxCK. The transmission symbol generator 22 includes a signal generator 23 and a flip-flop 24.

The signal generator 23 generates the symbol signals Tx1, Tx2, and Tx3 that are related to a current symbol NS, on the basis of the transition signals TxF9, TxR9, and TxP9 and symbol signals D1, D2, and D3. Specifically, the signal generator 23, on the basis of a symbol indicated by the symbol signals D1, D2, and D3 (a symbol DS before the current symbol NS) and the transition signals TxF9, TxR9, and TxP9, determines the current symbol NS as illustrated in FIG. 4, and outputs the determined current symbol NS as the symbol signals Tx1, Tx2, and Tx3.

The flip-flop 24 performs sampling of the symbol signals Tx1, Tx2, and Tx3 on the basis of the clock signal TxCK, and outputs results of the sampling, respectively, as the symbol signals D1 D2, and D3.

FIG. 6 illustrates an operation example of the transmission symbol generator 22. This FIG. 6 illustrates the symbol NS to be generated on the basis of the symbol DS indicated by the symbol signals D1, D2, and D3 and the transition signals TxF9, TxR9, and TxP9. A case where the symbol DS is "+x" is described by way of example. In a case where the transition signals TxF9, TxR9, and TxP9 are "000", the symbol NS is "+z". In a case where the transition signals TxF9, TxR9, and TxP9 are "001", the symbol NS is "−z". In a case where the transition signals TxF9, TxR9, and TxP9 are "010", the symbol NS is "+y". In a case where transition signals TxF9, TxR9, and TxP9 are "011", the symbol NS is "−y". In a case where the transition signals TxF9. TxR9, and TxP9 are "1xx", the symbol NS is "−x". Here, "x" indicates that any one of "1" and "0" may be adopted. The same holds true also for a case where the symbol DS is any of "−x", "+y", "−y", "+z", and "−z".

The skew information storage section 13 stores the skew information INF. The skew information INF includes information on delay time in each of the lines 110A, 110B, and 110C of the transmission path 100, for example. The skew information storage section 13 includes, for example, a register, etc. The skew information storage section 13 is supplied with the skew information INF in advance from the outside of the transmission device 10, for example, and stores the skew information INF. Further, the skew information storage section 13 supplies this skew information INF to the transition detector 25.

The transition detector 25 generates emphasis control signals MUP, MDN, and CTRL on the basis of the transition signals TxF9, TxR9, and TxP9, the symbol signals D1, D2, and D3, and the skew information INF.

Specifically, as indicated by WUP encircled by solid lines in FIG. 6, in a case where the transition signals TxF9, TxR9, and TxP9 are "000" and where the symbol DS indicated by the symbol signals D1, D2, and D3 is "+x", "+y", or "+z", and in a case where the transition signals TxF9, TxR9, and TxP9 are "010" and where the symbol DS indicated by the symbol signals D1, D2, and D3 is "−x", "−y", or "−z", the transition detector 25 sets the emphasis control signal MUP to "1" (active), and sets the emphasis control signal MDN to "0" (non-active). This causes the output section 26 to set a voltage in the voltage state SM to the medium-level voltage VMplus that is higher than the medium-level voltage VM0 by the emphasis voltage ΔVE, to set a voltage in the voltage state SH to the high-level voltage VHminus that is lower than the high-level voltage VH0 by the emphasis voltage ΔVE, and to set a voltage in the voltage state SL to the low-level voltage VL, as described later.

Further, as indicated by WDN encircled by broken lines in FIG. 5, in a case where the transition signals TxF9, TxR9, and TxP9 are "000" and where the symbol DS indicated by the symbol signals D1, D2, and D3 is "−x", "−y", or "−z", and in a case where the transition signals TxF9, TxR9, and TxP9 are "010" and where the symbol DS indicated by the symbol signals D1, D2, and D3 is "+x", "+y", or "+z", the transition detector 25 sets the emphasis control signal MDN to "1" (active), and sets the emphasis control signal MUP to "0" (non-active). This causes the output section 26 to set the voltage in the voltage state SM to the medium-level voltage VMminus that is lower than the medium-level voltage VM0 by the emphasis voltage ΔVE, to set the voltage in the voltage state SH to the high-level voltage VH0, and to set the voltage in the voltage state SL to the low-level voltage VLplus that is higher than the low-level voltage VL0 by the emphasis voltage ΔVE, as described later.

Furthermore, in cases other than those described above, the transition detector 25 sets both the emphasis control signals MUP and MDN to "0" (non-active). This causes the output section 26 to set the voltage in the voltage state SM to the medium-level voltage VM0, to set the voltage in the voltage state SH to the high-level voltage VH0, and to set the voltage in the voltage state SL to the low-level voltage VL0, as described later.

That is, as described later, in a case where the transition signals TxF9, TxR9, and TxP9 are "000" or "010", there is a possibility that transition time of any of a difference AB between the signal SIGA and the signal SIGB, a difference BC between the signal SIGB and the signal SIGC, and a difference CA between the signal SIGC and the signal SIGA may be lengthened. Accordingly, the transition detector 25 confirms, on the basis of the transition signals TxF9, TxR9, and TxP9 and the symbol signals D1, D2, and D3, whether the transition of the symbol is a symbol transition that may lengthen the transition time of any of the differences AB, BC, and CA. The transition detector 25 then generates the emphasis control signals MUP and MDN on results of the confirmation. The output section 26 performs an emphasis operation on the basis of the emphasis control signals MUP and MDN.

Further, for example, in a circumstance where the skew information INF is information indicating that delay time in the line 110A of the transmission path 100 is short, in a case where the transition signals TxF9, TxR9, and TxP9 are "000" or "010" and where the symbol DS is "+y" or "−y", the transition detector 25 sets the emphasis control signal CTRL to "1" (active), and sets the emphasis control signal CTRL to "0" (non-active) in other cases. Furthermore, for example, in a circumstance where the skew information INF is information indicating that delay time in the line 110B of the transmission path 100 is short, in a case where the transition signals TxF9, TxR9, and TxP9 are "000" or "010" and where the symbol DS is "+z" or "−z", the transition detector 25 sets the emphasis control signal CTRL to "1" (active), and sets the emphasis control signal CTRL to "0" (non-active) in other cases. Moreover, for example, in a circumstance where the skew information INF is information indicating that delay time in the line 110C of the transmission path 100 is short, in a case where the transition signals TxF9, TxR9, and TxP9 are "000" or "010" and where the symbol DS is "+x" or "−x", the transition detector 25 sets the emphasis control signal CTRL to "1" (active), and sets the emphasis control signal CTRL to "0" (non-active) in other cases. This causes the output section 26, in a case where the emphasis control signal CTRL is "1" (active), to set the emphasis voltage ΔVE to a larger voltage than a case where the emphasis control signal CTRL is "0" (non-active), s described later. This makes it possible for the communication system 1 to reduce an influence of the skew on the communication performance. As a result, it becomes possible to enhance the communication performance.

The output section 26 generates the signals SIGA, SIGB, and SIGC on the basis of the symbol signals Tx1, Tx2, and Tx3, the emphasis control signals MUP, MDN, and CTRL, and the clock signal TxCK.

FIG. 7 illustrates a configuration example of the output section 26. The output section 26 includes a driver controller 27, a timing controller 27T, emphasis controllers 28A, 28B, and 28C, and driver sections 29A, 29B, and 29C.

The driver controller 27 generates signals UPA, DNA, UPB, DNB, UPC, and DNC on the basis of the symbol signals Tx1, Tx2, and Tx3 and the clock signal TxCK. Specifically, the driver controller 27 determines each voltage state of the signals SIGA, SIGB, and SIGC, as illustrated in FIG. 3, on the basis of the symbol NS indicated by the symbol signals Tx1, Tx2, and Tx3. Further, for example, in a case where the signal SIGA is brought into the voltage state SH, the driver controller 27 sets the signals UPA and DNA, respectively, to "1" and "0". In a case where the signal SIGA is brought into the voltage state SL the driver controller 27 sets the signals UPA and DNA, respectively, to "0" and "1". In a case where the signal SIGA is brought into the voltage state SM, the driver controller 27 sets both the signals UPA and DNA to "1". The same holds true also for the signals UPB and DNB and for the signals UPC and DNC. Further, the driver controller 27 supplies the signals UPA and DNA, the signals UPB and DNB, and the signals UPC and DNC, respectively, to the emphasis controller 28A, the emphasis controller 28B, and the emphasis controller 28C.

On the basis of the emphasis control signals MUP, MDN, and CTRL and the clock signal TxCK, the timing controller 27T generates emphasis control signals MUP2, MDN2, and CTRL2, by performing timing adjustment, respectively, on the emphasis control signals MUP, MDN, and CTRL. Further, the timing controller 27I supplies the emphasis control signals MUP2 and MDN2 to each of the emphasis controllers 28A, 283, and 28C. In addition, the timing controller 27T supplies the emphasis control signal CTRL to each of the driver sections 29A, 29B, and 29C.

FIG. 8 illustrates an example of a waveform of each of the signals UPA and PDA and the emphasis control signals MUP2 and MDN2 to be supplied to the emphasis controller 28A and of the emphasis control signal CTRL2 to be supplied to the driver section 29A. Each of the signals UPA and DNA may change depending on a period (a unit interval UI) corresponding to one symbol. In this example, the signal UPA changes from low level to high level at timing t1, changes from high level to low level at timing t3 at which time equivalent to two unit intervals UI has elapsed from the timing t1, changes from low level to high level at timing t4 at which time equivalent to one unit interval UI has elapsed from the timing t3, and changes from high level to low level at timing t5 at which time equivalent to one unit interval UI has elapsed from the timing t4 ((A) of FIG. 8). Further, the signal DNA changes from high level to low level at timing t2 at which time equivalent to one unit interval UI has elapsed from the timing t1, and changes from low level to high level at timing t3 ((B) of FIG. 8). The emphasis control signals MUP2 and MDN2 may each change from low level to high level at a starting timing of the unit interval UI, and may each change from high level to low level at a timing at which time equivalent to half the unit interval UI (0.5 UI) has elapsed from the starting timing of the unit interval UI. In this example, the emphasis control signal MUP2 changes from low level to high level at timing t1, and changes from high level to low level at a timing at which time equivalent to half the unit interval UI (0.5 UI) has elapsed from the timing t1 ((C) of FIG. 8). Further, the emphasis control signal MDN2 changes from low level to high level at timing t4, and changes from high level to low level at a timing at which time equivalent to half the unit interval UI (0.5 UI) has elapsed from the timing t4 ((D) of FIG. 8). The emphasis control signal CTRL2 may change depending on the unit interval UI. In this example, the emphasis control signal CTRL2 changes from low level to high level at timing t1, and changes from high level to low level at timing t2 ((E) of FIG. 8). The timing controller 27T generates such emphasis control signals MUP2, MDN2, and CTRL2 by performing timing adjustment on the emphasis control signals MUP, MDN, and CTRL.

The emphasis controller 28A generates eight signals UPAA0, UPAB0, UPAA1, UPAB1, DNAA0, DNAB0, DNAA1, and DNAB1 on the basis of the signals UPA and DNA and the emphasis control signals MUP2 and MDN2. The driver section 29A generates the signal SIGA on the basis of the eight signals UPAA0, UPAB0, UPAA1, UPAB1, DNAA0, DNAB0, DNAA1, and DNAB1 and the emphasis control signal CTRL2.

The emphasis controller 28B generates eight signals UPBA0, UPBB0, UPBA1, UPBB1, DNBA0, DNBB0, DNBA1, and DNBB1 on the basis of the signals UPB and DNB and the emphasis control signals MUP2 and MDN2. The driver section 29B generates the signal SIGB on the basis of the eight signals UPBA0, UPBB0, UPBA1, UPBB1, DNBA0, DNBB0, DNBA1, and DNBB1 and the emphasis control signal CTRL2.

The emphasis controller 28C generates eight signals UPCA0, UPCB0, UPCA1, UPCB1, DNCA0, DNAB0, DNCA1, and DNCB1 on the basis of the signals UPC and DNC and the emphasis control signals MUP2 and MDN2. The driver section 29C generates the signal SIGC on the basis of the eight signals UPCA0 UPCB0, UPCA1, UPCB1, DNCA0, DNCB0, DNCA1, and DNCB1 and the emphasis control signal CTRL2.

FIG. 9 illustrates a configuration example of the driver section 29A. It is to be noted that the same holds true also for the driver sections 29B and 29C. The driver section 294 includes M circuits UA0 (circuits $UA0_1$ to $UA0_M$), N circuits UB0 (circuits $UB0_1$ to $UB0_N$), M circuits UA1 (circuits $UA1_1$ to $UA1_M$), N circuits UB1 (circuits $UB1_1$ to $UB1_N$), M circuits DA0 (circuits $DA0_1$ to $DA0_M$), N circuits UB0 (circuits $DB0_1$ to $DB0_N$), M circuits DA1 (circuits $DA1_1$ to $DA1_M$), N circuits DB1 (circuits $DB1_1$ to $DB1_N$), and an emphasis voltage setting section 14, Here, "M" is a number larger than "N". It is to be noted that this is not limitative; alternatively, "M" may be a number smaller than "N", for example.

Each of the circuits $UA0_1$ to $UA0_M$, $UB0_1$ to $UB0_N$, $UA1_1$ to $UA1_M$, and $UB1_1$ to $UB1_N$ includes a transistor 91 and a resistor 92, The transistor 91 in this example is an N-channel metal oxide semiconductor (MOS) field effect transistor (FET). In each of the circuits $UA0_1$ to $UA0_M$, a gate of the transistor 91 is supplied with the signal UPAA0, a drain of the transistor 91 is supplied with a voltage V1, and a source of the transistor 91 is coupled to one end of the resistor 92. In each of the circuits $UB0_1$ to $UB0_N$, a gate of the transistor 91 is supplied with the signal UPAB0, a drain of the transistor 91 is supplied with the voltage V1, and a source of the transistor 91 is coupled to one end of the resistor 92. In each of the circuits $UA1_1$ to $UA1_M$, a gate of the transistor 91 is supplied with the signal UPAA1, a drain of the transistor 91 is supplied with the voltage V1, and a source of the transistor 91 is coupled to one end of the resistor 92. In each of the circuits $UB1_1$ to $UB1_N$, a gate of the transistor 91 is supplied with the signal UPAB1, a drain of the transistor 91 is supplied with the voltage V1, and a source of the transistor 91 is coupled to one end of the resistor 92. In each of the circuits $UA0_1$ to $UA0_M$, $UB0_1$ to $UB0_N$, $UA1_1$ to $UA1_M$, and $UB1_1$ to $UB1_N$, the one end of the resistor 92 is coupled to the source of the transistor 91, and another end of the resistor 92 is coupled to the output terminal ToutA. A sum of a resistance value of the transistor 91 in an ON state and a resistance value of the resistor 92 is "50×(2×M+2×N)" [Ω] in this example.

Each of the circuits $DA0_1$ to $DA0_M$, $DB0_1$ to $DB0_N$, $DA1_1$ to $DA1_M$, and $DB1_1$ to $DB1_N$ includes a resistor 93 and a transistor 94. In each of the circuits $DA0_1$ to $DA0_M$, $DB0_1$ to $DB0_N$, $DA1_1$ to $DA1_M$, and $DB1_1$ to $DB1_N$, one end of the resistor 93 is coupled to the output terminal ToutA, and another end of the resistor 93 is coupled to a drain of the transistor 94. The transistor 94 in this example is an N-channel MOS FET. In each of the circuits $DA0_1$ to $DA0_M$, a gate of the transistor 94 is supplied with the signal DNAA0, the drain of the transistor 94 is coupled to the other end of the resistor 93, and a source of the transistor 94 is grounded. In each of the circuits $DB0_1$ to $DB0_N$, a gate of the transistor 94 is supplied with the signal DNAB0, the drain of the transistor 94 is coupled to the other end of the resistor 93, and a source of the transistor 94 is grounded. In each of the circuits $DA1_1$ to $DA1_M$, a gate of the transistor 94 is supplied with the signal DNAA1, the drain of the transistor 94 is coupled to the other end of the resistor 93 and a source of the transistor 94 is grounded, in each of the circuits $DB1_1$ to $DB1_N$, a gate of the transistor 94 is supplied with the signal DNAB1, the drain of the transistor 94 is coupled to the other end of the resistor 93, and a source of the transistor 94 is grounded. A sum of a resistance value of the resistor 93 and a resistance value of the transistor 94 in an ON state is "50×(2×M+2×N)" [Ω] in this example.

The emphasis voltage setting section 14 sets the emphasis voltage ΔE on the basis of the emphasis control signal CTRL2. Specifically, as described later, the emphasis voltage setting section 14 sets the emphasis voltage ΔE by changing the numbers "M" and "N" while maintaining a sum of the numbers "M" and "N" (M+N).

FIG. 10 illustrates operation examples of the emphasis controller 28A and the driver section 29A. It is to be noted that the same holds true also for the emphasis controller 28B and the driver section 293 and that the same holds true also for the emphasis controller 28C and the driver section 29C. Here, it is indicated that "X" may be either "0" or "1".

For example, in a case where the signals UPA and DNA are "10" and where the emphasis control signals MUP2 and MDN2 are "0X", the emphasis controller 28A sets the signals UPAA0, UPAB0, UPAA1, UPAB1, DNAA0, DNAB0, DNAA1, and DNAB1 to "11110000". This brings the transistor 91 in each of the circuits $UA0_1$ to $UA0_M$, $UB0_1$ to $UB0_N$, $UA1_1$ to $UA1_M$, and $UB1_1$ to $UB1_N$ into an ON state in the driver section 29A. As a result, the signal SIGA has the high-level voltage VH0, and the driver section 29A has an output termination resistor (an output impedance) of about 50 [Ω].

For example, in a case where the signals UPA and DNA are "10" and where the emphasis control signals MUP2 and MDN2 are "10", the emphasis controller 28A sets the signals UPAA0, UPAB0, UPAA1, UPAB1, DNAA0, DNAB0, DNAA1, and DNAB1 to "10110001", This brings the transistor 91 in each of the circuits $UA0_1$ to $UA0_M$, $UA1_1$ to $UA1_M$, and $UB1_1$ to $UB1_N$ into an ON state, and brings the transistor 94 in each of the circuits $DB1_1$ to $DB1_N$ into an ON state, in the driver section 29A. As a result, the signal SIGA has the high-level voltage VHminus that is lower than the high-level voltage VH0 by the emphasis voltage ΔVE, and the driver section 29A has an output termination resistor (an output impedance) of about 50 [Ω].

For example, in a case where the signals UPA and DNA are "11" and where the emphasis control signals MUP2 and MDN2 are "10", the emphasis controller 28A sets the signals UPAA1, UPAB0, UPAA1, UPAB1, DNAA0, DNAB0, DNAA1, and DNAB1 to "11011000". This brings the transistor 91 in each of the circuits $UA0_1$ to $UA0_M$, $UB0_1$ to $UB0_N$, and $UB1_1$ to $UB1_N$ into an ON state, and brings the transistor 94 in each of the circuits $DA0_1$ to $DA0_M$ into an ON state, in the driver section 29A. As a result, the signal SIGA has the medium-level voltage VMplus that is higher than the medium-level voltage VM0 by the emphasis voltage ΔVE, and the driver section 29A has an output termination resistor (an output impedance) of about 50 [1].

For example, in a case where the signals UPA and DNA are "11" and where the emphasis control signals MUP2 and MDN2 are "00", the emphasis controller 284 sets the signals UPAA0, UPAB0, UPAA1, UPAB1, DNAA0, DNAB0, DNAA1, and DNAB1 to "11001100". This brings the transistor 91 in each of the circuits $UA0_1$ to $UA0_M$ and $UB0_1$ to $UB0_N$ into an ON state, and brings the transistor 94 in each of the circuits $DA0_1$ to $DA0_M$ and $DB0_1$ to $DB0_N$ into an ON state, in the driver section 294. As a result, the signal SIGA has the medium-level voltage VM0, and the driver section 29A has an output termination resistor (an output impedance) of about 50 [Ω].

For example, in a case where the signals UPA and DNA are "11" and where the emphasis control signals MUP2 and MDN2 are "01", the emphasis controller 28A sets the signals UPAA0, UPAB0, UPAA1, UPAB1, DNAA0, DNAB0, DNAA1, and DNAB1 to "10001101". This brings the transistor 91 in each of the circuits $UA0_1$ to $UA0_M$ into an ON state, and brings the transistor 94 in each of the circuits $DA0_1$ to $DA0_M$, $DB0_1$ to $DB0_N$, and $DB1_1$ to $DB1_N$ into an ON state, in the driver section 29A. As a result, the signal SIGA has the medium-level voltage VMminus that is lower than the medium-level voltage VM0 by the emphasis voltage ΔVE, and the driver section 29A has an output termination resistor (an output impedance) of about 50 [Ω].

For example, in a case where the signals UPA and DNA are "01" and where the emphasis control signals MUP2 and MDN2 are "01", the emphasis controller 28A sets the signals UPAA0, UPAB0, UPAA1, UPAB1, DNAA0, DNAB0, DNAA1, and DNAB1 to "01001110". This brings the transistor 91 in each of the circuits $UB0_1$ to $UB0_N$ into an ON state, and brings the transistor 94 in each of the circuits $DA0_1$ to $DA0_M$, $DB0_1$ to $DB0_N$, and $DA1_1$ to $DA1_M$ into an ON state, in the driver section 29A, As a result, the signal SIGA has the low-level voltage VLplus higher than the low-level voltage VL0 by the emphasis voltage ΔVE, and the driver section 29A has an output termination resistor (an output impedance) of about 50 [Ω].

For example, in a case where the signals UPA and DNA are "01" and where the emphasis control signals MUP2 and MDN2 are "X0", the emphasis controller 28A sets the signals UPAA0, UPAB0, UPAA1, UPAB1, DNAA0, DNAB0, DNAA1, and DNAB1 to "00001111". This brings the transistor 94 in each of the circuits $DA0_1$ to $DA0_M$, $DB0_1$ to $DB0_N$, $DA1_1$ to $DA1_M$, and $DB1_1$ to $DB1_N$ into an ON state in the driver section 29A. As a result, the signal SIGA has the low-level-voltage VL0, and the driver section 29A has an output termination resistor (an output impedance) of about 50[Ω].

FIGS. 11A to 11C each illustrate an operation example of the driver section 29A at a time when the symbol "-z" is outputted. FIG. 11A illustrates a case where the emphasis control signals MUP2 and MDN2 are "00". FIG. 11B illustrates a case where the emphasis control signals MUP2 and MDN2 are "10". FIG. 11C illustrates a case where the emphasis control signals MUP2 and MDN2 are "01". In FIGS. 11A to 11C, among the circuits $UA0_1$ to $UA0_M$, $UB0_1$ to $UB0_N$, $UB1_1$ to $UA1_M$, and $UB1_1$ to $UB1_N$, a circuit indicated by a solid line represents a circuit in which the transistor 91 is in an ON state, and a circuit indicated by a broken line represents a circuit in which the transistor 91 is in an OFF state. Likewise, among the circuits $DA0_1$ to $DA0_M$, $DB0_1$ to $DB0_N$, $DA1$ to $DA1_M$, and $DB1_1$ to $DB1_N$, a circuit indicated by a solid line represents a circuit in which the transistor 94 is in an ON state, and a circuit indicated by a broken line represents a circuit in which the transistor 94 is in an OFF state.

As illustrated in FIG. 11A, in a case where the emphasis control signals MUP2 and MDN2 are "00", the transistor 91 in each of the M circuits UA0, the N circuits UB0, the M circuits UA1, and the N circuits UB1 is in an ON state in the driver section 29B, the transistor 91 in each of the M circuits UA0 and the N circuits UB0 is in an ON state, and the transistor 94 in each of the M circuits DA0 and the N circuits DB0 is in an ON state. Furthermore, in the driver section 29C, the transistor 94 in each of the M circuits DA0, the N circuits DB0, the M circuits DA1 and the N circuits DB1 is in an ON state. This brings the voltage of the signal SIGA into the high-level voltage VH0, brings the voltage of the signal SIGB into the medium-level voltage VM0, and brings the voltage of the signal SIGC into the low-level voltage VL0.

As illustrated in FIG. 11B, in a case where the emphasis control signals MUP2 and MDN2 are "10", the transistor 91 in each of the M circuits UA0, the M circuits UA1, and the N circuits UB1 is in an ON state, and the transistor 94 in each of the N circuits DB1 is in an ON state, in the driver section 29A. Further, in the driver section 29B, the transistor 91 in each of the M circuits UA0, the N circuits UB0, and the N circuits UB1 is in an ON state, and the transistor 94 in each of the M circuits DA0 is in an ON state. Furthermore, in the driver section 29C, the transistor 94 in each of the M circuits DA0, the N circuits DB0, the M circuits DA1 and the N circuits DB1 is in an ON state. This brings the voltage of the signal SIGA into the high-level voltage VHminus, brings the voltage of the signal SIGB into the medium-level voltage VMplus, and brings the voltage of the signal SIGC into the low-level voltage VL0. That is, as compared with the case of FIG. 11A, the driver section 29A brings the transistor 91 in each of the N circuits UB0 into an OFF state, and brings the transistor 94 in each of the N circuits DB1 into an ON state, thereby decreasing the voltage of the signal SIGA from the high-level voltage VH0 to the high-level voltage VHminus. Further, as compared with the case of FIG. 11A, the driver section 29B brings the transistor 91 in each of the N circuits UB1 into an ON state, and brings the transistor 94 in each of the N circuits DB0 into an OFF state, thereby increasing the voltage of the signal SIGB from the medium-level voltage VM0 to the medium-level voltage VMplus.

In this situation, in a case where the emphasis control signal CTRL is "1", the emphasis voltage setting section 14 of each of the driver sections 29A to 29C increases the number "N" and decreases the number "M", as compared with the case where the emphasis control signal CTRL is "0", Consequently, in the driver section 29A, the number of circuits, among the circuits UA0, UB0, UA1, and UAB, in which the transistor 91 is in an ON state is decreased, and the number of circuits, among the circuits DA0, DB0, DA1, and DB1, in which the transistor 94 is in an ON state is increased. Accordingly, the signal SIGA has a lower voltage (the high-level voltage VHminus). Further, in the driver section 29B, the number of circuits, among the circuits UA0, UB0, UA1, and UB1, in which the transistor 91 is in an ON state is increased, and the number of circuits, among the circuits DA0, DB0, DA1, and DB1, in which the transistor 94 is in an ON state is decreased. Accordingly, the signal SIGB has a higher voltage (the medium-level voltage VMplus). In other words, the emphasis voltage ΔVE is increased in this case.

As illustrated in FIG. 11C, in a case where the emphasis control signals MUP2 and MDN2 are "01", the transistor 91 in each of the M circuits UA0, the N circuits UB0, the M circuits UA1, and the N circuits UB1 is in an ON state in the driver section 29A. Further, in the driver section 29B, the transistor 91 in each of the M circuits UA0 is in an ON state, and the transistor 94 in each of the M circuits DA0, the N circuits DB, and the N circuits DB1 is in an ON state. Furthermore, in the driver section 29C, the transistor 91 in each of the N circuits UB0 is in an ON state, and the transistor 94 in each of the M circuits DA0, the N circuits DB0, and the M circuits DA1 is in an ON state. This brings the voltage of the signal SIGA into the high-level voltage VH0, brings the voltage of the signal SIGB into the medium-level voltage VMminus, and brings the voltage of the signal SIGC into the low-level voltage VLplus. That is, as compared with the case of FIG. 11A, the driver section 29B brings the transistor 91 in each of the N circuits UB0 into an OFF state, and brings the transistor 94 in each of the N circuits DB1 into an ON state, thereby decreasing the voltage of the signal SIGB from the medium-level voltage VM0 to the medium-level voltage VMminus. Further, as compared with the case of FIG. 11A, the driver section 29C brings the transistor 91 in each of the N circuits UB0 into an ON state, and brings the transistor 94 in each of the N circuits DB1 into an OFF state, thereby increasing the voltage of the signal SIGC from the low-level voltage VL0 to the low-level voltage VLplus.

In this situation, in a case where the emphasis control signal CTRL is "1", the emphasis voltage setting section 14 of each of the driver sections 29A to 29C increases the number "N" and decreases the number "M", as compared with the case where the emphasis control signal CTRL is "0". Consequently, in the driver section 293, the number of circuits, among the circuits UA0, UB0, UA1 and UB1, in which the transistor 91 is in an ON state is decreased, and the number of circuits, among the circuits DA0, DB0, DA1, and DB1, in which the transistor 94 is in an ON state is increased. Accordingly, the signal SIGB has a lower voltage (the medium-level voltage VMminus). Further, in the driver section 29C, the number of circuits, among the circuits UA0, UB0, UA1, and UB1, in which the transistor 91 is in an ON state is increased, and the number of circuits, among the circuits DA0, DB0, DA1, and DB1, in which the transistor 94 is in an ON state is decreased. Accordingly, the signal SIGC has a higher voltage (the low-level voltage VLplus). In other words, the emphasis voltage ΔVE is increased in this case.

In this manner, the output section 26 generates the signals SIGA, SIGB, and SIGC on the basis of the symbol signals Tx1, Tx2, and Tx3, the emphasis control signals MUP, MDN, and CTRL, and the clock signal TxCK. At this time, as described later, in a case where the transition of the symbol is a symbol transition that may lengthen the transition time of any of the difference AB between the signal SIGA and the signal SIGB, the difference BC between the signal SIGB and the signal SIGC, and the difference CA between the signal SIGC and the signal SIGA, the output section 26 performs the pre-emphasis operation on the basis of the emphasis control signals MUP2 and MDN2. This makes it possible for the communication system 1 to enhance a waveform quality. As a result, it becomes possible to enhance the communication performance.

Further, as described later, in a case where there is skew in the communication system 1, the output section 26 sets the emphasis voltage ΔVE corresponding to the skew on the basis of the emphasis control signal CTRL2. This enables the communication system 1 to reduce an influence of the skew on the communication performance. As a result, it becomes possible to enhance the communication performance.

(Reception Device 30)

As illustrated in FIG. 1, the reception device 30 includes a receiver 40 and a processor 32.

The receiver 40 receives the signals SIGA, SIGB, and SIGC, and generates transition signals RxF, RxR, and RxP and a clock signal RxCK on the basis of the signals SIGA, SIGB, and SIGC, FIG. 12 illustrates a configuration example of the receiver 40. The receiver 40 includes resistors 41A, 41B, and 41C, switches 42A, 42B, and 42C, amplifiers 43A, 43B, and 43C, a clock generator 44 flip-flops 45 and 46, and a signal generator 47.

The resistors 41A, 41B, and 41C each serve as a termination resistor of the communication system 1, and each have a resistance value of about 50[Ω] in this example. One end of the resistor 41A is coupled to the input terminal TinA and is supplied with the signal SIGA, and another end of the resistor 41A is coupled to one end of the switch 42A. One end of the resistor 419 is coupled to the input terminal TinB and is supplied with the signal SIGB, and another end of the resistor 41B is coupled to one end of the switch 42B. One end of the resistor 41C is coupled to the input terminal TinC and is supplied with the signal SIGC, and another end of the resistor 41C is coupled to one end of the switch 42C.

The one end of the switch 42A is coupled to the other end of the resistor 41A, and another end of the switch 42A is coupled to another end of each of the switches 42B and 42C. The one end of the switch 42B is coupled to the other end of the resistor 41B, and the other end of the switch 42B is coupled to the other end of each of the switches 42A and 42C. The one end of the switch 42C is coupled to the other end of the resistor 41C, and the other end of the switch 42C is coupled to the other end of each of the switches 42A and 42B. In the reception device 30, the switches 42A, 42B, and 42C are each set to an ON state, and thus the resistors 41A to 41C each serve as a termination resistor.

A positive input terminal of the amplifier 43A is coupled to a negative input terminal of the amplifier 43C and the one end of the resistor 41A, and is supplied with the signal SIGA. A negative input terminal of the amplifier 43A is coupled to a positive input terminal of the amplifier 43B and the one end of the resistor 41B, and is supplied with the signal SIGB. The positive input terminal of the amplifier 43B is coupled to the negative input terminal of the amplifier 43A and the one end of the resistor 41B, and is supplied with the signal SIGB. A negative input terminal of the amplifier 43B is coupled to a positive input terminal of the amplifier 43C and the one end of the resistor 41C, and is supplied with the signal SIGC. The positive input terminal of the amplifier 43C is coupled to the negative input terminal of the amplifier 439 and the one end of the resistor 41C, and is supplied with the signal SIGC. The negative input terminal of the amplifier 43C is coupled to the positive input terminal of the amplifier 43A and the resistor 41A, and is supplied with the signal SIGA.

With this configuration, the amplifier 43A outputs a signal corresponding to the difference AB between the signal SIGA and the signal SIGB (SIGA–SIGB). The amplifier 439 outputs a signal corresponding to the difference BC between the signal SIGB and the signal SIGC (SIGB–SIGC). The amplifier 43C outputs a signal corresponding to the difference CA between the signal SIGC and the signal SIGA (SIGC–SIGA).

FIG. 13 illustrates an operation example of each of the amplifiers 43A, 439, and 43C in a case where the receiver 40 receives the symbol "+x". It is to be noted that illustrations of the switches 42A, 42B, and 42C are omitted because of the ON state of each of the switches 42A, 42B, and 42C. In this example, the voltage state of the signal SIGA is the voltage state SH, the voltage state of the signal SIGB is the voltage state SL, and the voltage state of the signal SIGC is the voltage state SM. In this case, a current Iin flows in order of the input terminal TinA, the resistor 41A, the resistor 41B, and the input terminal TinB. Further, the positive input terminal and the negative input terminal of the amplifier 43A are supplied, respectively, with a voltage corresponding to the voltage state SH and a voltage corresponding to the voltage state SL to cause the difference AB to be positive (AB>0), and thus the amplifier 32A outputs "1". Further, the positive input terminal and the negative input terminal of the amplifier 43B are supplied, respectively, with a voltage corresponding to the voltage state SL and a voltage corresponding to the voltage state SM to cause the difference BC to be negative (BC<0), and thus the amplifier 43B outputs "0". Furthermore, the positive input terminal and the negative input terminal of the amplifier 43C are supplied, respectively, with a voltage corresponding to the voltage state SM and a voltage corresponding to the voltage state SH to cause the difference CA to be negative (CA<0), and thus the amplifier 43C outputs "0".

The clock generator 44 generates the clock signal RxCK on the basis of the output signal from each of the amplifiers 43A, 43B, and 43C.

The flip-flop 45 delays respective output signals from the amplifiers 43A, 43B, and 43C by one clock period behind the clock signal RxCK, and outputs the respective delayed output signals. The flip-flop 46 delays the three output signals from the flip-flop 45 by one clock period behind the clock signal RxCK, and outputs the respective delayed output signals.

The signal generator 47 generates the transition signals RxF, RxR, and RxP on the basis of the output signal from each of the flip-flops 45 and 46 and the clock signal RxCK. The transition signals RxF, RxR, and RxP correspond, respectively, to the transition signals TxF9, TxR9, and TxP9 (FIG. 5) in the transmission device 10, and each represent the symbol transition. The signal generator 47 identifies the symbol transition (FIG. 4) on the basis of the symbol indicated by the output signal from the flip-flop 45 and the symbol indicated by the output signal from the flip-flop 46, and generates the transition signals RxF, RxR, and RxP.

The processor 32 (FIG. 1) performs a predetermined processing on the basis of the transition signals RxF, RxR, and RxP and the clock signal RxCK.

Here, the driver sections 29A, 29B, and 29C each correspond to a specific example of a "driver section" in the disclosure. The skew information storage section 13, the transition detector 25, the timing controller 27T, and the emphasis controllers 28A, 28B, and 28C each correspond to a specific example of a "controller" in the disclosure. The transmission symbol generator 22 corresponds to a specific example of a "signal generator" in the disclosure. The circuits $UA0_1$ to $UA0_M$, $UB0_1$ to $UB0_N$, $UA1_1$ to $UA1_M$, and $UB1_1$ to $UB1_N$ each correspond to a specific example of a "first sub-circuit" in the disclosure. The circuits $DA0_1$ to $DA0_M$, $DB0_1$ to $DB0_N$, $DA1_1$ to $DA1_M$, and $DB1_1$ to $DB1_N$ each correspond to a specific example of a "second sub-circuit" in the disclosure.

[Operations and Workings]

Description is given next of operations and workings of the communication system 1 according to the present embodiment.

(Overview of Overall Operation)

First, description is given of an overview of an overall operation of the communication system 1 with reference to FIGS. 1, 5, and 7. The clock generator 11 of the transmission device 10 generates the clock signal TxCK. The processor 12 generates the transition signals TxF0 to TxF6, TxR0 to TxR6, and TxP0 to TxP6 by performing the predetermined processing. In the transmitter 20 (FIG. 5), the serializer 21F generates the transition signal TxF9 on the basis of the transition signals TxF0 to TxF6 and the clock signal TxCK. The serializer 21R generates the transition signal TxR9 on the basis of the transition signals TxR0 to TxR6 and the clock signal TxCK. The serializer 21P generates the transition signal TxP9 on the basis of the transition signals TxP0 to TxP6 and the clock signal TxCK. The transmission symbol generator 22 generates the symbol signals Tx1, Tx2, and Tx3 on the basis of the transition signals TxF9, TxR9, and TxP9 and the clock signal TxCK. The transition detector 25 generates the emphasis control signals MUP, MDN, and CTRL on the basis of the transition signals TxF9, TxR9, and TxP9, the symbol signals D1, D2, and D3, and the skew information INF.

In the output section 26 (FIG. 7), the driver controller 27 generates the signals UPA, DNA, UPB, DNB, UPC, and DNC on the basis of the symbol signals Tx1, Tx2, and Tx3 and the clock signal TxCK. The timing controller 27T generates the emphasis control signals MUP2, MDN2, and CTRL2 by performing timing adjustment, respectively, on the emphasis control signals MUP, MDN, and CTRL on the basis of the emphasis control signals MUP, MDN, and CTRL and the clock signal TxCK. The emphasis controller 28A generates the signals UPAA0, UPAA0, UPAA1, UPAB1, DNAA0, DNAA0, DNAA1, and DHAB1 on the basis of the signals UPA and DNA and the emphasis control signals MUP2 and MDN2. The emphasis controller 28B generates the signals UPAA0, UPBB0, UPBA1, UPBB1, DNBA0, DNBA0, DNBA1, and DNBB1 on the basis of the signals UPB and DNB and the emphasis control signals MUP2 and MDN2. The emphasis controller 28C generates the signals UPAA0, UPCB0, UPCA1, UPCB1, DNCA0, DNCB0, DNCA1, and DNCB1 on the basis of the signals UPC and DNC and the emphasis control signals MUP2 and MDN2. The driver section 29A generates the signal SIGA on the basis of the signals UPAA0, UPAA0, UPAA1, UPAB1, DNAA0, DNAB0, DNAA1, and DNAB1 and the emphasis control signal CTRL2. The driver section 29B generates the signal SIGB on the basis of the signals UPBA0, UPBB0, UPBA1, UPBB1, DNBA0, DNBB0, DNBA1, and DNBB1 and the emphasis control signal CTRL2. The driver section 29C generates the signal SIGC on the basis of the signals UPCA0, UPCB0, UPCA1, UPCB1, DNCA0, DNCB0, DNCA1, and DNCB1 and the emphasis control signal CTRL2.

In the reception device 30 (FIG. 1), the receiver 40 receives the signals SIGA, SIGB, and SIGC, and generates the transition signals RxF, RxR, and RxP and the clock signal RxCK on the basis of the signals SIGA, SIGB, and SIGC. The processor 32 performs the predetermined processing on the basis of the transition signals RAF, RxR, and RxP and the clock signal RxCK.

(Concerning Pre-Emphasis Operation)

Next, description is given in detail of the pre-emphasis operation. In the transmission device 10, the transition detector 25 generates the emphasis control signals MUP and MDN on the basis of the transition signals TxF9, TxR9, and TxP9 and the symbol signals D1, D2, and D3. Specifically, the transition detector 25 confirms, on the basis of transition signals TxF9, TxR9, and TxP9 and the symbol signals D1, D2, and D3, whether the transition of the symbol is a symbol transition that may lengthen the transition time of any of the difference AB between the signal SIGA and the signal SIGB, the difference BC between the signal SIGB and the signal SIGC, and the difference CA between the signal SIGC and the signal SIGA. On the basis of results of the confirmation, the transition detector 25 generates the emphasis control signals MUP and MDN.

FIG. 14 schematically illustrates an eye diagram of the differences AB, BC, and CA in a case where the transmission device 10 performs no pre-emphasis operation. In FIG. 14, ΔV denotes a difference between the high-level voltage VH0 and the medium-level voltage VM0. Likewise, ΔV denotes a difference between the medium-level voltage VM0 and the low-level voltage VL0. As illustrated in FIG. 14, each of transition W21 and transition W22 is transition having longer transition time than any other transition. The transition W21 is transition that changes from −2ΔV to +ΔV, and the transition W22 is transition that changes from +2ΔV to −ΔV.

The transition detector 25 confirms, on the basis of transition signals TxF9, TxR9, and TxP9 and the symbol signals D1, D2, and D3, whether the transition of the symbol is a symbol transition, such as the transition W21 and the transition W22, that may lengthen the transition time of any of the differences AB, BC, and CA. Further, the transition detector 25 determines that the transition of the symbol is the symbol transition that may lengthen the transition time of any of the differences AB, BC, and CA, in a case where the transition signals TxF9, TxR9, and TxP9 are "000" or "010" as illustrated in FIG. 6. Further, as indicated by WUP encircled by solid lines in FIG. 5, in a case where the transition signals TxF9, TxR9, and TxP9 are "000" and where the symbol DS indicated by the symbol signals D1, D2, and D3 is "+x", "+y", or "+z", and in a case where the transition signals TxF9, TxR9, and TxP9 are "010" and where the symbol DS indicated by the symbol signals D1, D2, and D3 is "−x", "−y", or "−z", the transition detector 5 sets the emphasis control signal MUP to "1" (active). In addition, as indicated by WDN encircled by broken lines in FIG. 6, in a case where the transition signals TxF9, TxR9, and TxP9 are "000" and where the symbol DS indicated by the symbol signals D1, D2, and D3 is "−x", "−y", or "−z", and in a case where the transition signals TxF9, TxR9, and TxP9 are "010" and where the symbol DS indicated by the symbol signals D1, D2, and D3 is "+x", "+y", or "+z", the transition detector 25 sets the emphasis control signal MDN to "1" (active).

In a case where both of the emphasis control signals MUP2 and MDN2 are "0", the output section 26 sets the voltage in the voltage state SH to the high-level voltage VH0, sets the voltage in the voltage state SM to the medium-level voltage VM0, and sets the voltage in the voltage state SL to the low-level voltage VL0. Further, for example, in a case where the emphasis control signals MUP2 and MDN2 are "10", the output section 26 sets the voltage in the voltage state SH to the high-level voltage VHminus, sets the voltage in the voltage state SM to the medium-level voltage VMplus, and sets the voltage in the voltage state SL to the low-level voltage VL0, Further, for example, in a case where the emphasis control signals MUP2 and MDN2 are "01", the output section 26 sets the voltage in the voltage state SH to the high-level voltage VH0, sets the voltage in the voltage state SM to the medium-level voltage VMminus, and sets the voltage in the voltage state SL to the low-level voltage VHplus.

FIGS. 15A to 15E each illustrate an operation example of the communication system 1 in a case where the symbol transitions from "+x" to any of the symbols other than "+x". FIG. 15A illustrates a case where the symbol transitions from "+x" to "−x". FIG. 15B illustrates a case where the symbol transitions from "+x" to "+y", FIG. 15C illustrates a case where the symbol transitions from "+x" to "−y". FIG. 15D illustrates a case where the symbol transitions from "+x" to "+z". FIG. 15E illustrates a case where the symbol transitions from "+x" to "−z" (A) of each of FIGS. 15A to 15E indicates waveforms of the signals SIGA, SIGB, and SIGC, respectively, at the output terminals ToutA, ToutB, and ToutC of the transmission device 10, (B) of each of FIGS. 15A to 15E indicates waveforms of the differences AB, BC, and CA in the reception device 30. Further, solid lines each indicate a waveform at a time when the pre-emphasis operation is performed, and broken lines each indicate a waveform at a time when no pre-emphasis operation is performed.

In a case where the symbol DS is "+x" and where the transition signals TxF9, TxR9, and TxP9 are "1xx" as illustrated in FIG. 6, the symbol transitions from "+x" to "−x" (FIG. 15A). At this time, as illustrated in FIG. 6, the transition detector 25 sets both the emphasis control signals MUP and MDN to "0" (non-active). This, as illustrated in FIG. 15A, causes the signal SIGA to change from the high-level voltage VH0 to the low-level voltage VL0, causes the signal SIGB to change from the low-level voltage VL0 to the high-level voltage VH0, and causes the signal SIGC to maintain the medium-level voltage VM0. That is, in a case where the symbol transitions from "+x" to "−x", none of the transitions of the differences AB, BC, and CA corresponds to any of the transition W21 and the transition W22. Accordingly, the emphasis controllers 28A, 28B, and 28C control, respectively, the driver sections 29A, 29B, and 29C not to perform the pre-emphasis operation.

Further, in a case where the symbol DS is "+x" and where the transition signals TxF9, TxR9, and TxP9 are "010", the symbol transitions from "+x" to "+y" (FIG. 15B). At this time, as illustrated in FIG. 6, the transition detector 25 sets the emphasis control signal MDN to "1" (active) and sets the emphasis control signal MUP to "0" (non-active). This, as illustrated in FIG. 15B, causes the signal SIGA to change from the high-level voltage VH0 through the medium-level voltage VMminus to the medium-level voltage VM0, causes the signal SIGB to change from the low-level voltage VL0 to the high-level voltage VH0, and causes the signal SIGC to change from the medium-level voltage VM0 through the low-level voltage VLplus to the low-level voltage VL0. At this time, the emphasis controller 28A controls the driver section 29A to set the voltage of the signal SIGA to the medium-level voltage VMminus that is lower than the medium-level voltage VM0 by the emphasis voltage ΔVE, in a first half period (0.5 UI) of a period in which the transmission device 10 outputs the symbol "+y". Likewise, the emphasis controller 28C controls the driver section 29C to set the voltage of the signal SIGC to the low-level voltage VLplus that is higher than the low-level voltage VL0 by the emphasis voltage ΔVE, in a first half period (0.5 UI) of a period in which the transmission device 10 outputs the symbol "+y". That is, the transition of the difference AB corresponds to the transition W22, leading to a possibility that the transition time of the difference AB may be lengthened. Accordingly, the emphasis controllers 28A and 28C control, respectively, the driver sections 29A and 29C to each perform the pre-emphasis operation.

Further, in a case where the symbol DS is "−x" and where the transition signals TxF9, TxR9, and TxP9 are "011", the symbol transitions from "−x" to "−y" (FIG. 15C). At this time, as illustrated in FIG. 6 the transition detector 25 sets both the emphasis control signals MUP and MDN to "0" (non-active). This, as illustrated in FIG. 15C, causes the signal SIGA to change from the high-level voltage VH0 to the medium-level voltage VM0, causes the signal SIGB to maintain the low-level voltage VL0, and causes the signal SIGC to change from the medium-level voltage VM0 to the high-level voltage VH0. That is, in a case where the symbol transitions from "+x" to "−y", none of the transitions of the differences AB, BC, and CA corresponds to any of the transition W21 and the transition W22. Accordingly, the emphasis controllers 28A, 28B, and 28C control, respectively, the driver sections 29A, 29B, and 29C not to perform the pre-emphasis operation.

Further, in a case where the symbol DS is "+x" and where the transition signals TxF9, TxR9, and TxP9 are "000", the symbol transitions from "+x" to "+z" (FIG. 15D). At this time, as illustrated in FIG. 6, the transition detector 25 sets the emphasis control signal MUP to "1" (active) and sets the emphasis control signal MDN to "0" (non-active). This, as illustrated in FIG. 15D, causes the signal SIGA to change from the high-level voltage VH0 to the low-level voltage VL0, causes the signal SIGB to change from the low-level voltage VL0 through the medium-level voltage VMplus to the medium-level voltage VM0, and causes the signal SIGC to change from the medium-level voltage VM0 through the high-level voltage VHminus to the high-level voltage VH0. At this time, the emphasis controller 28B controls the driver section 29B to set the voltage of the signal SIGB to the medium-level voltage VMplus that is higher than the medium-level voltage VM0 by the emphasis voltage $\Delta VE$, in a first half period (0.5 UI) of a period in which the transmission device 10 outputs the symbol "+z". Likewise, the emphasis controller 28C controls the driver section 29C to set the voltage of the signal SIGC to the high-level voltage VHminus that is lower than the high-level voltage VH0 by the emphasis voltage $\Delta VE$, in a first half period (0.5 UI) of a period in which the transmission device 10 outputs the symbol "+z". That is, the transition of the difference AB corresponds to the transition W22, leading to a possibility that the transition time of the difference AB may be lengthened. Accordingly, the emphasis controllers 28B and 28C control, respectively, the driver sections 29B and 29C to each perform the pre-emphasis operation.

Further, in a case where the symbol DS is "+x" and where the transition signals TxF9, TxR9, and TxP9 are "001", the symbol transitions from "+x" to "−z" (FIG. 15E). At this time, as illustrated in FIG. 6, the transition detector 25 sets both the emphasis control signals MUP and MDN to "0" (non-active). This, as illustrated in FIG. 15E, causes the signal SIGA to maintain the high-level voltage VH0, causes the signal SIGB to change from the low-level voltage VL0 to the medium-level voltage VM0, and causes the signal SIGC to change from the medium-level voltage VM0 to the low-level voltage VL0. That is, in a case where the symbol transitions from "+x" to "−z", none of the transitions of the differences AB, BC, and CA corresponds to any of the transition W21 and the transition W22. Accordingly, the emphasis controllers 28A, 289, and 28C control, respectively, the driver sections 29A, 299, and 29C not to perform the pre-emphasis operation.

In this manner, in the communication system 1, the pre-emphasis operation is performed in a case where the transition of the symbol is a symbol transition that may lengthen the transition time of any of the differences AB, BC, and CA. This makes it possible to enhance the waveform quality, for example, in a case where the transmission path 100 has a long distance. In particular, in the transmission device 10, the driver sections 29A, 29B and 29C each have an output impedance of about 50[Ω] regardless of the output voltage. This enables, in the communication system 1, the output impedance to coincide with characteristic impedance of the transmission path 100 regard less of the output voltage, thus making it possible to enhance the waveform quality. As a result, it becomes possible to enhance the communication performance.

In the communication system 1, as illustrated in FIG. 15B, in a case where the voltage in the voltage state SM is the medium-level voltage VMminus that is lower than the medium-level voltage VM0, the voltage in the voltage state SL is set to the low-level voltage VLplus that is higher than the low-level voltage VL0. Further, as illustrated in FIG. 15D, in a case where the voltage in the voltage state SM is the medium-level voltage VMplus that is higher than the medium-level voltage VM0, the voltage in the voltage state SH is set to the high-level voltage VHminus that is lower than the high-level voltage VH0. This makes it possible to suppress fluctuation in a common-mode voltage that is an average voltage of the three signals SIGA, SIGB, and SIGC. As a result, it becomes possible for the communication system 1 to reduce a possibility that electro-magnetic interference (EMI) may occur, thus making it possible to enhance the communication performance.

Further, in the communication system 1, the transition detector 25 detects a specific symbol transition on the basis of the transition signals TxF9, TxR9, and TxP9, and the emphasis controllers 28A, 28B, and 28C cause, respectively, the driver sections 29A, 29B, and 29C to perform the pre-emphasis operation on the basis of results of the detection. This enables, in the communication system 1, the pre-emphasis operation to be performed dynamically only on the symbol transition that may lower the waveform quality, for example, thus making it possible to enhance the waveform quality effectively.

(Concerning Setting of Emphasis Voltage $\Delta VE$)

Next, description is given in detail of an operation of setting the emphasis voltage $\Delta VE$ on the basis of the skew information INF. The transition detector 25 generates the emphasis control signal CTRL on the basis of the transition signals TxF9, TxR9, and TxP9, the symbol signals D1, D2, and D3, and the skew information INF. Specifically, for example, in a circumstance where the skew information INF is information indicating that the delay time in the line 110A of the transmission path 100 is short, in a case where the transition signals TxF9, TxR9, and TxP9 are "000" or "010" and where the symbol DS is "+y" or "−y", the transition detector 25 sets the emphasis control signal CTRL to "1" (active), and sets the emphasis control signal CTRL to "0" (non-active) in other cases. Further, for example, in a circumstance where the skew information INF is information indicating that the delay time in the line 1109 of the transmission path 100 is short, in a case where the transition signals TxF9, TxR9, and TxP9 are "000" or "010" and where the symbol DS is "+z" or "−z" or the transition detector 25 sets the emphasis control signal CTRL to "1" (active), and sets the emphasis control signal CTRL to "0" (non-active) in other cases. Furthermore, for example, in a circumstance where the skew information INF is information indicating that the delay time in the line 110C of the transmission path 100 is short, in a case where the transition signals TxF9, TxR9, and TxP9 are "000" or "010" and where the symbol DS is "+x" or "−x", the transition detector 25 sets the emphasis control signal CTRL to "1" (active), and sets the emphasis control signal CTRL to "0" (non-active) in other cases.

The output section 26 sets the emphasis voltage $\Delta VE$ on the basis of the emphasis control signal CTRL. Specifically, the output section 26 sets the emphasis voltage $\Delta VE$ to a larger voltage in a case where the emphasis control signal CTRL is "1" (active) than a case where the emphasis control signal CTRL is "0" (non-active).

FIGS. 16A and 16B each illustrate an operation example of the communication system 1 in the case where the skew information INF is information indicating, that the delay time in the line 110C of the transmission path 100 is short. FIG. 16A illustrates a case where the symbol transitions from "−x" to "+y", and FIG. 16B illustrates a case where the symbol transitions from "+x" to "+z". (A) of each of FIGS. 16A and 16B indicates waveforms of the signals SIGA, SIGB, and SIGC, respectively, at the output terminals ToutA, ToutB, and ToutC of the transmission device 10. (B) of each of FIGS. 16A and 16B indicates waveforms of the differences AB, BC, and CA in the reception device 30.

In a case where the symbol DS is "+x" and where the transition signals TxF9, TxR9, and TxP9 are "010", the symbol transitions from "+x" to "+y" (FIG. 16A). At this time, the transition detector 25 sets the emphasis control signal CTRL to "1" (active). That is, in this example, the skew information INF is the information indicating that the delay time in the line 110C of the transmission path 100 is short; the transition signals TxF9, TxR9, and TxP9 are "010"; and the symbol DS is "+x". Accordingly, the transition detector 25 sets the emphasis control signal CTRL to "1". In association with the symbol transitioning from "+x" to "+y", the signals SIGA, SIGB, and SIGC each change similarly to the case illustrated in FIG. 15B. In this situation, the output section 26 sets the emphasis voltage ΔVE to a larger voltage than the case where the emphasis control signal CTRL is "0" because of the emphasis control signal CTRL being "1".

At this time, the difference AB in the reception device 30 starts transitioning at a later timing than the differences BC and CA, as illustrated in (B) of FIG. 16A. In other words, in this example, the delay time in the line 110C of the transmission path 100 is shorter than that of each of the lines 110A and 110B, and thus the difference AB starts transitioning latest. Further, the transition of the difference AB corresponds to the transition W22, leading to a possibility that the transition time of the difference AB may be lengthened. Even in this case, the output section 26 sets the emphasis voltage ΔVE to a large voltage, thus making it possible to shorten the transition time of the difference AB.

Further, in a case where the symbol DS is "+x" and where the transition signals TxF9, TxR9, and TxP9 are "000", the symbol transitions from "+x" to "+z" (FIG. 16B). At this time, the transition detector 25 sets the emphasis control signal CTRL to "1" (active). That is, in this example, the skew information INF is the information indicating that the delay time in the line 110O of the transmission path 100 is short; the transition signals TxF9, TxR9, and TxP9 are "000"; and the symbol DS is "+x". Accordingly, the transition detector 25 sets the emphasis control signal CTRL to "1". In association with the symbol transitioning from "+x" to "+z", the signals SIGA, SIGB, and SIGC each change similarly to the case illustrated in FIG. 15D. In this situation, the output section 26 sets the emphasis voltage ΔVE to a larger voltage than the case where the emphasis control signal CTRL is "0" because of the emphasis control signal CTRL being "1".

At this time, the difference AB in the reception device 30 starts transitioning at a later timing than the differences BC and CA, as illustrated in (B) of FIG. 16B. Further, the transition of the difference AB corresponds to the transition W22, leading to a possibility that the transition time of the difference AB may be lengthened. Even in this case, the output section 26 sets the emphasis voltage ΔVE to a large voltage, thus making it possible to shorten the transition time of the difference AB.

FIG. 17A illustrates an eye diagram of the differences AB, BC, and CA in a case where the emphasis voltage ΔVE is set on the basis of the skew information INF. FIG. 17B illustrates an eye diagram of the differences AB, BC, and CA in a case where the emphasis voltage ΔVE is fixed. It is possible for the communication system 1 to broaden an eye opening by setting the emphasis voltage ΔVE on the basis of the skew information INF, as illustrated in FIG. 17A. As a result, it becomes possible to enhance the communication performance.

In this manner, in the communication system 1, the emphasis voltage ΔVE is set on the basis of the skew information INF. This enables the communication system 1 to change the transition time of each of the differences AB, BC, and CA depending on skew, thus making it possible to reduce an influence of the skew on the communication performance. In particular, in the communication system 1, the emphasis voltage ΔVE is set to a large voltage in a case where transition with long transition time such as the transition W21 and the transition W22 (FIG. 14) starts transitioning latest, thus making it possible to effectively reduce the influence of the skew on the communication performance.

Further, in the communication system 1, setting of the emphasis voltage ΔVE allows for reduction in the influence of the skew on the communication performance, thus making it possible to enhance the communication performance. That is for example, in a case where a transmission device is provided with a buffer circuit that adjusts a delay amount of each of the signals SIGA, SIGB, and SIGC and where the delay amount in the buffer circuit is adjusted to perform deskew, the delay amount is influenced by variation in processes and by fluctuation in a power supply voltage as well as fluctuation in temperature, thus leading to a possibility that accuracy in the adjustment may be lowered. In addition, in this configuration, there is a possibility that fine adjustment may not be possible due to low adjustment resolution. Meanwhile, in the communication system 1, the emphasis voltage ΔVE is set, thus making it possible to enhance the adjustment resolution and to enhance the accuracy in the adjustment.

[Effects]

As described above, in the present embodiment, the pre-emphasis operation is performed in a case where the transition of the symbol is a symbol transition that may lengthen the transition time of any of the differences AB, BC, and CA, thus making it possible to enhance the communication performance. In particular, an output impedance is set to about 50[Ω] regardless of the output voltage, thus making it possible to enhance the waveform quality and to enhance the communication performance.

In the present embodiment, in a case where the voltage in the voltage state SM is set to the medium-level voltage VMminus, the voltage in the voltage state SL is set to the low-level voltage VLplus. In a case where the voltage in the voltage state SM is set to the medium-level voltage VMplus, the voltage in the voltage state SH is set to the high-level voltage VHminus. This makes it possible to reduce the possibility that the electro-magnetic interference may occur, thus making it possible to enhance the communication performance.

In the present embodiment, a specific symbol transition is detected on the basis of the transition signal, and pre-emphasis operation is performed on the basis of results of the detection, thus making it possible to enhance the communication performance effectively.

In the present embodiment, the emphasis voltage is set on the basis of the skew information, thus making it possible to reduce the influence of the skew on the communication performance.

Modification Example 1-1

In the foregoing embodiment, as illustrated in FIG. 8, the emphasis control signals MUP2 and MDN2 may each change from low level to high level at a starting timing of the unit interval UI, and may each change from high level to low level at a timing of elapse of time equivalent to half the unit interval UI (0.5 UI) from the starting timing of the unit interval UI; however, this is not limitative. Alternatively, for example, it may be possible for each of the emphasis control signals MUP2 and MDN2 to change from low level to high level at the starting timing of the unit interval UI, and to change from high level to low level at a timing of elapse of time shorter than the time equivalent to half the unit interval UI from the starting timing of the unit interval UI. Further, for example, it may be possible for each of the emphasis control signals MUP2 and MDN2 to change from low level to high level at the starting timing of the unit interval UI, and to change from high level to low level at a timing of elapse of time longer than the time equivalent to half the unit interval UI from the starting timing of the unit interval W.

Modification Example 1-2

In the forgoing embodiment, the pre-emphasis operation is performed in a case where the transition signals TxF9, TxR9, and TxP9 are "000" or "010"; however, this is not limitative. The pre-emphasis operation may be performed in other cases.

2. SECOND EMBODIMENT

Description is given next of a communication system 2 according to a second embodiment. The present embodiment differs from the foregoing first embodiment in the method of the emphasis operation. It is to be noted that the same reference numerals are assigned to substantially the same components as those in the communication system 1 according to the foregoing first embodiment, and the descriptions thereof are omitted where appropriate.

As illustrated in FIG. 1, the communication system 2 includes a transmission device 50. The transmission device 50 includes a transmitter 60. The communication system 2 uses de-emphasis to achieve enhancement in the communication performance.

FIG. 18 illustrates the three voltage states SH, SM, and SL in the communication system 2. The voltage state SH is a state corresponding to three high-level voltages VH (VH0, VH1, and VH2). Of the high-level voltages VH0, and VH2, the high-level voltage VH0 is the lowest voltage, and the high-level voltage VH2 is the highest voltage. The voltage state SM is a state corresponding to three medium-level voltages VM (VM0, VM1plus, and VM1minus). Of the medium-level voltages VM0, VM1plus, and VM1minus, the medium-level voltage VM1minus is the lowest voltage, and the medium-level voltage VM1plus is the highest voltage. The voltage state SL is a state corresponding to three low-level voltages VL (VL0, VL1, and VL2). Of the low-level voltages VL0, VL1, and VL2, the low-level voltage VL0 is the highest voltage, and the low-level voltage VL2 is the lowest voltage. The high-level voltage VH2 is a high-level voltage in a case where no de-emphasis operation is performed. The medium-level voltage VM0 is a medium-level voltage in a case where no de-emphasis operation is performed. The low-level voltage VL2 is a low-level voltage in a case where no de-emphasis operation is performed.

FIG. 19 illustrates a configuration example of the transmitter 60. The transmitter 20 includes the serializers 21F, 21R, and 21P, the transmission symbol generator 22, a transmission symbol generator 62, a skew information storage section 53, and an output section 66.

The transmission symbol generator 62 generates the symbol signals Tx1, Tx2, and Tx3 and the symbol signals D1, D2, and D3 on the basis of the transition signals TxF9, TxR9, and TxP9 and the clock signal TxCK.

The skew information storage section 53 stores the skew information INF. Further, the skew information storage section 53 also has a function of generating emphasis control signals CTRLA, CTRLB, and CTRLC on the basis of the skew information INF.

Specifically, for example, in a case where the skew information INF is information indicating that the delay time in the line 110A of the transmission path 100 is short, the skew information storage section 53 sets both the emphasis control signals CTRLB and CTRLC to "1" (active), and sets the emphasis control signal CTRLA to "0" (non-active). This causes the output section 66 to make the emphasis voltage ΔVE in each of the signals SIGB and SIGC larger than the emphasis voltage ΔVE in the signal SIGA, as described later.

Further, for example, in a case where the skew information INF is information indicating that the delay time in the line 110B of the transmission path 100 is short, the skew information storage section 53 sets both the emphasis control signals CTRLA and CTRLC to "1" (active), and sets the emphasis control signal CTRLB to "0" (non-active). This causes the output section 66 to make the emphasis voltage ΔVE in each of the signals SIGA and SIGC larger than the emphasis voltage ΔVE in the signal SIGB, as described later.

Furthermore, for example, in a case where the skew information INF is information indicating that the delay time in the line 110O of the transmission path 100 is short, the skew information storage section 53 sets both the emphasis control signals CTRLA and CTRLB to "1" (active), and sets the emphasis control signal CTRLC to "0" (non-active). This causes the output section 66 to make the emphasis voltage ΔVE in each of the signals SIGA and SIGB larger than the emphasis voltage ΔVE in the signal SIGC, as described later.

In this manner, the skew information storage section 53 generates the emphasis control signals CTRLA, CTRLB, and CTRLC on the basis of the skew information INF. Further, the skew information storage section 53 supplies the emphasis control signals CTRLA, CTRLB, and CTRLC to the output section 66.

The output section 66 generates the signals SIGA, SIGB, and SIGC on the basis of the symbol signals Tx1, Tx2, and Tx3, the symbol signals D1, D2, and D3, the emphasis control signals CTRLA, CTRLB, and CTRLC, and the clock signal TxCK.

FIG. 20 illustrates a configuration example of the output section 66. The output section 66 includes a driver controller 67N, a driver controller 6713, and emphasis controllers 68A, 683, and 68C.

The driver controller 67N generates signals MAINAN, SUBAN, MAINBN, SUBBN, MAINCN, and SUBCN on the basis of the symbol signals Tx1, Tx2, and Tx3 that are related to the current symbol NS and on the basis of the clock signal TxCK. Specifically, the driver controller 67N determines each voltage state of the signals SIGA, SIGB, and SIGC, as illustrated in FIG. 3, on the basis of the current symbol NS indicated by the symbol signals Tx1, Tx2, and Tx3. Further, for example, in a case where the signal SIGA is brought into the voltage state SH, the driver controller 67N sets the signals MAINAN and SUBAN, respectively, to "1" and "0". In a case where the signal SIGA is brought into the voltage state SL, the driver controller 67N sets the signals MAINAN and SUBAN, respectively, to "0" and "1". In a case where the signal SIGA is brought into the voltage state SM, the driver controller 67N sets both the signals MAINAN and SUBAN to "1" or "0". The same holds true also for the signals MAINBN and SUBBN and for the signals MAINCN and SUBCN. Further, the driver controller 67N supplies the signals MAINAN and SUBAN, the signals MAINBN and SUBBN, and the signals MAINCN and SUBCN, respectively, to the emphasis controller 68A, the emphasis controller 68B, and the emphasis controller 68C.

The driver controller 67D generates signals MAINAD, SUBAD, MAINBD, SUBBD, MAINCD, and SUBCD on the basis of the symbol signals D1, D2, and D3 that are related to the symbol DS before the current symbol NS and on the basis of the clock signal TxCK. The driver controller 67D has a circuit configuration the same as that of the driver controller 67N. Further, the driver controller 67D supplies the signals MAINAD and SUBAD, the signals MAINBD and SUBCD, and the signals MAINCD and SUBCD, respectively, to the emphasis controller 68A, the emphasis controller 68B, and the emphasis controller 68C.

The emphasis controller 68A generates the eight signals UPAA0, UPAB0, UPAA1, UPAB1, DNAA0, DNAB0, DNAA1, and DNAB1 on the basis of the signals MAINAN and SUBAN and the signals MAINAD and SUBAD. The driver section 29A generates the signal SIGA on the basis of the signals UPAA0, UPAB0, UPAA1, UPAB1, DNAA0, DNAB0, DNAA1, and DNAB1 and on the basis of the emphasis control signal CTRLA supplied from the skew information storage section 53.

The emphasis controller 68B generates the eight signals UPBA0, UPBB0, UPBA1, UPBB1, DNBA0, DNBA0, DNBA1, and DNBB1 on the basis of the signals MAINBN and SUBBN and the signals MAINBD and SUBBD. The driver section 29B generates the signal SIGB on the basis of the signals UPBA0, UPBB0, UPBA1, UPBB1, DNBA0, DNBB0, DNBA1, and DNBB1 and on the basis of the emphasis control signal CTRLB supplied from the skew information storage section 53.

The emphasis controller 68C generates the eight signals UPCA0, UPCB0, UPCA1, UPCB1, DNCA0, DNBA0, DNCA1, and DNCB1 on the basis of the signals MAINCN and SUBCN and the signals MAINCD and SUBCD. The driver section 29C generates the signal SIGC on the basis of the signals UPCA0, UPCB0, UPCA1, UPCB1, DNCA0, DNCB0, DNCA1, and DNCB1 and on the basis of the emphasis control signal CTRLC supplied from the skew information storage section 53.

FIG. 21 illustrates operation examples of the emphasis controller 68A. FIGS. 22A to 22C each illustrate an operation example of the driver section 29A at a time when the signal SIGA is brought into the voltage state SH. FIGS. 23A to 23C each illustrate an operation example of the driver section 29A at a time when the signal SIGA is brought into the voltage state SM. FIGS. 24A to 24C each illustrate an operation example of the driver section 29A at a time when the signal SIGA is brought into the voltage state SL. It is to be noted that the emphasis controller 68A and the driver section 29A are described here by way of example; however, the same holds true also for the emphasis controller 68B and the driver section 29B, and the same holds true also for the emphasis controller 68C and the driver section 29C.

In a case where both of the signals MAINAN and SUBAN that are related to the current symbol NS are "0" or "1", the emphasis controller 68A sets the voltage of the signal SIGA to one of the three medium-level voltages VM0, VM1plus, and VM1minus as illustrated in FIGS. 23A to 23C.

Specifically, as illustrated in FIG. 21, for example, in a case where the signals MAINAD and SUBAD that are related to the symbol DS before the current symbol NS are, respectively, "0" and "0" and where the signals MAINAN and SUBAN that are related to the current symbol NS are, respectively, "0" and "0", the emphasis controller 68A sets the signals UPAA0, UPAB0, UPAA1, UPAB1, DNAB0, DNAB0, DNAA1, and DNAB1 to "11001100". This brings the transistor 91 in each of the circuits $UA0_1$ to $UA0_M$ and $UB0_1$ to $UB0_N$ into an ON state, and brings the transistor 94 in each of the circuits $DA0_1$ to $DA0_M$ and $DB0_1$ to $DB0_N$ into an ON state, in the driver section 29A, as illustrated in FIG. 23B. As a result, the signal SIGA has a voltage that is the medium-level voltage VM0, and the driver section 29A has an output termination resistor (an output impedance) of about 50[Ω]. The same holds true also for a case where the signals MAINAD and SUBAD that are related to the symbol DS before the current symbol NS are, respectively, "1" and "1" and where the signals MAINAN and SUBAN that are related to the current symbol NS are, respectively, "0" and "0". Further, the same holds true also for a case where the signals MAINAD and SUBAD that are related to the symbol DS before the current symbol NS are, respectively, "0" and "0" and where the signals MAINAN and SUBAN that are related to the current symbol NS are, respectively, "1" and "1". Furthermore, the same holds true also for a case where the signals MAINAD and SUBAD that are related to the symbol DS before the current symbol NS are, respectively, "1" and "1" and where the signals MAINAN and SUBAN that are related to the current symbol NS are, respectively, "1" and "1".

Further, for example, in a case where the signals MAINAD and SUBAD that are related to the symbol DS before the current symbol NS are, respectively, "0" and "1" and where the signals MAINAN and SUBAN that are related to the current symbol NS are, respectively, "0" and "0", the emphasis controller 68A sets the signals UPAA0, UPAB0, UPAA1, UPAB1, DNAA0, DNAB0, DNAA1, and DNAB1 to "11011000". This brings the transistor 91 in each of the circuits $UA0_1$ to $UA0_M$, $UB0_1$ to $UB0_N$, and $UB1_1$ to $UB1_N$ into an ON state, and brings the transistor 94 in each of the circuits $DA0_1$ to $DA0_M$ into an ON state, in the driver section 29A, as illustrated in FIG. 23A. As a result, the signal SIGA has a voltage that is the medium-level voltage VM1plus, and the driver section 29A has an output termination resistor (an output impedance) of about 50[Ω]. The same holds true also for a case where the signals MAINAD and SUBAD that are related to the symbol DS before the current symbol NS are, respectively, "0" and "1" and where the signals MAINAN and SUBAN that are related to the current symbol NS are, respectively, "1" and "1".

Furthermore, for example, in a case where the signals MAINAD and SUBAD that are related to the symbol DS before the current symbol NS are, respectively, "1" and "0" and where the signals MAINAN and SUBAN that are related to the current symbol NS are, respectively, "0" and "0", the emphasis controller 68A sets the signals UPAA0, UPAB0, UPAA1, UPAB1, DNAA0, DNAB0, DNAA1, and DNAB1 to "10001101". This brings the transistor 91 in each of the circuits $UA0_1$ to $UA0_M$ into an ON state, and brings the transistor 94 in each of the circuits $DA0_1$ to $DA0_M$, $DB0_1$ to $DB0_N$, and $DB1_1$ to $DB1_N$ into an ON state, in the driver section 29A, as illustrated in FIG. 23C. As a result, the signal SIGA has a voltage that is the medium-level voltage VM1minus, and the driver section 29A has an output termination resistor (an output impedance) of about 50[Ω]. The same holds true also for a case where the signals MAINAD and SUBAD that are related to the symbol DS before the current symbol NS are, respectively, "1" and "0" and where the signals MAINAN and SUBAN that are related to the current symbol NS are, respectively, "1" and "1".

Moreover, in a case where the signals MAINAN and SUBAN that are related to the current symbol NS are, respectively, "0" and "1", the emphasis controller 68A sets the voltage of the signal SIGA to one of the three low-level voltages VL0, VL1, and VL2, as illustrated in FIGS. 24A to 24C.

Specifically, for example, in a case where the signals MAINAD and SUBAD that are related to the symbol DS before the current symbol NS are, respectively, "1" and "0" and where the signals MAINAN and SUBAN that are related to the current symbol NS are, respectively, "0" and "1", the emphasis controller 68A sets the signals UPAA0, UPAB0, UPAA1, UPAB1, DNAA0, DNAB0, DNAA1, and DNAB1 to "00001111". This brings the transistor 94 in each of the circuits $DA0_1$ to $DA0_M$, $DB0_1$ to $DB0_N$, $DA1_1$ to $DA1_M$, and $DB1_1$ to $DB1_N$ into an ON state, in the driver section 29A, as illustrated in FIG. 24C. As a result, the signal SIGA has a voltage that is the low-level voltage VL2, and the driver section 29A has an output termination resistor (an output impedance) of about 50 [Ω].

Further, for example, in a case where the signals MAINAD and SUBAD that are related to the symbol DS before the current symbol NS are, respectively, "0" and "0" and where the signals MAINAN and SUBAN that are related to the current symbol NS are, respectively, "0" and "1", the emphasis controller 68A sets the signals UPAA0, UPAB0, UPAA1, UPAB1, DNAA0, DNAB0, DNAA1, and DNAB1 to "01001110". This brings the transistor 91 in each of the circuits $UB0_1$ to $UB0_N$ into an ON state, and brings the transistor 94 in each of the circuits $DA0_1$ to $DA0_M$, $DB0_1$ to $DB0_N$, and $DA1_1$ to $DA1_M$ into an ON state, in the driver section 29A, as illustrated in FIG. 24B. As a result, the signal SIGA has a voltage that is the low-level voltage VL1, and the driver section 29A has an output termination resistor (an output impedance) of about 50[Ω]. The same holds true also for a case where the signals MAINAD and SUBAD that are related to the symbol DS before the current symbol NS are, respectively, "1" and "1" and where the signals MAINAN and SUBAN that are related to the current symbol NS are, respectively, "0" and "1".

Furthermore, for example, in a case where the signals MAINAD and SUBAD that are related to the symbol DS before the current symbol NS are, respectively, "0" and "1" and where the signals MAINAN and SUBAN that are related to the current symbol NS are, respectively, "0" and "1", the emphasis controller 68A sets the signals UPAA0, UPAB0, UPAA1, UPAB1, DNAA0, DNAB0, DNAA1, and DNAB1 to "01011010". This brings the transistor 91 in each of the circuits $UB0_1$ to $UB0_N$ and UM to $UB1_N$ into an ON state, and brings the transistor 94 in each of the circuits $DA0_1$ to $DA0_M$ and $DA1_1$ to $DA1_M$ into an ON state, in the driver section 29A, as illustrated in FIG. 24A. As a result, the signal SIGA has a voltage that is the low-level voltage VL0, and the driver section 29A has an output termination resistor (an output impedance) of about 50 [Ω].

Moreover, in a case where the signals MAINAN and SUBAN that are related to the current symbol NS are respectively, "1" and "0", the emphasis controller 68A sets the voltage of the signal SIGA to one of the three high-level voltages VH0, VH1, and VH2, as illustrated in FIGS. 22A to 22C.

Specifically, for example, in a case where the signals MAINAD and SUBAD that are related to the symbol DS before the current symbol NS are, respectively, "0" and "1" and where the signals MAINAN and SUBAN that are related to the current symbol NS are, respectively. "1" and "0", the emphasis controller 68A sets the signals UPAA0, UPAB0, UPAA1, UPAB1, DNAA0, DNAB0, DNAA1, and DNAB1 to "11110000". This brings the transistor 91 in each of the circuits $UA0_1$ to $UA0_M$, $UB0_1$ to $UB0_N$, $UA1_1$ to $UA1_M$, and $UB1_1$ to $UB1_N$ into an ON state, in the driver section 29A, as illustrated in FIG. 22A. As a result, the signal SIGA has a voltage that is the high-level voltage VH2, and the driver section 29A has an output termination resistor (an output impedance) of about 50 [Ω].

Further, for example, in a case where the signals MAINAD and SUBAD that are related to the symbol DS before the current symbol NS are, respectively, "0" and "0" and where the signals MAINAN and SUBAN that are related to the current symbol NS are, respectively, "1" and "0", the emphasis controller 68A sets the signals UPAA0, UPAB0, UPAA1, UPAB1, DNAA0, DNAB0, DNAA1, and DNAB1 to "10110001". This brings the transistor 91 in each of the circuits $UA0_1$ to $UA0_M$, $UA1_1$ to $UA1_M$, and $UB1_1$ to $UB1_N$ into an ON state, and brings the transistor 94 in each of the circuits $DB1_1$ to $DB1_N$ into an ON state, in the driver section 29A, as illustrated in FIG. 22B. As a result, the signal SIGA has a voltage that is the high-level voltage VH1, and the driver section 29A has an output termination resistor (an output impedance) of about 50[Ω]. The same holds true also for a case where the signals MAINAD and SUBAD that are related to the symbol DS before the current symbol NS are, respectively, "1" and "1" and where the signals MAINAN and SUBAN that are related to the current symbol NS are, respectively, "1" and "0".

Furthermore, for example, in a case where the signals MAINAD and SUBAD that are related to the symbol DS before the current symbol NS are, respectively, "1" and "0" and where the signals MAINAN and SUBAN that are related to the current symbol NS are, respectively, "1" and "0", the emphasis controller 68A sets the signals UPAA0, UPAB0, UPAA1, UPAB1, DNAA0, DNAB0, DNAA1, and DNAB1 to "10100101". This brings the transistor 91 in each of the circuits $UA0_1$ to $UA0_M$ and $UA1_1$ to $UA1_M$ into an ON state, and brings the transistor 94 in each of the circuits $DB0_1$ to $DB0_N$ and $DB1_1$ to $DB1_N$ into an ON state, in the driver section 29A, as illustrated in FIG. 22C. As a result, the signal SIGA has a voltage that is the high-level voltage VH0, and the driver section 29A has an output termination resistor (an output impedance) of about 50 [Ω].

Similarly to the case of the foregoing first embodiment, in a case where the emphasis control signal CTRLA is "1", the emphasis voltage setting section 14 of the driver section 29A increases the number "N" and decreases the number "M", as compared with the case where the emphasis control signal CTRL is "0". Consequently, in the driver section 29A, the number of circuits, among the circuits UA0, UB0, UA1, and UB1, in which the transistor 91 is in an ON state is decreased, and the number of circuits, among the circuits DA0, DB0, DA1, and DB1, in which the transistor 94 is in an ON state is increased. As a result, the emphasis voltage ΔVE is increased. The same holds true also for the driver sections 29B and 29C.

In this manner, the output section 66 sets respective voltage states at the output terminals ToutA, ToutB, and ToutC on the basis of the current symbol NS, and sets voltage levels in the respective voltage states on the basis of the current symbol NS and the symbol DS before the current symbol NS. In this situation, the transmission device 50 operates in a manner similar to a so-called two-tap finite impulse response (FIR) filter, and performs the de-emphasis operation. This enables the communication system 2 to enhance the communication performance.

Further, in a case where there is skew in the communication system 2, the output section 66 sets the emphasis voltage ΔVE corresponding to the skew on the basis of the emphasis control signals CTRLA, CTRLB, and CTRLC. This enables the communication system 2 to reduce an influence of the skew on the communication performance. As a result, it becomes possible to enhance the communication performance.

(Concerning De-Emphasis Operation)

Next, description is given in detail of the de-emphasis operation. In the transmission device 50, the output section 66 sets respective voltage states at the output terminals ToutA, ToutB, and ToutC on the basis of the current symbol NS, and sets voltage levels in the respective voltage states on the basis of the current symbol NS and the symbol DS before the current symbol NS.

FIG. 25A illustrates voltage change of the signal SIGA in a case where the voltage state of the signal SIGA transitions from the voltage state SH to another voltage state. It is to be noted that the same holds true also for the signals SIGB and SIGC. In this FIG. 25A, ΔV denotes a difference between the high-level voltage VH0 and the medium-level voltage VM0, and likewise denotes a difference between the medium-level voltage VM0 and the low-level voltage VL0. The high-level voltage VH0, the medium-level voltage VM0, and the low-level voltage VL0 are each a reference voltage for the de-emphasis operation.

In a case where the voltage state of the signal SIGA transitions from the voltage state SH to the voltage state SM, the voltage of the signal SIGA changes from one of the three high-level voltages VH (VH0, VH1, and VH2) to the medium-level voltage VM1minus. Specifically, in this case, the voltage state in the symbol DS before the current symbol NS is the voltage state SH, and thus the signals MAINAD and SUBAD are, respectively, "1" and "0". The voltage state in the current symbol NS is the voltage state SM, and thus the signals MAINAN and SUBAN are, respectively, "0" and "0" for example. Accordingly, as illustrated in FIG. 21, the driver section 29A sets the voltage of the signal SIGA to the medium-level voltage VM1minus on the basis of the signals supplied from the emphasis controller 68A. That is, in this case, a transition amount of the signal SIGA is about (−ΔV), and thus the emphasis controller 68A sets the voltage of the signal SIGA after the transition to the medium-level voltage VM1minus that is one step lower than the medium-level voltage VM0 as a reference.

Further, in a case where the voltage state of the signal SIGA transitions from the voltage state SH to the voltage state SL the voltage of the signal SIGA changes from one of the three high-level voltages VH (VH0, VH1, and VH2) to the low-level voltage VL2. Specifically, in this case, the voltage state in the symbol DS before the current symbol NS is the voltage state SH, and thus the signals MAINAD and SUBAD are, respectively, "1" and "0". The voltage state in the current symbol NS is the voltage state SL, and thus the signals MAINAN and SUBAN are, respectively, "0" and "1". Accordingly, as illustrated in FIG. 21, the driver section 29A sets the voltage of the signal SIGA to the low-level voltage VL2 on the basis of the signals supplied from the emphasis controller 68A. That is, in this case, the transition amount of the signal SIGA is about (−2ΔV), and thus the emphasis controller 68A sets the voltage of the signal SIGA after the transition to the low-level voltage VL2 that is two steps lower than the low-level voltage VL0 as a reference.

Furthermore, in a case where the voltage state of the signal SIGA is maintained at the voltage state SH, the voltage of the signal SIGA changes from one of the three high-level voltages VH (VH0, VH1, and VH2) to the high-level voltage VH0. Specifically, in this case, the voltage state in the symbol DS before the current symbol NS is the voltage state SH, and thus the signals MAINAD and SUBAD are, respectively, "1" and "0". The voltage state in the current symbol NS is the voltage state SH, and thus the signals MAINAN and SUBAN are, respectively. "1" and "0". Accordingly, as illustrated in FIG. 21, the driver section 29A sets the voltage of the signal SIGA to the high-level voltage VH0 on the basis of the signals supplied from the emphasis controller 68A. In this manner, in a case where the voltage state of the signal SIGA is maintained at the voltage state SH during a plurality of unit intervals, the voltage of the signal SIGA is set to the high-level voltage VH0 in the second unit interval or thereafter in the transmission device 50. In other words, this high-level voltage VH0 is a voltage having been subjected to the de-emphasis.

FIG. 25B illustrates voltage change of the signal SIGA in a case where the voltage state of the signal SIGA transitions from the voltage state SM to another voltage state.

In a case where the voltage state of the signal SIGA transitions from the voltage state SM to the voltage state SH, the voltage of the signal SIGA changes from one of the three medium-level voltages VM (VM0, VMplus, and VMminus) to the high-level voltage VH1. Specifically, in this case, the voltage state in the symbol DS before the current symbol NS is the voltage state SM, and thus the signals MAINAD and SUBAD are, respectively. "0" and "0", for example. The voltage state in the current symbol NS is the voltage state SH, and thus the signals MAINAN and SUBAN are, respectively, "1" and "0". Accordingly, as illustrated in FIG. 21, the driver section 29A sets the voltage of the signal SIGA to the high-level voltage VH1 on the basis of the signals supplied from the emphasis controller 68A. That is, in this case, the transition amount of the signal SIGA is about (+ΔV), and thus the emphasis controller 68A sets the voltage of the signal SIGA after the transition to the high-level voltage VH1 that is one step higher than the high-level voltage VH0 as a reference.

Further, in a case where the voltage state of the signal SIGA transitions from the voltage state SM to the voltage state SI, the voltage of the signal SIGA changes from one of the three medium-level voltages VM (VM0, VM1plus, and VM1minus) to the low-level voltage VL1. Specifically, in this case, the voltage state in the symbol DS before the current symbol NS is the voltage state SM, and thus the signals MAINAD and SUBAD are, respectively, "0" and "0", for example. The voltage state in the current symbol NS is the voltage state SL, and thus the signals MAINAN and SUBAN are, respectively, "0" and "1". Accordingly, as illustrated in FIG. 21, the driver section 29A sets the voltage of the signal SIGA to the low-level voltage VIA on the basis of the signals supplied from the emphasis controller 68A. That is, in this case, the transition amount of the signal SIGA is about (−ΔV), and thus the emphasis controller 68A sets the voltage of the signal SIGA after the transition to the low-level voltage VL1 that is one step lower than the low-level voltage VL0 as a reference.

Furthermore, in a case where the voltage state of the signal SIGA is maintained at the voltage state SM, the voltage of the signal SIGA changes from one of the three medium-level voltages VM (VM0, VM1plus, and VM1minus) to the medium-level voltage VM0. Specifically, in this case, the voltage state in the symbol DS before the current symbol NS is the voltage state SM, and thus the signals MAINAD and SUBAD are, respectively, "0" and "0", for example. The voltage state in the current symbol NS is the voltage state SM, and thus the signals MAINAN and SUBAN are, respectively, "0" and "0", for example. Accordingly, as illustrated in FIG. 21, the driver section 29A sets the voltage of the signal SIGA to the medium-level voltage VM0 on the basis of the signals supplied from the emphasis controller 68A. In this manner, In a case where the voltage state of the signal SIGA is maintained at the voltage state SM during a plurality of unit intervals, the voltage of the signal SIGA is set to the medium-level voltage VM0 in the second unit interval or thereafter in the transmission device 50.

FIG. 25C illustrates voltage change of the signal SIGA in a case where the voltage state of the signal SIGA transitions from the voltage state SL to another voltage state.

In a case where the voltage state of the signal SIGA transitions from the voltage state SL to the voltage state SM, the voltage of the signal SIGA changes from one of the three high-level voltages VL (VL0, VL1, and VL2) to the medium-level voltage VM1plus. Specifically, in this case, the voltage state in the symbol DS before the current symbol NS is the voltage state SL, and thus the signals MAINAD and SUBAD are, respectively, "0" and "1". The voltage state in the current symbol NS is the voltage state SM, and thus the signals MAINAN and SUBAN are, respectively, "0" and "0", for example. Accordingly, as illustrated in FIG. 21, the driver section 29A sets the voltage of the signal SIGA to the medium-level voltage VM1plus on the basis of the signals supplied from the emphasis controller 68A. That is, in this case, the transition amount of the signal SIGA is about (+ΔV), and thus the emphasis controller 68A sets the voltage of the signal SIGA after the transition to the medium-level voltage VM1plus that is one step higher than the medium-level voltage VM0 as a reference.

Further, in a case where the voltage state of the signal SIGA transitions from the voltage state SL to the voltage state SH, the voltage of the signal SIGA changes from one of the three low-level voltages VL (VL0, VL1, and VL2) to the high-level voltage VH2. Specifically, in this case, the voltage state in the symbol DS before the current symbol NS is the voltage state SL, and thus the signals MAINAD and SUBAD are, respectively, "0" and "1". The voltage state in the current symbol NS is the voltage state SH, and thus the signals MAINAN and SUBAN are, respectively, "1" and "0". Accordingly, as illustrated in FIG. 21, the driver section 29A sets the voltage of the signal SIGA to the high-level voltage VH2 on the basis of the signals supplied from the emphasis controller 68A. That is, in this case, the transition amount of the signal SIGA is about (+2ΔV), and thus the emphasis controller 68A sets the voltage of the signal SIGA after the transition to the high-level voltage VH2 that is two steps higher than the high-level voltage VH0 as a reference.

Furthermore, in a case where the voltage state of the signal SIGA is maintained at the voltage state SL, the voltage of the signal SIGA changes front one of the three low-level voltages VL (VL0, VL1, and VL2) to the low-level voltage VL0. Specifically, in this case, the voltage state in the symbol DS before the current symbol NS is the voltage state SL, and thus the signals MAINAD and SUBAD are, respectively, "0" and "1". The voltage state in the current symbol NS is the voltage state SL, and thus the signals MAINAN and SUBAN are, respectively, "0" and "1". Accordingly, as illustrated in FIG. 21, the driver section 29A sets the voltage of the signal SIGA to the low-level voltage VL0 on the basis of the signals supplied from the emphasis controller 68A. In this manner, in a case where the voltage state of the signal SIGA is maintained at the voltage state SL during a plurality of unit intervals, the voltage of the signal SIGA is set to the low-level voltage VL0 in the second unit interval or thereafter in the transmission device 50. In other words, this low-level voltage VL0 is a voltage having been subjected to the de-emphasis.

In this manner, the transmission device 50 sets, in accordance with a transition amount of a voltage in association with transition of the voltage state, a voltage after the transition in each of the signals SIGA, SIGB, and SIGC. Specifically, in a case where the voltage state transitions to a state one step higher, the transmission device 50 sets the voltage after the transition to a voltage one step higher than a reference voltage (e.g., the medium-level voltage VM0 or the high-level voltage VH0). In other words, in this case, the transmission device 50 sets a positive emphasis voltage ΔVE equivalent to one step. Further, in a case where the voltage state transitions to a state two steps higher, the transmission device 50 sets the voltage after the transition to a voltage two steps higher than a reference voltage (e.g., the high-level voltage VH0), In other words, in this case, the transmission device 50 sets a positive emphasis voltage ΔVE equivalent to two steps. Furthermore, in a case where the voltage state transitions to a state one step lower, the transmission device 50 sets the voltage after the transition to a voltage one step lower than a reference voltage (e.g., the medium-level voltage VM0 or the low-level voltage VL0). In other words, in this case, the transmission device 50 sets a negative emphasis voltage ΔVE equivalent to one step. Moreover; in a case where the voltage state transitions to a state two steps lower, the transmission device 50 sets the voltage after the transition to a voltage two steps lower than a reference voltage (e.g., the low-level voltage VH0). In other words, in this case, the transmission device 50 sets a negative emphasis voltage ΔVE equivalent to two steps. In this manner, the transmission device 50 so sets, in accordance with the transition amount of the voltage, the emphasis voltage ΔVE as to be proportional to the transition amount, in each of the signals SIGA, SIGB, and SIGC.

FIGS. 26A to 26E each illustrate an operation example of the communication system 1 in a case where the symbol transitions from "+x" to any of the symbols other than "+x". FIG. 26A illustrates a case where the symbol transitions from "+x" to "−x". FIG. 26B illustrates a case where the symbol transitions from "+x" to "+y". FIG. 26C illustrates a case where the symbol transitions from "+x" to "−y", FIG. 26D illustrates a case where the symbol transitions from "+x" to "+z". FIG. 26E illustrates a case where the symbol transitions from "+x" to "−z". In each of FIGS. 26A to 26E, solid lines each indicate a waveform at a time when the de-emphasis operation is performed, and broken lines each indicate a waveform at a time when no de-emphasis operation is performed. Further, although the voltage of the signal SIGA before the transition is one of the three high-level voltages VH, the voltage of the signal SIGA is set to the high-level voltage VH0 in this diagram, for the sake of convenience of description. Likewise, the voltage of the signal SIGB before the transition is set to the low-level voltage VL0, and the voltage of the signal SIGC before the transition is set to the medium-level voltage VM0.

As illustrated in (A) of FIG. 26A, in a case where the symbol transitions from "+x" to "−x", the signal SIGA changes from the high-level voltage VH0 to the low-level voltage VL2, the signal SIGB changes from the low-level voltage VL0 to the high-level voltage VH2, and the signal SIGC is maintained at the medium-level voltage VM0. That is, the transition amount of the signal SIGA is about (−2ΔV), and thus the transmission device 50 sets the voltage of the signal SIGA to the low-level voltage VL2 that is two steps lower than the low-level voltage VL0 as a reference. Further, the transition amount of the signal SIGB is about (+2ΔV), and thus the transmission device 50 sets the voltage of the signal SIGB to the high-level voltage VH2 that is two steps higher than the high-level voltage VH0 as a reference. At this time, as illustrated in (B) of FIG. 26A, a transition amount of the difference AB (SIGA−SIGB) is about (−4ΔV), and thus the difference AB after the transition is four steps lower than the case where no de-emphasis operation is performed. Further, a transition amount of the difference BC (SIGB−SIGC) is about (+2ΔV), and thus the difference BC after the transition is two steps higher than the case where no de-emphasis operation is performed. Furthermore, a transition amount of the difference CA (SIGC−SIGA) is about (+2ΔV), and thus the difference CA after the transition is two steps higher than the case where no de-emphasis operation is performed.

As illustrated in (A) of FIG. 26B, in a case where the symbol transitions from "+x" to "+y", the signal SIGA changes from the high-level voltage VH0 to the medium-level voltage VM1minus, the signal SIGB changes from the low-level voltage VL0 to the high-level voltage VH2, and the signal SIGC changes from the medium-level voltage VM0 to the low-level voltage VL1. That is, the transition amount of the signal SIGA is about (−ΔV), and thus the transmission device 50 sets the voltage of the signal SIGA to the medium-level voltage VM1minus that is one step lower than the medium-level voltage VM0 as a reference. Further, the transition amount of the signal SIGB is about (+2ΔV), and thus the transmission device 50 sets the voltage of the signal SIGB to the high-level voltage VH2 that is two steps higher than the high-level voltage VH0 as a reference. Furthermore, the transition amount of the signal SIGC is about (−ΔV), and thus the transmission device 50 sets the voltage of the signal SIGC to the low-level voltage V1A that is one step lower than the low-level voltage VL0 as a reference. At this time, as illustrated in (B) of FIG. 26B, the transition amount of the difference AB (SIGA−SIGB) is about (−3ΔV), and thus the difference AB after the transition is three steps lower than the case where no de-emphasis operation is performed. Further, the transition amount of the difference BC (SIGB−SIGC) is about (+3ΔV), and thus the difference BC after the transition is three steps higher than the case where no de-emphasis operation is performed.

As illustrated in (A) of FIG. 26C, in a case where the symbol transitions from "+x" to "−y", the signal SIGA changes from the high-level voltage VH0 to the medium-level voltage VM1minus, the signal SIGB is maintained at the low-level voltage VL0, and the signal SIGC changes from the medium-level voltage VM0 to the high-level voltage VH1. That is, the transition amount of the signal SIGA is about (−ΔV), and thus the transmission device 50 sets the voltage of the signal SIGA to the medium-level voltage VM1minus that is one step lower than the medium-level voltage VM0 as a reference. Further, the transition amount of the signal SIGC is about (+ΔV), and thus the transmission device 50 sets the voltage of the signal SIGC to the high-level voltage VH1 that is one step higher than the high-level voltage VH0 as a reference. At this time, as illustrated in (B) of FIG. 26C, the transition amount of the difference AB (SIGA−SIGB) is about (−ΔV), and thus the difference AB after the transition is one step lower than the case where no de-emphasis operation is performed. Further, the transition amount of the difference BC (SIGB−SIGC) is about (−ΔV), and thus the difference BC after the transition is one step lower than the case where no de-emphasis operation is performed. Furthermore, the transition amount of the difference CA (SIGC−SIGA) is about (+2ΔV), and thus the difference CA after the transition is two steps higher than the case where no de-emphasis operation is performed.

As illustrated in (A) of FIG. 26D, in a case where the symbol transitions from "+x" to "+z", the signal SIGA changes from the high-level voltage VH0 to the low-level voltage VL2, the signal SIGB changes from the low-level voltage VL0 to the medium-level voltage VM1plus, and the signal SIGC changes from the medium-level voltage VM0 to the high-level voltage VH1. That is, the transition amount of the signal SIGA is about −2×V), and thus the transmission device 50 sets the voltage of the signal SIGA to the low-level voltage VL2 that is two steps lower than the low-level voltage VL0 as a reference. Further, the transition amount of the signal SIGB is about (+ΔV), and thus the transmission device 50 sets the voltage of the signal SIGB to the medium-level voltage VM1plus that is one step higher than the medium-level voltage VM0 as a reference. Furthermore, the transition amount of the signal SIGC is about (+ΔV), and thus the transmission device 50 sets the voltage of the signal SIGC to the high-level voltage VH1 that is one step higher than the high-level voltage VH0 as a reference. At this time, as illustrated in (B) of FIG. 26D, the transition amount of the difference AB (SIGA−SIGB) is about (−3ΔV), and thus the difference AB after the transition is three steps lower than the case where no de-emphasis operation is performed. Further, the transition amount of the difference CA (SIGC−SIGA) is about (+3ΔV), and thus the difference CA after the transition is three steps higher than the case where no de-emphasis operation performed.

As illustrated in (A) of FIG. 26E, in a case where the symbol transitions from "+x" to "−z", the signal SIGA is maintained at the high-level voltage VH0, the signal SIGB changes from the low-level voltage VL0 to the medium-level voltage VM1plus, and the signal SIGC changes from the medium-level voltage VM0 to the low-level voltage VL1. That is, the transition amount of the signal SIGB is about (+ΔV), and thus the transmission device 50 sets the voltage of the signal SIGB to the medium-level voltage VM1plus that is one step higher than the medium-level voltage VM0 as a reference. Furthermore, the transition amount of the signal SIGC is about (−ΔV), and thus the transmission device 50 sets the voltage of the signal SIGC to the low-level voltage VL1 that is one step lower than the low-level voltage VL0 as a reference. At this time, as illustrated in (B) of FIG. 26E, the transition amount of the difference AB (SIGA−SIGB) is about (−ΔV), and thus the difference AB after the transition is one step lower than the case where no de-emphasis operation is performed. Further, the transition amount of the difference BC (SIGB−SIGC) is about (+2ΔV), and thus the difference BC after the transition is two steps higher than the case where no de-emphasis operation is performed. Furthermore, the transition amount of the difference CA (SIGC−SIGA) is about (−ΔV), and thus the difference CA after the transition is one step lower than the case where no de-emphasis operation is performed.

In this manner, in the communication system 2, the emphasis voltage ΔVE is set in accordance with the transition amount of the voltage in each of the signals SIGA, SIGB, and SIGC. In other words, the transmission device 50 performs the de-emphasis operation on each (a single-ended signal) of the signals SIGA, SIGB, and SIGC. As a result, it becomes possible for the communication system 2 to enhance the waveform quality for each of the signals SIGA, SIGB, and SIGC and thus to enhance the communication performance.

Further, in the communication system 2, an emphasis voltage is thus set for each of the signals SIGA, SIGB, and SIGC, thereby allowing the emphasis voltage to be set in accordance with the transition amount of the voltage also in each of the differences AB, BC, and CA as differential signals. As a result, it becomes possible for the communication system 2 to enhance the waveform quality also for each of the differences AB, BC, and CA and thus to enhance the communication performance.

(Concerning Setting of Emphasis Voltage ΔVE)

Next, description is given in detail of an operation of setting the emphasis voltage ΔVE on the basis of the skew information INF. The skew information storage section 53 generates the emphasis control signals CTRLA, CTRLB, and CTRLC on the basis of the skew information INF.

Specifically, for example, in a case where the skew information INF is information indicating that the delay time in the line 110A of the transmission path 100 is short, the skew information storage section 53 sets both the emphasis control signals CTRLB and CTRLC to "1" (active), and sets the emphasis control signal CTRLA to "0" (non-active). This causes the output section 66 to make the emphasis voltage ΔVE in each of the signals SIGB and SIGC larger than the emphasis voltage ΔVE in the signal SIGA. As a result, it becomes possible to shorten the transition time of each of the signals SIGB and SIBC, thus making it possible to broaden the eye opening in the eye diagram of the differences AB, BC, and CA similarly to the case of the foregoing first embodiment. As a result, it becomes possible to enhance the communication performance.

Likewise, for example, in a case where the skew information INF is information indicating that the delay time in the line 110B of the transmission path 100 is short, the skew information storage section 53 sets both the emphasis control signals CTRLA and CTRLC to "1" (active), and sets the emphasis control signal CTRLB to "0" (non-active). This causes the output section 66 to make the emphasis voltage ΔVE in each of the signals SIGA and SIGC larger than the emphasis voltage ΔVE in the signal SIGB. As a result, it becomes possible to shorten the transition time of each of the signals SIGA and SIGC, thus making it possible to broaden the eye opening in the eye diagram of the differences AB, BC, and CA similarly to the case of the foregoing first embodiment. As a result, it becomes possible to enhance the communication performance.

Likewise, for example, in a case where the skew information INF is information indicating that the delay time in the line 110O of the transmission path 100 is short, the skew information storage section 53 sets both the emphasis control signals CTRLA and CTRLB to "1" (active), and sets the emphasis control signal CTRLC to "0" (non-active). This causes the output section 66 to make the emphasis voltage ΔVE in each of the signals SIGA and SIGB larger than the emphasis voltage ΔVE in the signal SIGC. As a result, it becomes possible to shorten the transition time of each of the signals SIGA and SIGB, thus making it possible to broaden the eye opening in the eye diagram of the differences AB, BC, and CA similarly to the case of the foregoing first embodiment. As a result, it becomes possible to enhance the communication performance.

In this manner, in the communication system 2, the emphasis voltage ΔVE is set on the basis of the skew information INF. This enables the communication system 2 to change the transition time of each of the differences AB, BC, and CA depending on skew, thus making it possible to reduce the influence of the skew on the communication performance.

As described above, in the present embodiment, the emphasis voltage is set in accordance with the transition amount of the voltage in each of the signals SIGA, SIGB, and SIGC, making it possible to enhance the waveform quality for each of the signals SIGA, SIGB, and SIGC and thus to enhance the communication performance. Other effects are similar to those of the case of the foregoing first embodiment.

Modification Example 2-1

In the foregoing embodiment, the output section 66 generates the signals SIGA, SIGB, and SIGC on the basis of the symbol signals Tx1, Tx2, and Tx3, and the symbol signals D1, D2, and D3; however, this is not limitative. Description is given below in detail of a transmission device 50A according to the present modification example.

FIG. 27 illustrates a configuration example of a transmitter 60A of the transmission device 50A. The transmitter 60A includes the transmission symbol generator 22, the skew information storage section 53, and an output section 66A. The output section 66A generates the signals SIGA, SIGB, and SIGC on the basis of the symbol signals Tx1, Tx2, and Tx3, the emphasis control signals CTRLA, CTRLB, and CTRLC, and the clock signal TxCK.

FIG. 28 illustrates a configuration example of the output section 66A. The output section 66A includes the driver controller 67N, and flip-flops 17A, 17B, and 17C. The driver controller 67N generates the signals MAINAN, SUBAN, MAINBN, SUBBN, MAINCN, and SUBCN on the basis of the symbol signals Tx1, Tx2, and Tx3 that are related to the current symbol NS and on the basis of the clock signal TxCK. The flip-flop 17A delays the signals MAINAN and SUBAN by one clock period behind the clock signal TxCK, and outputs the respective delayed signals as the signals MAINAD and SUBAD. The flip-flop 17B delays the signals MAINBN and SUBBN by one clock period behind the clock signal TxCK, and outputs the respective delayed signals as the signals MAINBD and SUBBD. The flip-flop 17C delays the signals MAINCN and SUBCN by one clock period behind the clock signal TxCK, and outputs the respective delayed signals as the signals MAINCD and SUBCD.

Such a configuration also makes it possible to achieve effects similar to those of the case of the foregoing embodiment.

Modification Example 2-2

In the foregoing embodiment; the transmission device 50 performs the de-emphasis operation; however, this is not limitative. The transmission device 50 may also perform the pre-emphasis operation. FIG. 29 illustrates the three voltage states SH, SM, and SL. The voltage state SH is a state corresponding to the three high-level voltages VH (VH0, VH1, and VH2). The voltage state SM is a state corresponding to the three medium-level voltages VM (VM0, VM1plus, and VM1minus). The voltage state SL is a state corresponding to the three low-level voltages VL (VL0, VL1, and VL2). The high-level voltage VH0 is a high-level voltage in a case where no pre-emphasis operation is performed. The medium-level voltage VM0 is a medium-level voltage in a case where no pre-emphasis operation is performed. The low-level voltage VL0 is a low-level voltage in a case where no pre-emphasis operation is performed. Such a configuration also makes it possible to achieve effects similar to those of the case of the foregoing embodiment.

3. APPLICATION EXAMPLE

Description is given next of an application example of the communication system described in any of the foregoing embodiments and modification examples.

Application Example 1

FIG. 30 illustrates an appearance of a smartphone 300 (a multi-functional mobile phone) to which the communication system according to any of the foregoing embodiments, etc. is applied. Various devices are mounted in the smartphone 300. The communication system according to any of the foregoing embodiments, etc. is applied to a communication system that exchanges data between these devices.

FIG. 31 illustrates a configuration example of an application processor 310 used in the smartphone 300. The application processor 310 includes a central processing unit (CPU) 311, a memory controller 312, a power supply controller 313, an external interface 314, a graphics processing unit (GPU) 315, a media processor 316, a display controller 317, and a mobile industry processor interface (MIN) interface 318. In this example, the CPU 311, the memory controller 312, the power supply controller 313, the external external interface 314, the GPU 315, the media processor 316, and the display controller 317 are coupled to a system bus 319 to allow for mutual data exchange via the system bus 319.

The CPU 311 processes various pieces of information handled in the smartphone 300 in accordance with a program. The memory controller 312 controls a memory 501 used at a time when the CPU 311 performs information processing. The power supply controller 313 controls a power supply of the smartphone 300.

The external interface 314 is an interface for communication with external devices. In this example, the external interface 314 is coupled to a wireless communication section 502 and an image sensor 410. The wireless communication section 502 performs wireless communication with mobile phone base stations. The wireless communication section 502 includes, for example, a baseband section, a radio frequency (RF) front end section, and other components. The image sensor 410 acquires an image, and includes, for example, a CMOS sensor.

The GPU 315 performs image processing. The media processor 316 processes information such as voice, letters, and graphics. The display controller 317 controls a display 504 via the MIPI interface 318. The MIPI interface 318 transmits an image signal to the display 504. As the image signal, for example, a YUV-format signal, an RGB-format signal, or any other format signal may be used. The MIPI interface 318 operates on the basis of a reference clock supplied from an oscillator circuit 330 including a crystal resonator, for example. For example, the communication system according to any of the foregoing embodiments, etc. is applied to a communication system between the MIPI interface 318 and the display 504.

FIG. 32 illustrates a configuration example of the image sensor 410. The image sensor 410 includes a sensor section 411, an image signal processor (ISP) 412, a joint photographic experts group (MEG) encoder 413, a CPU 414, a random access memory (RAM) 415, a read only memory (ROM) 416, a power supply controller 417, an inter-integrated circuit ($I^2C$) interface 418, and an MIPI interface 419. In this example, these blocks are coupled to a system bus 420 to allow for mutual data exchange via the system bus 420.

The sensor section 411 acquires an image, and is configured by, for example, a CMOS sensor. The ISP 412 performs a predetermined processing on the image acquired by the sensor section 411. The JPEG encoder 413 encodes the image processed by the ISP 412 to generate a JPEG-format image. The CPU 414 controls respective blocks of the image sensor 410 in accordance with a program. The RAM 415 is a memory used at a time when the CPU 414 performs information processing. The ROM 416 stores a program to be executed in the CPU 414, a setting value obtained by calibration, and any other information. The power supply controller 417 controls a power supply of the image sensor 410. The $I^2C$ interface 418 receives a control signal from the application processor 310. Although not illustrated, the image sensor 410 also receives a clock signal from the application processor 310, in addition to the control signal. Specifically, the image sensor 410 is configured to be operable on the basis of clock signals of various frequencies. The MIPI interface 419 transmits an image signal to the application processor 310. As the image signal, for example, a YIN-format signal, an RGB-format signal, or any other format signal may be used. The MIPI interface 419 operates on the basis of a reference clock supplied from an oscillator circuit 430 including a crystal resonator, for example. For example, the communication system according to any of the foregoing embodiments, etc, is applied to a communication system between the MIPI interface 419 and the application processor 310.

Application Example 2

FIG. 33 illustrates a configuration example of a vehicle control system 600 to which the communication system according to any of the foregoing embodiments, etc. is applied. The vehicle control system 600 controls operations of an automobile, an electric vehicle, a hybrid electric vehicle, a two-wheeled vehicle, and the like. This vehicle control system 600 includes a driving system control unit 610, a body system control unit 620, a battery control unit 630, an outside-vehicle information detecting unit 640, an in-vehicle information detecting unit 650, and an integrated control unit 660. These units are coupled to one another via a communication network 690. As the communication network 690, for example, a network in conformity with any standard such as a controller area network (CAN), a local interconnect network (LIN), a local area network (LAN), and FlexRay (Registered Trademark) may be used. Each of the units includes, for example, a microcomputer, a storage section, a drive circuit that drives a device to be controlled, a communication IX, and the like.

The driving system control unit 610 controls operations of devices related to a driving system of a vehicle. A vehicle state detecting section 611 is coupled to the driving system control unit 610. The vehicle state detecting section 611 detects a state of the vehicle. The vehicle state detecting section 611 includes a gyro sensor, an acceleration sensor, a sensor that detects an amount of operation of an accelerator pedal and a brake pedal or a steering angle, or any other sensor, for example. The driving system control unit 610 controls the operations of the devices related to the driving system of the vehicle on the basis of information detected by the vehicle state detecting section 611. For example, the communication system of any of the foregoing embodiments, etc. is applied to a communication system between the driving system control unit 610 and the vehicle state detecting section 611.

The body system control unit 620 controls operations of various devices mounted on the vehicle, such as a keyless entry system, a power window device, and various lamps.

The battery control unit 630 controls a battery 631. The battery 631 is coupled to the battery control unit 630. The battery 631 supplies power to a driving motor, and includes, for example, a secondary battery, a cooling system, and the like. The battery control unit 630 acquires information such as temperature, an output voltage, and a remaining battery amount from the battery 631, and controls the cooling system, etc. of the battery 631 on the basis of the information. For example, the communication system of any of the foregoing embodiments, etc. is applied to a communication system between the battery control unit 630 and the battery 631.

The outside-vehicle information detecting unit 640 detects information outside the vehicle. An imaging section 641 and an outside-vehicle information detecting section 642 are coupled to the outside-vehicle information detecting unit 640. The imaging section 641 captures an image outside the vehicle, and includes, for example, a time of flight (ToF) camera, a stereo camera, a monocular camera, an infrared camera, and the like. The outside-vehicle information detecting section 642 detects information outside the vehicle, and includes, for example, a sensor that detects weather and climate, a sensor that detects other vehicles around the vehicle, an obstacle, a pedestrian, etc., and any other sensor. The outside-vehicle information detecting unit 640 recognizes, for example, weather and climate, a road surface condition, etc. on the basis of the image acquired by the imaging section 641 as well as the information detected by the outside-vehicle information detecting section 642, and detects objects such as other vehicles around the vehicle, an obstacle, a pedestrian, a sign, and letters on a road, or detects a distance between the object and the vehicle. For example, the communication system of any of the foregoing embodiments, etc. is applied to a communication system between the outside-vehicle information detecting unit 640 and each of the imaging section 641 and the outside-vehicle information detecting section 642.

The in-vehicle information detecting unit 650 detects information inside the vehicle. A driver state detecting section 651 is coupled to the in-vehicle information detecting unit 650. The driver state detecting section 651 detects a state of a driver, and includes, for example, a camera, a biosensor, a microphone, and the like. The in-vehicle information detecting unit 650 monitors, for example, a degree of fatigue of the driver or a degree of concentration of the driver, whether the driver is dozing, and any other factor, on the basis of information detected by the driver state detecting section 651. For example, the communication system of any of the foregoing embodiments, etc. is applied to a communication system between the in-vehicle information detecting unit 650 and the driver state detecting section 651.

The integrated control unit 660 controls operations of the vehicle control system 600. An operating section 661, a display section 662, and an instrument panel 663 are coupled to the integrated control unit 660. An occupant operates the operating section 661. The operating section 661 includes, for example, a touch panel, various buttons, switches, and the like. The display section 662 displays an image, and is configured by, for example, a liquid crystal display panel, etc. The instrument panel 663 displays a state of the vehicle, and includes meters such as a speed meter, various warning lamps, and the like. For example, the communication system of any of the foregoing embodiments, etc. is applied to a communication system between the integrated control unit 660 and each of the operating section 661, the display section 662, and the instrument panel 663.

Although the technology has been described above referring to some embodiments and modification examples as well as application examples to electronic apparatuses, the technology is not limited to these embodiments, etc., and may be modified in a variety of ways.

For example, in the foregoing respective embodiments, etc., the output sections 26 and 66 each set the emphasis voltage $\Delta VE$ by changing the numbers "M" and "N" in the driver sections 29A, 29B, and 29C; however, this is not limitative.

It is to be noted that effects described herein are merely illustrative and are not limitative, and may have other effects.

It is to be noted that the technology may have the following configurations.

(1)

A transmission device including: a plurality of driver sections each configured to transmit a signal using a first voltage state, a second voltage state, and a third voltage state, and to be able to set a voltage in each of the voltage states, the third voltage state being a state between the first voltage state and the second voltage state; and a controller that causes the plurality of driver sections to perform emphasis by setting an emphasis voltage in each of the driver sections on the basis of skew information.

(2)

The transmission device according to (1), in which the plurality of driver sections include a first driver section that selectively sets a voltage state at a first output terminal to one of the first voltage state, the second voltage state, and the third voltage state, a second driver section that selectively sets a voltage state at a second output terminal to one of the first voltage state, the second voltage state, and the third voltage state, and a third driver section that selectively sets a voltage state at a third output terminal to one of the first voltage state, the second voltage state, and the third voltage state, and the voltage state at the first output terminal, the voltage state at the second output terminal, and the voltage state at the third output terminal differ from one another.

(3)

The transmission device according to (2), in which a data signal to be transmitted by each of the plurality of driver sections indicates a sequence of a symbol, and the controller causes the plurality of driver sections to perform the emphasis upon occurrence of a predetermined symbol transition in the sequence.

(4)

The transmission device according to (3), in which the predetermined symbol transition includes a first symbol transition and a second symbol transition, and the controller sets, on the basis of the skew information, the emphasis voltage in each of the driver sections at the first symbol transition to a voltage larger than the emphasis voltage in each of the driver sections at the second symbol transition.

(5) The transmission device according to (3) or (4), in which the predetermined symbol transition is a symbol transition in which the voltage state at the first output terminal, the voltage state at the second output terminal, and the voltage state at the third output terminal each change.

(6) The transmission device according to any one of (3) to (5), in which the controller sets the emphasis voltage for a voltage in the third voltage state.

(7) The transmission device according to (6), in which the controller further selectively sets the emphasis voltage for a voltage in the first voltage state or a voltage in the second voltage state.

(8) The transmission device according to any one of (3) to (7), further including a signal generator that generates, on the basis of a transition signal indicating a symbol transition, a symbol signal indicating a symbol, in which
the controller determines whether to cause the plurality of driver sections to perform the emphasis by detecting the predetermined symbol transition on the basis of the transition signal.

(9) The transmission device according to (2), in which
a data signal to be transmitted by each of the plurality of driver sections indicates a sequence of a symbol, and
the controller sets, on the basis of the skew information, the emphasis voltage in one of the plurality of driver sections to a voltage larger than the emphasis voltage in another one of the plurality of driver sections.

(10) The transmission device according to (9), in which the controller sets the emphasis voltage in the first driver section in a case where the voltage state at the first output terminal transitions from the first voltage state to the second voltage state to a voltage larger than the emphasis voltage in the first driver section in a case where the voltage state at the first output terminal transitions from the first voltage state to the third voltage state.

(11) The transmission device according to (10), further including a signal generator that generates, on the basis of a transition signal indicating a symbol transition, a first symbol signal and a second symbol signal indicating a symbol before a symbol indicated by the first symbol signal, in which
the controller sets, on the basis of the first symbol signal and the second symbol signal, the emphasis voltage in the first driver section.

(12) The transmission device according to (10), further including a signal generator that generates a symbol signal on the basis of a transition signal indicating a symbol transition, in which
the controller sets the emphasis voltage in the first driver section on the basis of a sequence of a symbol indicated by the symbol signal.

(13) The transmission device according to any one of (2) to (13), in which
the first driver section includes
a first circuit provided on a path from a first power supply to the first output terminal, and
a second circuit provided on a path from a second power supply to the first output terminal, and
the controller sets the emphasis voltage in the first driver section by setting an impedance ratio between impedance of the first circuit and impedance of the second circuit.

(14) The transmission device according to (13), in which the controller sets the impedance ratio to allow parallel impedance of the impedance of the first circuit and the impedance of the second circuit to be constant.

(15) The transmission device according to (13) or (14), in which
the first circuit includes a plurality of first sub-circuits each including a first resistor and a first transistor that are provided on the path from the first power supply to the first output terminal,
the second circuit includes a plurality of second sub-circuits each including a second resistor and a second transistor that are provided on the path from the second power supply to the first output terminal, and
the controller sets the emphasis voltage in the first driver section by setting number of the first transistor to be brought into an ON state, out of a plurality of the first transistors in the first circuit, and by setting number of the second transistor to be brought into an ON state, out of a plurality of the second transistors in the second circuit.

(16) The transmission device according to (15), in which
the plurality of first sub-circuits are grouped into a plurality of first groups,
the plurality of second sub-circuits are grouped into a plurality of second groups, and
the controller sets the emphasis voltage in the first driver section by turning the plurality of the first transistors in the first circuit ON and OFF in a unit of the first group and by filming the plurality of the second transistors in the second circuit ON and OFF in a unit of the second group.

(17) The transmission device according to (16) in which
the plurality of the first groups includes a first sub-group and a second sub-group, and
number of the first sub-circuits belonging to the first sub-group differs from number of the first sub-circuits belonging to the second sub-group.

(18) A transmission method including:
causing a plurality of driver sections to transmit a signal using a first voltage state, a second voltage state, and a third voltage state between the first voltage state and the second voltage state; and
causing the plurality of driver sections to perform emphasis by setting an emphasis voltage in each of the driver sections on the basis of skew information.

(19) A communication system including:
a transmission device; and
a reception device,
the transmission device including
a plurality of driver sections each configured to transmit a signal using a first voltage state, a second voltage state, and a third voltage state, and to be able to set a voltage in each of the voltage states, the third voltage state being a state between the first voltage state and the second voltage state, and a controller that causes the plurality of driver sections to perform emphasis by setting an emphasis voltage in each of the driver sections on the basis of skew information.

This application claims the benefit of Japanese Priority Patent Application JP2016-038854 filed with the Japan Patent Office on Mar. 1, 2016, the entire contents of which are incorporated herein by reference.

It should be understood by those skilled in the art that various modifications, combinations, sub-combinations, and alterations may occur in accordance with design requirements and other factors insofar as they are within the scope of the appended claims or the equivalents thereof

The invention claimed is:

1. A transmission device comprising:
   three driver sections each configured to transmit a signal having one of a first voltage state, a second voltage state, or a third voltage state, respectively, such that the three driver sections are configured to collectively use each of the first voltage state, the second voltage state, and the third voltage state, and to be able to set a voltage in each of the voltage states, the third voltage state being a state between the first voltage state and the second voltage state; and
   a controller that causes the three driver sections to perform emphasis by setting an emphasis voltage in each of the driver sections on a basis of skew information.

2. The transmission device according to claim 1, wherein the three driver sections are
   a first driver section that selectively sets a voltage state at a first output terminal to one of the first voltage state, the second voltage state, or the third voltage state,
   a second driver section that selectively sets a voltage state at a second output terminal to one of the first voltage state, the second voltage state, or the third voltage state, and
   a third driver section that selectively sets a voltage state at a third output terminal to one of the first voltage state, the second voltage state, or the third voltage state, and
   the voltage state at the first output terminal, the voltage state at the second output terminal, and the voltage state at the third output terminal differ from one another.

3. The transmission device according to claim 2, wherein a data signal to be transmitted by each of the three driver sections indicates a sequence of a symbol, and
   the controller causes the three driver sections to perform the emphasis upon occurrence of a predetermined symbol transition in the sequence.

4. The transmission device according to claim 3, wherein the predetermined symbol transition includes a first symbol transition and a second symbol transition, and
   the controller sets, on the basis of the skew information, the emphasis voltage in each of the driver sections at the first symbol transition to a voltage larger than the emphasis voltage in each of the driver sections at the second symbol transition.

5. The transmission device according to claim 3, wherein the predetermined symbol transition is a symbol transition in which the voltage state at the first output terminal, the voltage state at the second output terminal, and the voltage state at the third output terminal each change.

6. The transmission device according to claim 3, wherein the controller sets the emphasis voltage for a voltage in the third voltage state.

7. The transmission device according to claim 6, wherein the controller further selectively sets the emphasis voltage for a voltage in the first voltage state or a voltage in the second voltage state.

8. The transmission device according to claim 3, further comprising a signal generator that generates, on a basis of a transition signal indicating a symbol transition, a symbol signal indicating a symbol, wherein
   the controller determines whether to cause the three driver sections to perform the emphasis by detecting the predetermined symbol transition on the basis of the transition signal.

9. The transmission device according to claim 2, wherein a data signal to be transmitted by each of the three driver sections indicates a sequence of a symbol, and
   the controller sets on the basis of the skew information, the emphasis voltage in one of the three driver sections to a voltage larger than the emphasis voltage in another one of the three driver sections.

10. The transmission device according to claim 9, wherein the controller sets the emphasis voltage in the first driver section in a case where the voltage state at the first output terminal transitions from the first voltage state to the second voltage state to a voltage larger than the emphasis voltage in the first driver section in a case where the voltage state at the first output terminal transitions from the first voltage state to the third voltage state.

11. The transmission device according to claim 10, further comprising a signal generator that generates, on a basis of a transition signal indicating a symbol transition a first symbol signal and a second symbol signal indicating a symbol before a symbol indicated by the first symbol signal, wherein
   the controller sets, on a basis of the first symbol signal and the second symbol signal, the emphasis voltage in the first driver section.

12. The transmission device according to claim 10, further comprising a signal generator that generates a symbol signal on a basis of a transition signal indicating a symbol transition, wherein
   the controller sets the emphasis voltage in the first driver section on a basis of a sequence of a symbol indicated by the symbol signal.

13. The transmission device according to claim 2, wherein the first driver section includes
   a first circuit provided on a path from a first power supply to the first output signal, and
   a second circuit provided on a path from a second power supply to the first output terminal, and
   the controller sets the emphasis voltage in the first driver section by setting an impedance ratio between impedance of the first circuit and impedance of the second circuit.

14. The transmission device according to claim 13, wherein the controller sets the impedance ratio to allow parallel impedance of the impedance of the first circuit and the impedance of the second circuit to be constant.

15. The transmission device according to claim 13, wherein
   the first circuit includes a plurality of first sub-circuits each including a first resistor and a first transistor that are provided on the path from the first power supply to the first output terminal,
   the second circuit includes a plurality of second sub-circuits each including a second resistor and a second transistor that are provided on the path from the second power supply to the first output terminal, and the controller sets the emphasis voltage in the first driver section by setting number of the first transistor to be brought into an ON state, out of a plurality of the first transistors in the first circuit, and by setting number of the second transistor to be brought into an ON state, out of a plurality of the second transistors in the second circuit.

16. The transmission device according to claim 15, wherein
the plurality of first sub-circuits are grouped into a plurality of first groups,
the plurality of second sub-circuits are grouped into a plurality of second groups, and
the controller sets the emphasis voltage in the first driver section by turning the plurality of the first transistors in the first circuit ON and OFF in a unit of the first group and by turning the plurality of the second transistors in the second circuit ON and OFF in a unit of the second group.

17. The transmission device according to claim 16, wherein
the plurality of the first groups includes a first sub-group and a second sub-group, and
number of the first sub-circuits belonging to the first sub-group differs from number of the first sub-circuits belonging to the second sub-group.

18. A transmission method comprising:
causing three driver sections to transmit a signal having one of a first voltage state, a second voltage state, or a third voltage state, respectively, such that the three driver sections are caused to collectively use each of the first voltage state, the second voltage state, and the third voltage state, wherein the third voltage state is a state between the first voltage state and the second voltage state; and
causing the three driver sections to perform emphasis by setting an emphasis voltage in each of the driver sections on a basis of skew information.

19. A communication system comprising:
a transmission device; and
a reception device,
the transmission device including
three driver sections each configured to transmit a signal having one of a first voltage state, a second voltage state, or a third voltage state, respectively, such that the three driver sections are configured to are configured to collectively use each of the first voltage state, the second voltage state, and the third voltage state, and to be able to set a voltage in each of the voltage states, the third voltage state being a state between the first voltage state and the second voltage state, and
a controller that causes the three driver sections to perform emphasis by setting an emphasis voltage in each of the driver sections on a basis of skew information.

* * * * *